(12) United States Patent
McCourt et al.

(10) Patent No.: US 12,505,027 B2
(45) Date of Patent: Dec. 23, 2025

(54) SYSTEMS, METHODS, AND GRAPHICAL USER INTERFACES FOR DETECTING AND EXPLAINING ANOMALOUS BEHAVIOR IN A DEPLOYED AI APPLICATION

(71) Applicant: Distributional, Inc., Berkeley, CA (US)

(72) Inventors: Michael McCourt, Toronto (CA); Renaud Bourassa-Denis, Montreal (CA); Keith Laban, New York, NY (US); Olivia Kim, Toronto (CA); Ian Dewancker, Toronto (CA); Bolong Cheng, San Jose, CA (US); Halley Vance, Seattle, WA (US); Scott Clark, Palo Alto, CA (US)

(73) Assignee: Distributional, Inc., Berkeley, CA (US)

( * ) Notice: Subject to any disclaimer, the term of this patent is extended or adjusted under 35 U.S.C. 154(b) by 0 days.

(21) Appl. No.: 19/217,630

(22) Filed: May 23, 2025

(65) Prior Publication Data

US 2025/0370908 A1    Dec. 4, 2025

Related U.S. Application Data

(60) Provisional application No. 63/809,483, filed on May 21, 2025, provisional application No. 63/652,243, filed on May 28, 2024.

(51) Int. Cl.
*G06F 11/3604* (2025.01)

(52) U.S. Cl.
CPC ...... *G06F 11/3612* (2013.01); *G06F 11/3616* (2013.01)

(58) Field of Classification Search
None
See application file for complete search history.

(56) References Cited

U.S. PATENT DOCUMENTS

| 11,422,919 B2 * | 8/2022 | Trees ............... G06F 11/3466 |
| 2015/0095892 A1 * | 4/2015 | Baggott ............ G06F 11/3616 717/127 |

(Continued)

OTHER PUBLICATIONS

Kahng et al., "LLM Comparator: Visual Analytics for Side-by-Side Evaluation of Large Language Models", arXiv:2402.10524 [cs.HC], Feb. 16, 2024. (Year: 2024).*

(Continued)

*Primary Examiner* — Andrew M. Lyons
(74) *Attorney, Agent, or Firm* — Padowithz Alce; Chandler Scheitlin; Alce PLLC

(57) ABSTRACT

A system, method, and computer-program product includes obtaining, via an application programming interface (API), a test object that includes application usage data of a deployed AI application for a target time span, executing, in real-time by one or more computer processors, one or more application behavior tests that assess an operational behavior of the deployed AI application, detecting, by the one or more computer processors, that a misbehavior occurred in the deployed AI application during the target time span and one or more deviant features contributing to the misbehavior in response to executing the one or more application behavior tests, and returning, by the one or more computer processors, the one or more deviant features contributing to the misbehavior to a subscribing entity associated with the deployed AI application.

24 Claims, 34 Drawing Sheets

(56) References Cited

U.S. PATENT DOCUMENTS

| | | | | |
|---|---|---|---|---|
| 2015/0317240 A1* | 11/2015 | Li | ............................ | G06F 8/443 |
| | | | | 714/38.1 |
| 2016/0378648 A1* | 12/2016 | Ekambaram | .......... | G06F 11/301 |
| | | | | 714/38.1 |
| 2021/0149789 A1* | 5/2021 | Drori | .................. | G06F 11/3409 |

OTHER PUBLICATIONS

Mishra, Aditi et al., "PromptAid: Prompt Exploration, Perturbation, Testing and Iteration using Visual Analytics for Large Language Models", arXiv:2304.01964v2 [cs.HC], Apr. 8, 2023. (Year: 2023).*
Pedroso, Diego Frazatto et al., "Anomaly Detection and Root Cause Analysis in Cloud-Native Environments Using Large Language Models and Bayesian Networks, " in IEEE Access, vol. 13, pp. 77550-77564, May 8, 2025. (Year: 2025).*

* cited by examiner

200

> OBTAINING A TEST OBJECT THAT INCLUDES APPLICATION USAGE DATA OF A DEPLOYED AI APPLICATION FOR A TARGET TIME SPAN S210

> EXECUTING, IN REAL-TIME BY ONE OR MORE COMPUTER PROCESSORS, ONE OR MORE APPLICATION BEHAVIOR TESTS THAT ASSESS AN OPERATIONAL BEHAVIOR OF THE DEPLOYED AI APPLICATION BY EVALUATING THE TEST OBJECT AGAINST A REFERENCE STATE OBJECT ASSOCIATED WITH THE DEPLOYED AI APPLICATION S220

> DETECTING, BY THE ONE OR MORE COMPUTER PROCESSORS, THAT A MISBEHAVIOR OCCURRED IN THE DEPLOYED AI APPLICATION DURING THE TARGET TIME SPAN AND ONE OR MORE DEVIANT FEATURES CONTRIBUTING TO THE MISBEHAVIOR IN RESPONSE TO EXECUTING THE ONE OR MORE APPLICATION BEHAVIOR TESTS S230

> RETURNING, BY THE ONE OR MORE COMPUTER PROCESSORS, THE ONE OR MORE DEVIANT FEATURES CONTRIBUTING TO THE MISBEHAVIOR TO A SUBSCRIBING ENTITY ASSOCIATED WITH THE DEPLOYED AI APPLICATION S240

FIGURE 2

Test Object

| Input Data | Output Data | First Subscriber-Specific Evaluation Metric (e.g., Output Response Latency) | Second Subscriber-Specific Evaluation Metric (e.g., Embedding Response Latency) | First Service-Generated Evaluation Metric (e.g., Output Token Length) | Second Service-Generated Evaluation Metric (e.g., Output Text Readability Score) |
|---|---|---|---|---|---|
| Input "A" | Output "A" | 310 Milliseconds (ms) | 40 ms | 300 tokens | 8.7 |
| Input "B" | Output "B" | 200 Milliseconds (ms) | 35 ms | 400 tokens | 8.7 |
| Input "C" | Output "C" | 225 Milliseconds (ms) | 15 ms | 350 tokens | 9.3 |
| Input "D" | Output "D" | 340 milliseconds (ms) | 60 ms | 380 tokens | 8.0 |
| Input "E" | Output "E" | 500 Milliseconds (ms) | 70 ms | 325 tokens | 10.0 |
| ⋮ | ⋮ | ⋮ | ⋮ | ⋮ | ⋮ |
| Input "N" | Output "N" | 500 Milliseconds (ms) | 80 ms | 410 tokens | 8.5 |

FIGURE 3

Reference State Object

| Input Data | Output Data | First Subscriber-Specific Evaluation Metric (e.g., Output Response Latency) | Second Subscriber-Specific Evaluation Metric (e.g., Embedding Response Latency) | First Service-Generated Evaluation Metric (e.g., Output Token Length) | Second Service-Generated Evaluation Metric (e.g., Output Text Readability Score) |
|---|---|---|---|---|---|
| Input "A" | Output "A" | 100 Milliseconds (ms) | 10 ms | 100 tokens | 3 |
| Input "B" | Output "B" | 75 Milliseconds (ms) | 12 ms | 120 tokens | 3.3 |
| Input "C" | Output "C" | 80 Milliseconds (ms) | 10 ms | 140 tokens | 3.8 |
| Input "D" | Output "D" | 95 milliseconds (ms) | 8 ms | 90 tokens | 3.2 |
| Input "E" | Output "E" | 79 Milliseconds (ms) | 7 ms | 108 tokens | 3.5 |
| ⋮ | ⋮ | ⋮ | ⋮ | ⋮ | ⋮ |
| Input "N" | Output "N" | 82 Milliseconds (ms) | 9 ms | 129 tokens | 3.6 |

FIGURE 4

Data Distribution of the Values included in the Third Column of the Test Object

Data Distribution of the Values included in the Third Column of the Reference State Object

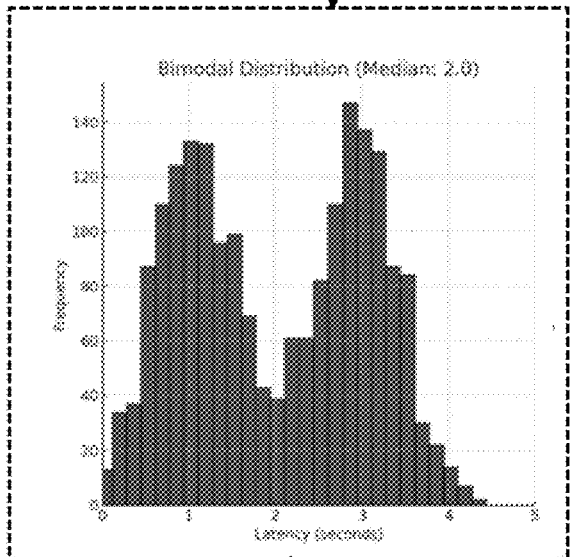
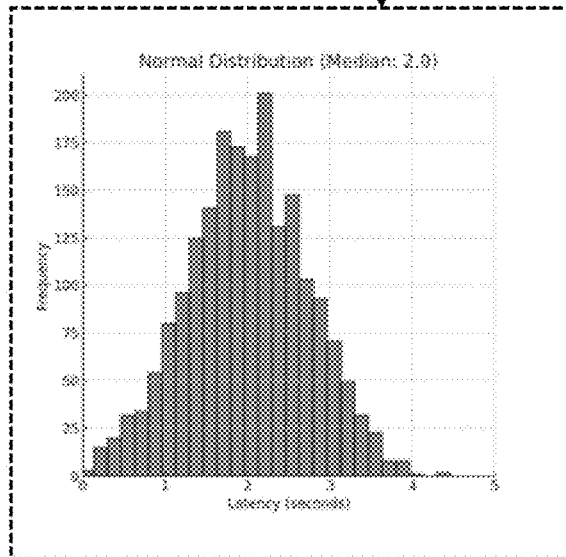

Automated Distribution Pairwise Assessment Module

Degree of Distribution Similarity Between the Data Distribution of the Values included in the Third Column of the Test Object and the Data Distribution of the Values included in the Third Column of the Reference State Object

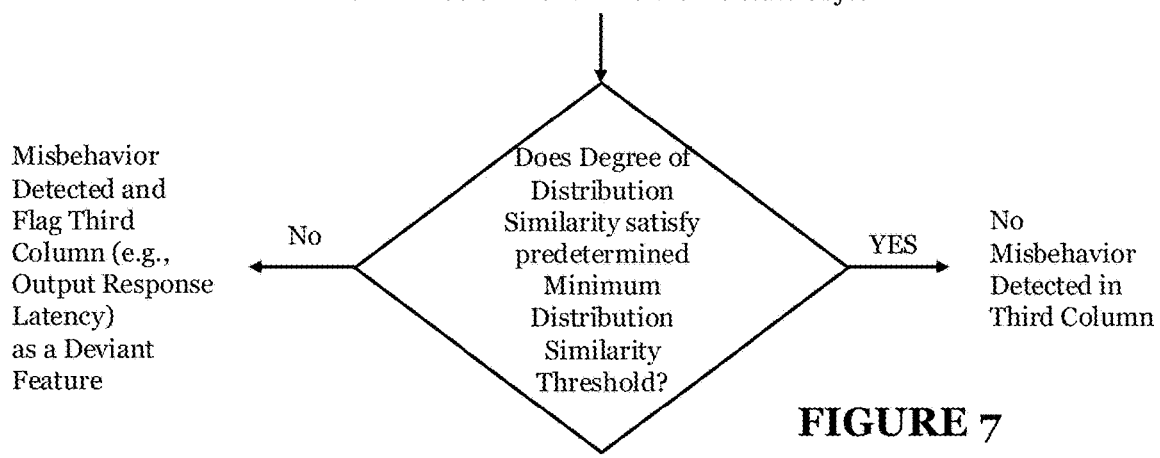

FIGURE 7

SYSTEMS, METHODS, AND GRAPHICAL USER INTERFACES FOR DETECTING AND EXPLAINING ANOMALOUS BEHAVIOR IN A DEPLOYED AI APPLICATION

CROSS-REFERENCE TO RELATED APPLICATIONS

This application claims the benefit of U.S. Provisional Application No. 63/652,243, filed 28 May 2024 and U.S. Provisional Application No. 63/809,483, filed 21 May 2025, which are incorporated in their entireties by this reference.

TECHNICAL FIELD

This invention relates generally to the artificial intelligence testing field, and more specifically to new and useful systems and methods in the artificial intelligence testing field.

BACKGROUND

Traditional software testing methods, which often rely on deterministic and static validation, fall short when applied to AI systems or applications that are inherently nondeterministic and nonstationary. This means that such AI systems and applications might provide different outputs for the same input at different times, making static, deterministic software testing methods ineffective.

Furthermore, traditional software testing methods also fail to address the complex component structure of modern AI applications, which often use machine learning models and external application programming interfaces (API). These application components introduce additional layers of complexity and interdependency, making it difficult to evaluate the application behavior of modern AI applications using conventional software testing methods.

The limitations of the traditional software testing methods highlight a critical need for an advanced testing framework that can handle the unique challenges posed by modern AI applications. Moreover, the lack of effective testing tools for AI applications has been a significant barrier to their deployment in critical domains. Enterprises often face increased risks and compliance issues, leading to delays in product releases and higher operational costs. An effective AI testing solution would not only address these technical challenges but also support faster development cycles, reduce risks associated with deployed AI applications, and enhance the overall trustworthiness of AI systems.

The embodiments of the present application provide technical solutions that address, at least, the needs described above, as well as the deficiencies of the state of the art.

BRIEF SUMMARY OF THE EMBODIMENTS

In one embodiment, a computer-implemented method for accelerating a detection of anomalous behavior in a deployed artificial intelligence (AI) application includes obtaining, via an application programming interface (API), a test object that includes application usage data of the deployed AI application for a target time span, wherein the test object includes one or more of: a set of inputs provided to the deployed AI application during the target time span, a set of outputs generated by the deployed AI application in response to processing the set of inputs, a set of contextual attribute values collected during the processing of the set of inputs and the generation of the set of outputs by the deployed AI application, and a set of supplemental attribute values used during the generation of the set of outputs by the deployed AI application, executing, in real-time by one or more computer processors, one or more application behavior tests that assess an operational behavior of the deployed AI application by evaluating the test object against a reference state object associated with the deployed AI application, wherein executing the one or more application behavior tests includes: executing a first set of automated pairwise assessments between the test object and the reference state object assessing the operational behavior of the deployed AI application at an application output data level, executing a second set of automated pairwise assessments between the test object and the reference state object assessing the operational behavior of the deployed AI application at a contextual attribute data level, and executing a third set of automated pairwise assessments between the test object and the reference state object assessing the operational behavior of the deployed AI application at a supplemental attribute data level; detecting, by the one or more computer processors, when a misbehavior occurred in the deployed AI application during the target time span and one or more deviant features contributing to the misbehavior in response to the one or more application behavior tests indicating that at least one distributional deviation exists between the test object and the reference state object; and returning, by the one or more computer processors, the one or more deviant features contributing to the misbehavior to a subscribing entity associated with the deployed AI application, thereby enabling the subscribing entity to investigate and mitigate the misbehavior from occurring within the deployed AI application at a future time by modifying operational parameters of the deployed AI application corresponding to the one or more deviant features.

In one embodiment, the deployed AI application includes a plurality of distinct components that collectively operate to process the set of inputs and generate the set of outputs during the target time span, each distinct component of the plurality of distinct components of the deployed AI application performs a specific task that assists the deployed AI application in processing the set of inputs and generating the set of outputs during the target time span, the set of contextual attribute values contributes to a first performance efficacy metric that measures a performance characteristic of a first component of the plurality of distinct components, and the set of outputs corresponds to model outputs generated by a machine learning model of the plurality of distinct components.

In one embodiment, the computer-implemented method further includes generating, by the one or more computer processors, a plurality of distinct sets of text efficacy values of a plurality of distinct text efficacy metric types derived from the set of outputs generated by the deployed AI application during the target time span, wherein: each distinct set of text efficacy values of the plurality of distinct sets of text efficacy values corresponds to a distinct text efficacy metric type that enables numerical assessment of a textual characteristic associated with the set of outputs, executing the first set of automated pairwise assessment includes executing a respective automated pairwise assessment for each distinct text efficacy metric type of the plurality of distinct text efficacy metric types included in the test object, and the respective automated pairwise assessment executed for a subject distinct text efficacy metric type is performed between a distribution of a distinct set of text efficacy values included in the test object that corresponds to the subject distinct text efficacy metric type and a corresponding distribution of text efficacy values included in the reference state object that also corresponds to the subject distinct text efficacy metric type.

In one embodiment, executing the first set of automated pairwise assessment includes: assessing a distribution of the set of outputs included in the test object against a distribution of a historical set of outputs included in the reference state object, and in response to assessing the distribution of the set of outputs included in the test object against the distribution of the historical set of outputs included in the reference state object, outputting a pairwise assessment finding that indicates a statistically significant drift or shift occurred in the deployed AI application associated with the test object relative to the reference state object.

In one embodiment, executing the first set of automated pairwise assessment includes: generating, by the one or more computer processors, a test distribution of a target evaluation metric that is derived from the set of outputs included in the test object, generating, by the one or more computer processors, a reference distribution of the target evaluation metric derived from a historical set of outputs included in the reference state object, assessing, by the one or more computer processors, the test distribution of the target evaluation metric associated with the test object against the reference distribution of the target evaluation metric associated with the reference state object, and outputting a pairwise assessment finding that indicates a statistically significant drift or shift occurred in the deployed AI application during the target time span in response to assessing the test distribution of the target evaluation metric against the reference distribution of the target evaluation metric.

In one embodiment, executing the first set of automated pairwise assessment includes: generating, by the one or more computer processors, a plurality of test distributions that correspond to a plurality of distinct evaluation metrics, wherein: each test distribution corresponds to a distinct one of the plurality of distinct evaluation metrics, and each test distribution is derived from the set of outputs included in the test object based on the distinct one of the plurality of distinct evaluation metrics; generating, by the one or more computer processors, a plurality of reference distributions that correspond to the plurality of distinct evaluation metrics, wherein: each reference distribution corresponds to a distinct one of the plurality of distinct evaluation metrics, and each reference distribution is derived from a historical set of reference outputs included in the reference state object based on the distinct one of the plurality of distinct evaluation metrics; assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

In one embodiment, executing the second set of automated pairwise assessment includes assessing a distribution of the set of contextual attribute values included in the test object against a distribution of a historical set of contextual attribute values included in the reference state object, and in response to assessing the distribution of the set of contextual attribute values included in the test object against the distribution of the historical set of contextual attribute values included in the reference state object, outputting a pairwise assessment finding that indicates a statistically significant drift or shift occurred in the deployed AI application associated with the test object relative to the reference state object.

In one embodiment, executing the second set of automated pairwise assessment includes: generating, by the one or more computer processors, a test distribution of a target evaluation metric that is derived from the set of contextual attribute values included in the test object, generating, by the one or more computer processors, a reference distribution of the target evaluation metric derived from a historical set of contextual attribute values included in the reference state object, assessing, by the one or more computer processors, the test distribution of the target evaluation metric associated with the test object against the reference distribution of the target evaluation metric associated with the reference state object, and outputting a pairwise assessment finding that indicates a statistically significant drift or shift occurred in the deployed AI application during the target time span in response to assessing the test distribution of the target evaluation metric against the reference distribution of the target evaluation metric.

In one embodiment, executing the second set of automated pairwise assessment includes: generating, by the one or more computer processors, a plurality of test distributions that correspond to a plurality of distinct evaluation metrics, wherein: each test distribution corresponds to a distinct one of the plurality of distinct evaluation metrics, and each test distribution is derived from the set of contextual attribute values included in the test object based on the distinct one of the plurality of distinct evaluation metrics; generating, by the one or more computer processors, a plurality of reference distributions that correspond to the plurality of distinct evaluation metrics, wherein: each reference distribution corresponds to a distinct one of the plurality of distinct evaluation metrics, and each reference distribution is derived from a historical set of contextual attribute values included in the reference state object based on the distinct one of the plurality of distinct evaluation metrics; assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

In one embodiment, executing the third set of automated pairwise assessment includes assessing a distribution of the set of supplemental attribute values included in the test object against a distribution of a historical set of supplemental attribute values included in the reference state object, and in response to assessing the distribution of the set of supplemental attribute values included in the test object against the distribution of the historical set of supplemental attribute values included in the reference state object, outputting a pairwise assessment finding that indicates a statistically significant drift or shift occurred in the deployed AI application associated with the test object relative to the reference state object.

In one embodiment, executing the third set of automated pairwise assessment includes generating, by the one or more computer processors, a test distribution of a target evaluation metric that is derived from the set of supplemental attribute values included in the test object, generating, by the one or more computer processors, a reference distribution of the target evaluation metric derived from a historical set of supplemental attribute values included in the reference state object, assessing, by the one or more computer processors, the test distribution of the target evaluation metric associated with the test object against the reference distribution of the target evaluation metric associated with the reference state object, and outputting a pairwise assessment finding that indicates a statistically significant drift or shift occurred in the deployed AI application during the target time span in response to assessing the test distribution of the target evaluation metric against the reference distribution of the target evaluation metric.

In one embodiment, executing the third set of automated pairwise assessment includes: generating, by the one or more computer processors, a plurality of test distributions that correspond to a plurality of distinct evaluation metrics, wherein: each test distribution corresponds to a distinct one of the plurality of distinct evaluation metrics, and each test distribution is derived from the set of supplemental attribute values included in the test object based on the distinct one of the plurality of distinct evaluation metrics; generating, by the one or more computer processors, a plurality of reference distributions that correspond to the plurality of distinct evaluation metrics, wherein: each reference distribution corresponds to a distinct one of the plurality of distinct evaluation metrics, and each reference distribution is derived from a historical set of supplemental attribute values included in the reference state object based on the distinct one of the plurality of distinct evaluation metrics; assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

In one embodiment, the API is provided by an application behavior assessment and explainability service, the computer-implemented method further includes: receiving a request, from the subscribing entity, to compute a plurality of distinct text efficacy values of a plurality of distinct text efficacy metric types for each distinct output of the set of outputs in response to the subscribing entity invoking an API function provided by the API, automatically computing, by the one or more computer processors, a plurality of distinct sets of text efficacy values of the plurality of distinct text efficacy metric types in response to receiving the request, wherein the plurality of distinct sets of text efficacy values includes at least: a first set of output text efficacy values corresponding to a first distinct text efficacy metric type, a second set of output text efficacy values corresponding to a second distinct text efficacy metric type, and a third set of output text efficacy values corresponding to a third distinct text efficacy metric type.

In one embodiment, the test object further includes the first set of output text efficacy values corresponding to the first distinct text efficacy metric type, the second set of output text efficacy values corresponding to the second distinct text efficacy metric type, and the third set of output text efficacy values corresponding to the third distinct text efficacy metric type, and executing the one or more application behavior tests further includes: executing a fourth automated pairwise assessment between a distribution of the first set of output text efficacy values that corresponds to the first distinct text efficacy metric type and a corresponding data distribution of the reference state object that corresponds to the first distinct text efficacy metric type, executing a fifth automated pairwise assessment between a distribution of the second set of output text efficacy values that corresponds to the second distinct text efficacy metric type and a corresponding data distribution of the reference state object that corresponds to the second distinct text efficacy metric type, and executing a sixth automated pairwise assessment between a distribution of the third set of output text efficacy values that corresponds to the third distinct text efficacy metric type and a corresponding data distribution of the reference state object that corresponds to the third distinct text efficacy metric type.

In one embodiment, the computer-implemented method further includes: in response to executing the fourth automated pairwise assessment, the fifth automated pairwise assessment, and the sixth automated pairwise assessment: detecting, by the one or more computer processors, that a statistically significant drift or shift occurred in one of: the distribution of the first set of output text efficacy values associated with the test object, the distribution of the second set of output text efficacy values associated with the test object, and the distribution of the third set of output text efficacy values associated with the test object.

In one embodiment, the computer-implemented method further includes surfacing, via a graphical user interface, the misbehavior that occurred in the deployed AI application at one or more levels of granularity, wherein surfacing the misbehavior includes one or more of: surfacing, by the graphical user interface, a single distribution of contextual attribute values, supplemental attribute values, or evaluation metrics derived from the set of outputs included in the test object that contributed to the misbehavior, and surfacing, by the graphical user interface, a single distinct application component of a plurality of distinct application components implemented by the deployed AI application whose component behavior contributed to the misbehavior.

In one embodiment, the computer-implemented method further includes presenting, by the one or more computer processors, a representation of a shift in the operational behavior of the deployed AI application during the target time span, wherein the computer-implemented method presents the shift as manifesting in a statistically meaningful fashion at one or more of: a single distribution of contextual attributes, supplemental attributes, or evaluation metrics derived from the set of outputs, the set of contextual attribute values, or the set of supplemental attribute values, a component-level accumulation of behavioral findings from all application behavior tests and respective automated pairwise assessments corresponding to a single distinct component of the deployed AI application, and an application-level accumulation of behavioral findings from all application behavior tests and associated automated pairwise assessments executed for the deployed AI application.

In one embodiment, the computer-implemented method further includes: in response to executing the fourth automated pairwise assessment, the fifth automated pairwise assessment, and the sixth automated pairwise assessment: detecting, by the one or more computer processors, that a statistically significant drift or shift did not occur in one of: the distribution of the first set of output text efficacy values associated with the test object, the distribution of the second set of output text efficacy values associated with the test object, and the distribution of the third set of output text efficacy values associated with the test object.

In one embodiment, the computer-implemented method further includes automatically generating, by the one or more computer processors, an application behavior alert in response to detecting that the misbehavior occurred in the deployed AI application during the target time span, and transmitting, in real-time, the application behavior alert to the subscribing entity associated with the deployed AI application using a real-time messaging service.

In one embodiment, the computer-implemented method further includes: instantiating, by the one or more computer processors, an application behavior user interface that includes a selectable test execution button; receiving, from the subscribing entity associated with the deployed AI application, a first user input selecting the selectable test execution button displayed on the application behavior user interface; instantiating, by the one or more computer processors, an application behavior test configuration user interface object overlaid on the application behavior user interface in response to receiving the first user input; receiving, via the application behavior test configuration user interface object, a sequence of one or more additional user inputs from the subscribing entity that: (i) selects the reference state object as a baseline application behavior for the deployed AI application, (ii) selects the test object to be assessed against the reference state object, (iii) selects the one or more application behavior tests (including any that may have been automatically generated by the computer-implemented method) to be executed during the assessment of the operational behavior of the deployed AI application, and (iv) selects a set of application behavior tests not to be executed during the assessment of the operational behavior of the deployed AI application; and initiating, by the one or more computer processors, the execution of the one or more application behavior tests that assess the operational behavior of the deployed AI application in response to the subscribing entity selecting a test confirmation button displayed on the application behavior test configuration user interface object.

In one embodiment, the application behavior user interface further includes an application behavior assessment visualization that includes a plurality of distinct selectable markers, wherein: each distinct selectable marker of the plurality of distinct selectable markers corresponds to a distinct application behavior assessment of the deployed AI application, and each distinct application behavior assessment executed a respective set of application behavior tests to assess the operational behavior of the deployed AI application for a respective time span, and an application behavior assessment matrix that includes a plurality of distinct selectable application behavior assessment rows, wherein: each distinct selectable application behavior assessment row of the plurality of distinct selectable application behavior assessment rows corresponds to a respective application behavior assessment performed for the deployed AI application.

In one embodiment, the computer-implemented method further includes: receiving, via the application behavior user interface, an input from the subscribing entity selecting a selectable marker of the plurality of distinct selectable markers, wherein the distinct application behavior assessment corresponding to the selectable marker selected by the subscribing entity executed the one or more application behavior tests; instantiating, by the one or more computer processors, an application behavior assessment details user interface that corresponds to the distinct application behavior assessment that executed the one or more application behavior tests in response to receiving the input from the subscribing entity selecting the selectable marker, wherein the application behavior assessment details user interface includes: a total number of the one or more application behavior tests that satisfied distribution test criteria of the one or more application behavior tests, a total number of the one or more application behavior tests that did not satisfy the distribution test criteria of the one or more application behavior tests, an application similarity index score that quantitatively represents a degree of similarity between the test object and the reference state object, and a plurality of distinct selectable key insights rows that correspond to the one or more deviant features contributing to the misbehavior.

In one embodiment, the computer-implemented method further includes: receiving, from the subscribing entity, a selection input of a target selectable key insights row of the plurality of distinct selectable key insights rows that corresponds to the second set of automated pairwise assessments; and instantiating, by the one or more computer processors, a pairwise assessment details user interface that corresponds to the second set of automated pairwise assessments in response to receiving the selection input of the target selectable key insights row that corresponds to the second set of automated pairwise assessments from the subscribing entity, wherein the pairwise assessment details user interface includes: a distribution deviation assessment visualization that graphically illustrates a distribution of the set of contextual attribute values associated with the test object superimposed or overlaid over the corresponding contextual attribute distribution of the reference state object, and a pairwise assessment similarity score that quantitatively represents a degree of similarity between the distribution of the set of contextual attribute values associated with the test object and the corresponding contextual attribute distribution of the reference state object.

In one embodiment, a computer-implemented system for accelerating a detection of anomalous behavior in a deployed artificial intelligence (AI) application includes one or more computer processors; a memory; a computer-readable medium operably coupled to the one or more computer processors, the computer-readable medium having computer-readable instructions stored thereon that, when executed by the one or more computer processors, cause a computing device to perform operations comprising: obtaining, via an application programming interface (API), a test object that includes application usage data of the deployed AI application for a target time span, wherein the test object includes one or more of: a set of inputs provided to the deployed AI application during the target time span, a set of outputs generated by the deployed AI application in response to processing the set of inputs, a set of contextual attribute values collected during the processing of the set of inputs and the generation of the set of outputs by the deployed AI application, and a set of supplemental attribute values used during the generation of the set of outputs by the deployed AI application, executing, in real-time by the one or more computer processors, one or more application behavior tests that assess an operational behavior of the deployed AI application by evaluating the test object against a reference state object associated with the deployed AI application, wherein executing the one or more application behavior tests includes: executing a first set of automated pairwise assessments between the test object and the reference state object assessing the operational behavior of the deployed AI application at an application output data level, executing a second set of automated pairwise assessments between the test object and the reference state object assessing the operational behavior of the deployed AI application at a contextual attribute data level, and executing a third set of automated pairwise assessments between the test object and the reference state object assessing the operational behavior of the deployed AI application at a supplemental attribute data level; detecting, by the one or more computer processors, when a misbehavior occurred in the deployed AI application during the target time span and one or more deviant features contributing to the misbehavior in response to the one or more application behavior tests indicating that at least one distributional deviation exists between the test object and the reference state object; and returning, by the one or more computer processors, the one or more deviant features contributing to the misbehavior to a subscribing entity associated with the deployed AI application, thereby enabling the subscribing entity to investigate and mitigate the misbehavior from occurring within the deployed AI application at a future time by modifying operational parameters of the deployed AI application corresponding to the one or more deviant features.

In one embodiment, the test object includes a tabular data structure comprising a plurality of distinct columns and a plurality of distinct rows, each distinct column of the plurality of distinct columns corresponds to a distinct feature associated with the operational behavior of the deployed AI application, and each distinct row of the plurality of distinct rows corresponds to a distinct execution instance of the deployed AI application and includes a set of feature values corresponding to the plurality of distinct columns.

In one embodiment, the computer-implemented system further includes automatically computing, by the one or more computer processors, an application similarity index score that quantitatively represents a degree of similarity between the test object and the reference state object based on a combination of the set of outputs, the set of contextual attribute values, the set of supplemental attribute values, and derived evaluation metrics, and displaying, via a graphical user interface, the application similarity index score accumulated at an individual metric level, a distinct component level, or across the entire deployed AI application.

In one embodiment, a computer-program product comprising a non-transitory machine-readable storage medium storing computer instructions that, when executed by computer one or more processors, perform operations including: obtaining, via an application programming interface (API), a test object that includes application usage data of the deployed AI application for a target time span, wherein the test object includes one or more of: a set of inputs provided to the deployed AI application during the target time span, a set of outputs generated by the deployed AI application in response to processing the set of inputs, a set of contextual attribute values collected during the processing of the set of inputs and the generation of the set of outputs by the deployed AI application, and a set of supplemental attribute values used during the generation of the set of outputs by the deployed AI application, executing, in real-time by the one or more computer processors, one or more application behavior tests that assess an operational behavior of the deployed AI application by evaluating the test object against a reference state object associated with the deployed AI application, wherein executing the one or more application behavior tests includes: executing a first set of automated pairwise assessments between the test object and the reference state object assessing the operational behavior of the deployed AI application at an application output data level, executing a second set of automated pairwise assessments between the test object and the reference state object assessing the operational behavior of the deployed AI application at a contextual attribute data level, and executing a third set of automated pairwise assessments between the test object and the reference state object assessing the operational behavior of the deployed AI application at a supplemental attribute data level; detecting, by the one or more computer processors, when a misbehavior occurred in the deployed AI application during the target time span and one or more deviant features contributing to the misbehavior in response to the one or more application behavior tests indicating that at least one distributional deviation exists between the test object and the reference state object; and returning, by the one or more computer processors, the one or more deviant features contributing to the misbehavior to a subscribing entity associated with the deployed AI application, thereby enabling the subscribing entity to investigate and mitigate the misbehavior from occurring within the deployed AI application at a future time by modifying operational parameters of the deployed AI application corresponding to the one or more deviant features.

In one embodiment, a computer-implemented method for accelerating a detection of anomalous behavior in a deployed artificial intelligence (AI) application includes obtaining, via an application programming interface (API), a test object that includes application usage data of the deployed AI application for a target time span, wherein the test object includes: a set of inputs provided to the deployed AI application during the target time span, a set of outputs generated by the deployed AI application in response to processing the set of inputs, and a set of contextual attribute values collected during the processing of the set of inputs and the generation of the set of outputs by the deployed AI application; executing, in real-time by one or more computer processors, one or more application behavior tests that assess an operational behavior of the deployed AI application by evaluating the test object against a reference state object associated with the deployed AI application, wherein executing the one or more application behavior tests include: executing a first automated pairwise assessment between a distribution of the set of outputs and a corresponding output distribution of the reference state object, and executing a second automated pairwise assessment between a distribution of the set of contextual attribute values and a corresponding contextual attribute distribution of the reference state object; detecting, by the one or more computer processors, that a misbehavior occurred in the deployed AI application during the target time span and one or more deviant features contributing to the misbehavior in response to the one or more application behavior tests indicating that at least one distributional deviation exists between the test object and the reference state object; and returning, by the one or more computer processors, the one or more deviant features contributing to the misbehavior to a subscribing entity associated with the deployed AI application, thereby enabling the subscribing entity to mitigate the misbehavior from occurring within the deployed AI application at a future time by modifying operational parameters of the deployed AI application corresponding to the one or more deviant features.

In one embodiment, the deployed AI application includes a plurality of distinct components that collectively operate to process the set of inputs and generate the set of outputs during the target time span, each distinct component of the plurality of distinct components of the deployed AI application performs a specific task that assists the deployed AI application in processing the set of inputs and generating the set of outputs during the target time span, the set of contextual attribute values corresponds to a first performance efficacy metric that measures a performance characteristic of a first component of the plurality of distinct components, and the set of outputs corresponds to model outputs generated by a machine learning model of the plurality of distinct components.

In one embodiment, executing the first automated pairwise assessment includes: generating the distribution of the set of outputs in response to providing the set of outputs generated by the deployed AI application to a distribution generation algorithm, generating the corresponding output distribution in response to providing a reference set of model outputs included in the reference state object to the distribution generation algorithm, assessing the distribution of the set of outputs against the corresponding output distribution, and outputting a pairwise assessment finding that indicates a statistically significant drift or shift occurred in the distribution of the set of outputs associated with the test object relative to the corresponding output distribution of the reference state object.

In one embodiment, the reference state object includes a reference set of contextual attribute values that corresponds to the first performance efficacy metric, and executing the second automated pairwise assessment includes: generating the distribution of the set of contextual attribute values in response to providing the set of contextual attribute values to a distribution generation algorithm, generating the corresponding contextual attribute distribution in response to providing the reference set of contextual attribute values included in the reference state object to the distribution generation algorithm, assessing the distribution of the set of contextual attribute values against the corresponding contextual attribute distribution, and outputting a pairwise assessment finding that indicates a statistically significant drift or shift occurred in the distribution of the set of contextual attribute values associated with the test object relative to the corresponding contextual attribute distribution of the reference state object.

In one embodiment, the API is provided by an application behavior assessment and explainability service, the computer-implemented method further includes: receiving a request, from the subscribing entity, to compute a plurality of distinct text efficacy values of a plurality of distinct text efficacy metric types for each distinct output of the set of outputs in response to the subscribing entity invoking an API function provided by the API, automatically computing, by the one or more computer processors, a plurality of distinct sets of text efficacy values of the plurality of distinct text efficacy metric types in response to receiving the request, wherein the plurality of distinct sets of text efficacy values includes at least: a first set of output text efficacy values corresponding to a token count efficacy metric, wherein each output text efficacy value of the first set of output text efficacy values represents a total number of tokens included in a respective output of the set of outputs, a second set of output text efficacy values corresponding to a word count efficacy metric, wherein each output text efficacy value of the second set of output text efficacy values represents a total number of words included in the respective output of the set of outputs, and a third set of output text efficacy values corresponding to a text readability efficacy metric, wherein each output text efficacy value of the third set of output text efficacy values represents a text readability score determined for the respective output of the set of outputs using a predefined readability scoring algorithm.

In one embodiment, the test object includes the first set of output text efficacy values corresponding to the token count efficacy metric, the second set of output text efficacy values corresponding to the word count efficacy metric, and the third set of output text efficacy values corresponding to the text readability efficacy metric, and executing the one or more application behavior tests further includes: executing a third automated pairwise assessment between a distribution of the first set of output text efficacy values that corresponds to the token count efficacy metric and a corresponding output token count reference distribution of the reference state object that corresponds to the token count efficacy metric, executing a fourth automated pairwise assessment between a distribution of the second set of output text efficacy values that corresponds to the word count efficacy metric and a corresponding output word count reference distribution of the reference state object that corresponds to the word count efficacy metric, and executing a fifth automated pairwise assessment between a distribution of the third set of output text efficacy values that corresponds to the text readability efficacy metric and a corresponding output text readability distribution of the reference state object that corresponds to the text readability efficacy metric.

In one embodiment, the computer-implemented method further includes: in response to executing the third automated pairwise assessment, the fourth automated pairwise assessment, and the fifth automated pairwise assessment: detecting, by the one or more computer processors, that a statistically significant drift or shift occurred in one of: the distribution of the first set of output text efficacy values associated with the test object, the distribution of the second set of output text efficacy values associated with the test object, and the distribution of the third set of output text efficacy values associated with the test object.

In one embodiment, the computer-implemented method further includes: in response to executing the third automated pairwise assessment, the fourth automated pairwise assessment, and the fifth automated pairwise assessment: detecting, by the one or more computer processors, that a statistically significant drift or shift did not occur in one of: the distribution of the first set of output text efficacy values associated with the test object, the distribution of the second set of output text efficacy values associated with the test object, and the distribution of the third set of output text efficacy values associated with the test object.

In one embodiment, the computer-implemented method further includes automatically generating, by the one or more computer processors, an application behavior alert in response to detecting that the misbehavior occurred in the deployed AI application during the target time span, and transmitting, in real-time, the application behavior alert to the subscribing entity associated with the deployed AI application using a real-time messaging service.

In one embodiment, the computer-implemented method further includes: instantiating, by the one or more computer processors, an application behavior user interface that includes a selectable test execution button; receiving, from the subscribing entity associated with the deployed AI application, a first user input selecting the selectable test execution button displayed on the application behavior user interface; instantiating, by the one or more computer processors, an application behavior test configuration user interface object overlaid on the application behavior user interface in response to receiving the first user input; receiving, via the application behavior test configuration user interface object, a sequence of one or more additional user inputs from the subscribing entity that: (i) selects the reference state object as a baseline application behavior for the deployed AI application, (ii) selects the test object to be assessed against the reference state object, (iii) selects the one or more application behavior tests to be executed during the assessment of the operational behavior of the deployed AI application, and (iv) selects a set of application behavior tests not to be executed during the assessment of the operational behavior of the deployed AI application; and initiating, by the one or more computer processors, the execution of the one or more application behavior tests that assess the operational behavior of the deployed AI application in response to the subscribing entity selecting a test confirmation button displayed on the application behavior test configuration user interface object.

In one embodiment, the application behavior user interface further includes an application behavior assessment visualization that includes a plurality of distinct selectable markers, wherein: each distinct selectable marker of the plurality of distinct selectable markers corresponds to a distinct application behavior assessment of the deployed AI application, and each distinct application behavior assessment executed a respective set of application behavior tests to assess the operational behavior of the deployed AI application for a respective time span, and an application behavior assessment matrix that includes a plurality of distinct selectable application behavior assessment rows, wherein: each distinct selectable application behavior assessment row of the plurality of distinct selectable application behavior assessment rows corresponds to a respective application behavior assessment performed for the deployed AI application.

In one embodiment, the computer-implemented method further includes receiving, via the application behavior user interface, an input from the subscribing entity selecting a selectable marker of the plurality of distinct selectable markers, wherein the distinct application behavior assessment corresponding to the selectable marker selected by the subscribing entity executed the one or more application behavior tests; instantiating, by the one or more computer processors, an application behavior assessment details user interface that corresponds to the distinct application behavior assessment that executed the one or more application behavior tests in response to receiving the input from the subscribing entity selecting the selectable marker, wherein the application behavior assessment details user interface includes: a total number of the one or more application behavior tests that satisfied distribution test criteria of the one or more application behavior tests, a total number of the one or more application behavior tests that did not satisfy the distribution test criteria of the one or more application behavior tests, an application similarity index score that quantitatively represents a degree of similarity between the test object and the reference state object, and a plurality of distinct selectable key insights rows that correspond to the one or more deviant features contributing to the misbehavior.

In one embodiment, the computer-implemented method further includes receiving, from the subscribing entity, a selection input of a target selectable key insights row of the plurality of distinct selectable key insights rows that corresponds to the second automated pairwise assessment; and instantiating, by the one or more computer processors, a pairwise assessment details user interface that corresponds to the second automated pairwise assessment in response to receiving the selection input of the target selectable key insights row that corresponds to the second automated pairwise assessment from the subscribing entity, wherein the pairwise assessment details user interface includes: a distribution deviation assessment visualization that graphically illustrates the distribution of the set of contextual attribute values associated with the test object superimposed or overlaid over the corresponding contextual attribute distribution of the reference state object, and a pairwise assessment similarity score that quantitatively represents a degree of similarity between the distribution of the set of contextual attribute values associated with the test object and the corresponding contextual attribute distribution of the reference state object.

In one embodiment, a computer-implemented system for accelerating a detection of anomalous behavior in a deployed artificial intelligence (AI) application includes one or more computer processors; a memory; a computer-readable medium operably coupled to the one or more computer processors, the computer-readable medium having computer-readable instructions stored thereon that, when executed by the one or more computer processors, cause a computing device to perform operations comprising: obtaining a test object that includes application usage data of the deployed AI application for a target time span, wherein the test object includes: a set of inputs provided to the deployed AI application during the target time span, a set of outputs generated by the deployed AI application in response to processing the set of inputs, and a set of contextual attribute values collected during the processing of the set of inputs and the generation of the set of outputs by the deployed AI application; executing, in real-time by the one or more computer processors, one or more application behavior tests that assess an operational behavior of the deployed AI application by evaluating the test object against a reference state object associated with the deployed AI application, wherein executing the one or more application behavior tests include: executing a first automated pairwise assessment between a distribution of the set of outputs and a corresponding output distribution of the reference state object, and executing a second automated pairwise assessment between a distribution of the set of contextual attribute values and a corresponding contextual attribute distribution of the reference state object; detecting, by the one or more computer processors, that a misbehavior occurred in the deployed AI application during the target time span and one or more deviant features contributing to the misbehavior in response to the one or more application behavior tests indicating that at least one distributional deviation exists between the test object and the reference state object; and returning, by the one or more computer processors, the one or more deviant features contributing to the misbehavior to a subscribing entity associated with the deployed AI application, thereby enabling the subscribing entity to mitigate the misbehavior from occurring within the deployed AI application at a future time by modifying operational parameters of the deployed AI application corresponding to the one or more deviant features.

In one embodiment, the test object includes a tabular data structure comprising a plurality of distinct columns and a plurality of distinct rows, each distinct column of the plurality of distinct columns corresponds to a distinct feature associated with the operational behavior of the deployed AI application, and each distinct row of the plurality of distinct rows corresponds to a distinct execution instance of the deployed AI application and includes a set of feature values corresponding to the plurality of distinct columns.

In one embodiment, the set of contextual attribute values corresponds to a first distinct performance efficacy metric that measures a first performance characteristic of the deployed AI application during the target time span, a second set of contextual attribute values corresponds to a second distinct performance efficacy metric that measures a second performance characteristic of the deployed AI application during the target time span, a third set of contextual attribute values corresponds to a third distinct performance efficacy metric that measures a first output efficacy characteristic of the set of outputs, and a fourth set of contextual attribute values corresponds to a fourth distinct performance efficacy metric that measures a second output efficacy characteristic of the set of outputs.

In one embodiment, the test object includes a tabular data structure comprising a plurality of distinct columns, the set of inputs is stored within a first column of the plurality of distinct columns of the tabular data structure, the set of outputs is stored within a second column of the plurality of distinct columns of the tabular data structure, the set of contextual attribute values corresponding to the first distinct performance efficacy metric is stored within a third column of the plurality of distinct columns of the tabular data structure, the second set of contextual attribute values corresponding to the second distinct performance efficacy metric is stored within a fourth column of the plurality of distinct columns of the tabular data structure, the third set of contextual attribute values corresponding to the third distinct performance efficacy metric is stored within a fifth column of the plurality of distinct columns of the tabular data structure, and the fourth set of contextual attribute values corresponding to the fourth distinct performance efficacy metric is stored within a sixth column of the plurality of distinct columns of the tabular data structure.

In one embodiment, executing the one or more application behavior tests further include: executing a third automated pairwise assessment between a distribution of the second set of contextual attribute values and a corresponding contextual attribute distribution of the reference state object that corresponds to the second distinct performance efficacy metric, executing a fourth automated pairwise assessment between a distribution of the third set of contextual attribute values and a corresponding contextual attribute distribution of the reference state object that corresponds to the third distinct performance efficacy metric, and executing a fifth automated pairwise assessment between a distribution of the fourth set of contextual attribute values and a corresponding contextual attribute distribution of the reference state object that corresponds to the fourth distinct performance efficacy metric; and automatically computing, by the one or more computer processors, a set of pairwise assessment similarity scores based on executing the one or more application behavior tests, wherein automatically computing the set of pairwise assessment similarity scores includes: computing a first pairwise assessment similarity score that quantitatively represents a degree of similarity between the distribution of the set of outputs and the corresponding output distribution of the reference state object in response to executing the first automated pairwise assessment, computing a second pairwise assessment similarity score that quantitatively represents a degree of similarity between the distribution of the set of contextual attribute values and the corresponding contextual attribute distribution of the reference state object in response to executing the second automated pairwise assessment, computing a third pairwise assessment similarity score that quantitatively represents a degree of similarity between the distribution of the second set of contextual attribute values and the corresponding contextual attribute distribution of the reference state object that corresponds to the second distinct performance efficacy metric in response to executing the third automated pairwise assessment, computing a fourth pairwise assessment similarity score that quantitatively represents a degree of similarity between the distribution of the third set of contextual attribute values and the corresponding contextual attribute distribution of the reference state object that corresponds to the third distinct performance efficacy metric in response to executing the fourth automated pairwise assessment, and computing a fifth pairwise assessment similarity score that quantitatively represents a degree of similarity between the distribution of the fourth set of contextual attribute values and the corresponding contextual attribute distribution of the reference state object that corresponds to the fourth distinct performance efficacy metric in response to executing the fifth automated pairwise assessment.

In one embodiment, the computer-implemented system further includes automatically computing, by the one or more computer processors, an application similarity index score that quantitatively represents a degree of similarity between the test object and the reference state object based a combination of the first pairwise assessment similarity score, the second pairwise assessment similarity score, the third pairwise assessment similarity score, the fourth pairwise assessment similarity score, and the fifth pairwise assessment similarity score, and displaying, via a graphical user interface, the application similarity index score in association with the first pairwise assessment similarity score, the second pairwise assessment similarity score, the third pairwise assessment similarity score, the fourth pairwise assessment similarity score, and the fifth pairwise assessment similarity score.

In one embodiment, a computer-program product comprising a non-transitory machine-readable storage medium storing computer instructions that, when executed by one or more processors, perform operations including obtaining a test object that includes application usage data of an artificial intelligence (AI) inference endpoint for a target time span, wherein the test object includes: a set of inputs provided to the AI inference endpoint during the target time span, a set of outputs generated by the AI inference endpoint in response to processing the set of inputs, and a set of contextual attribute values collected during the processing of the set of inputs and the generation of the set of outputs by the AI inference endpoint; executing, in real-time by one or more computer processors, one or more endpoint behavior tests that assess an operational behavior of the AI inference endpoint by evaluating the test object against a reference state object associated with the AI inference endpoint, wherein executing the one or more endpoint behavior tests include: executing a first automated pairwise assessment between a distribution of the set of outputs and a corresponding output distribution of the reference state object, and executing a second automated pairwise assessment between a distribution of the set of contextual attribute values and a corresponding contextual attribute distribution of the reference state object; detecting, by the one or more computer processors, that a misbehavior occurred in the AI inference endpoint during the target time span and one or more deviant features contributing to the misbehavior in response to the one or more endpoint behavior tests indicating that at least one distributional deviation exists between the test object and the reference state object; and returning, by the one or more computer processors, the one or more deviant features contributing to the misbehavior to a subscribing entity associated with the AI inference endpoint, thereby enabling the subscribing entity to mitigate the misbehavior from occurring within the AI inference endpoint at a future time by modifying one or more parameters or components associated with the AI inference endpoint that correspond to the one or more deviant features.

In one embodiment, a computer-implemented method for accelerating a detection of anomalous behavior in a deployed artificial intelligence (AI) application includes obtaining, via an application programming interface (API), a test object that includes application usage data of the deployed AI application for a target time span, wherein the test object includes one or more of: a set of inputs provided to the deployed AI application during the target time span, a set of outputs generated by the deployed AI application in response to processing the set of inputs, a set of contextual attribute values collected during the processing of the set of inputs and the generation of the set of outputs by the deployed AI application, and a set of supplemental attribute values used during the generation of the set of outputs by the deployed AI application, executing, in real-time by one or more computer processors, one or more application behavior tests that assess an operational behavior of the deployed AI application by evaluating the test object against a reference state object associated with the deployed AI application, wherein executing the one or more application behavior tests includes: executing a first set of automated pairwise assessments between the test object and the reference state object assessing the operational behavior of the deployed AI application at an application output data level, executing a second set of automated pairwise assessments between the test object and the reference state object assessing the operational behavior of the deployed AI application at a contextual attribute data level, and executing a third set of automated pairwise assessments between the test object and the reference state object assessing the operational behavior of the deployed AI application at a supplemental attribute data level; detecting, by the one or more computer processors, when a misbehavior occurred in the deployed AI application during the target time span and one or more deviant features contributing to the misbehavior in response to the one or more application behavior tests indicating that at least one distributional deviation exists between the test object and the reference state object; and returning, by the one or more computer processors, the one or more deviant features contributing to the misbehavior to a subscribing entity associated with the deployed AI application, thereby enabling the subscribing entity to investigate and mitigate the misbehavior from occurring within the deployed AI application at a future time by modifying operational parameters of the deployed AI application corresponding to the one or more deviant features.

In one embodiment, the deployed AI application includes a plurality of distinct components that collectively operate to process the set of inputs and generate the set of outputs during the target time span, each distinct component of the plurality of distinct components of the deployed AI application performs a specific task that assists the deployed AI application in processing the set of inputs and generating the set of outputs during the target time span, the set of contextual attribute values contributes to a first performance efficacy metric that measures a performance characteristic of a first component of the plurality of distinct components, and the set of outputs corresponds to model outputs generated by a machine learning model of the plurality of distinct components.

In one embodiment, the computer-implemented method further includes generating, by the one or more computer processors, a plurality of distinct sets of text efficacy values of a plurality of distinct text efficacy metric types derived from the set of outputs generated by the deployed AI application during the target time span, wherein: each distinct set of text efficacy values of the plurality of distinct sets of text efficacy values corresponds to a distinct text efficacy metric type that enables numerical assessment of a textual characteristic associated with the set of outputs, executing the first set of automated pairwise assessments includes executing a respective automated pairwise assessment for each distinct text efficacy metric type of the plurality of distinct text efficacy metric types included in the test object, and the respective automated pairwise assessment executed for a subject distinct text efficacy metric type is performed between a distribution of a distinct set of text efficacy values included in the test object that corresponds to the subject distinct text efficacy metric type and a corresponding distribution of text efficacy values included in the reference state object that also corresponds to the subject distinct text efficacy metric type.

In one embodiment, executing the first set of automated pairwise assessments includes assessing a distribution of the set of outputs included in the test object against a distribution of a historical set of outputs included in the reference state object, and in response to assessing the distribution of the set of outputs included in the test object against the distribution of the historical set of outputs included in the reference state object, outputting a pairwise assessment finding that indicates a statistically significant drift or shift occurred in the deployed AI application associated with the test object relative to the reference state object.

In one embodiment executing the first set of automated pairwise assessments includes generating, by the one or more computer processors, a test distribution of a target evaluation metric (e.g., the target evaluation metric may correspond to an output text readability metric, an answer quality metric, an answer alignment fidelity metric, an answer fitness metric, a coherence metric, a committal metric, a completeness metric, a contextual relevance metric, a grammar accuracy metric, an originality metric, a reading complexity metric, a sentiment assessment metric, a text fluency metric, a toxicity metric, a token count metric, a word count metric, a text readability metric, a text toxicity metric, a grammatical correctness metric, or any other application behavior evaluation metric or text efficacy metric described herein) that is derived from the set of outputs included in the test object, generating, by the one or more computer processors, a reference distribution of the target evaluation metric derived from a historical set of outputs included in the reference state object, assessing, by the one or more computer processors, the test distribution of the target evaluation metric associated with the test object against the reference distribution of the target evaluation metric associated with the reference state object, and outputting a pairwise assessment finding that indicates a statistically significant drift or shift occurred in the deployed AI application during the target time span in response to assessing the test distribution of the target evaluation metric against the reference distribution of the target evaluation metric.

In one embodiment, executing the first set of automated pairwise assessments includes generating, by the one or more computer processors, a plurality of test distributions that correspond to a plurality of distinct evaluation metrics, wherein: each test distribution corresponds to a distinct one of the plurality of distinct evaluation metrics, and each test distribution is derived from the set of outputs included in the test object based on the distinct one of the plurality of distinct evaluation metrics; generating, by the one or more computer processors, a plurality of reference distributions that correspond to the plurality of distinct evaluation metrics, wherein: each reference distribution corresponds to a distinct one of the plurality of distinct evaluation metrics, and each reference distribution is derived from a historical set of reference outputs included in the reference state object based on the distinct one of the plurality of distinct evaluation metrics; assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

In one embodiment, executing the second set of automated pairwise assessments includes assessing a distribution of the set of contextual attribute values included in the test object against a distribution of a historical set of contextual attribute values included in the reference state object, and in response to assessing the distribution of the set of contextual attribute values included in the test object against the distribution of the historical set of contextual attribute values included in the reference state object, outputting a pairwise assessment finding that indicates a statistically significant drift or shift occurred in the deployed AI application associated with the test object relative to the reference state object.

In one embodiment, executing the second set of automated pairwise assessments includes generating, by the one or more computer processors, a test distribution of a target evaluation metric (e.g., the target evaluation metric may correspond to an text readability metric, an text quality metric, an text alignment fidelity metric, an text fitness metric, a coherence metric, a committal metric, a completeness metric, a contextual relevance metric, a grammar accuracy metric, an originality metric, a reading complexity metric, a sentiment assessment metric, a text fluency metric, a toxicity metric, a token count metric, a word count metric, a text readability metric, a text toxicity metric, a grammatical correctness metric, or any other application behavior evaluation metric or text efficacy metric described herein) that is derived from the set of contextual attribute values included in the test object, generating, by the one or more computer processors, a reference distribution of the target evaluation metric derived from a historical set of contextual attribute values included in the reference state object, assessing, by the one or more computer processors, the test distribution of the target evaluation metric associated with the test object against the reference distribution of the target evaluation metric associated with the reference state object, and outputting a pairwise assessment finding that indicates a statistically significant drift or shift occurred in the deployed AI application during the target time span in response to assessing the test distribution of the target evaluation metric against the reference distribution of the target evaluation metric.

In one embodiment, executing the second set of automated pairwise assessments includes generating, by the one or more computer processors, a plurality of test distributions that correspond to a plurality of distinct evaluation metrics, wherein: each test distribution corresponds to a distinct one of the plurality of distinct evaluation metrics, and each test distribution is derived from the set of contextual attribute values included in the test object based on the distinct one of the plurality of distinct evaluation metrics; generating, by the one or more computer processors, a plurality of reference distributions that correspond to the plurality of distinct evaluation metrics, wherein: each reference distribution corresponds to a distinct one of the plurality of distinct evaluation metrics, and each reference distribution is derived from a historical set of contextual attribute values included in the reference state object based on the distinct one of the plurality of distinct evaluation metrics; assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

In one embodiment, executing the third set of automated pairwise assessments includes assessing a distribution of the set of supplemental attribute values included in the test object against a distribution of a historical set of supplemental attribute values included in the reference state object, and in response to assessing the distribution of the set of supplemental attribute values included in the test object against the distribution of the historical set of supplemental attribute values included in the reference state object, outputting a pairwise assessment finding that indicates a statistically significant drift or shift occurred in the deployed AI application associated with the test object relative to the reference state object.

In one embodiment, executing the third set of automated pairwise assessments includes generating, by the one or more computer processors, a test distribution of a target evaluation metric (e.g., the target evaluation metric may correspond to a text readability metric, an text quality metric, an text alignment fidelity metric, an text fitness metric, a coherence metric, a committal metric, a completeness metric, a contextual relevance metric, a grammar accuracy metric, an originality metric, a reading complexity metric, a sentiment assessment metric, a text fluency metric, a toxicity metric, a token count metric, a word count metric, a text readability metric, a text toxicity metric, a grammatical correctness metric, or any other application behavior evaluation metric or text efficacy metric described herein) that is derived from the set of supplemental attribute values included in the test object, generating, by the one or more computer processors, a reference distribution of the target evaluation metric derived from a historical set of supplemental attribute values included in the reference state object, assessing, by the one or more computer processors, the test distribution of the target evaluation metric associated with the test object against the reference distribution of the target evaluation metric associated with the reference state object, and outputting a pairwise assessment finding that indicates a statistically significant drift or shift occurred in the deployed AI application during the target time span in response to assessing the test distribution of the target evaluation metric against the reference distribution of the target evaluation metric.

In one embodiment, executing the third set of automated pairwise assessments includes generating, by the one or more computer processors, a plurality of test distributions that correspond to a plurality of distinct evaluation metrics, wherein: each test distribution corresponds to a distinct one of the plurality of distinct evaluation metrics, and each test distribution is derived from the set of supplemental attribute values included in the test object based on the distinct one of the plurality of distinct evaluation metrics; generating, by the one or more computer processors, a plurality of reference distributions that correspond to the plurality of distinct evaluation metrics, wherein: each reference distribution corresponds to a distinct one of the plurality of distinct evaluation metrics, and each reference distribution is derived from a historical set of supplemental attribute values included in the reference state object based on the distinct one of the plurality of distinct evaluation metrics; assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

In one embodiment, the API is provided by an application behavior assessment and explainability service, the computer-implemented method further includes receiving a request, from the subscribing entity, to compute a plurality of distinct text efficacy values of a plurality of distinct text efficacy metric types for each distinct output of the set of outputs in response to the subscribing entity invoking an API function provided by the API, automatically computing, by the one or more computer processors, a plurality of distinct sets of text efficacy values of the plurality of distinct text efficacy metric types in response to receiving the request, wherein the plurality of distinct sets of text efficacy values includes at least: a first set of output text efficacy values corresponding to a first distinct text efficacy metric type, a second set of output text efficacy values corresponding to a second distinct text efficacy metric type, and a third set of output text efficacy values corresponding to a third distinct text efficacy metric type.

In one embodiment, the test object further includes the first set of output text efficacy values corresponding to the first distinct text efficacy metric type, the second set of output text efficacy values corresponding to the second distinct text efficacy metric type, and the third set of output text efficacy values corresponding to the third distinct text efficacy metric type, and executing the one or more application behavior tests further includes: executing a fourth automated pairwise assessment (e.g., fourth set of automated pairwise assessments or the like) between a distribution of the first set of output text efficacy values that corresponds to the first distinct text efficacy metric type and a corresponding data distribution of the reference state object that corresponds to the first distinct text efficacy metric type, executing a fifth automated pairwise assessment (e.g., fifth set of automated pairwise assessments or the like) between a distribution of the second set of output text efficacy values that corresponds to the second distinct text efficacy metric type and a corresponding data distribution of the reference state object that corresponds to the second distinct text efficacy metric type, and executing a sixth automated pairwise assessment (e.g., sixth set of automated pairwise assessments or the like) between a distribution of the third set of output text efficacy values that corresponds to the third distinct text efficacy metric type and a corresponding data distribution of the reference state object that corresponds to the third distinct text efficacy metric type.

In one embodiment, in response to executing the fourth automated pairwise assessment, the fifth automated pairwise assessment, and the sixth automated pairwise assessment: detecting, by the one or more computer processors, that a statistically significant drift or shift occurred in one of: the distribution of the first set of output text efficacy values associated with the test object, the distribution of the second set of output text efficacy values associated with the test object, and the distribution of the third set of output text efficacy values associated with the test object.

In one embodiment, the computer-implemented method further includes: surfacing, via a graphical user interface, the misbehavior that occurred in the deployed AI application at one or more levels of granularity, wherein surfacing the misbehavior includes one or more of: surfacing, by the graphical user interface, a single distribution of contextual attribute values, supplemental attribute values, or evaluation metrics derived from the set of outputs included in the test object that contributed to the misbehavior, and surfacing, by the graphical user interface, a single distinct application component of a plurality of distinct application components implemented by the deployed AI application whose component behavior contributed to the misbehavior.

In one embodiment, the computer-implemented method further includes presenting, by the one or more computer processors, a representation of a shift in the operational behavior of the deployed AI application during the target time span, wherein the computer-implemented method presents the shift as manifesting in a statistically meaningful fashion at one or more of: a single distribution of contextual attributes, supplemental attributes, or evaluation metrics derived from the set of outputs, the set of contextual attribute values, or the set of supplemental attribute values, a component-level accumulation of behavioral findings from all application behavior tests and respective automated pairwise assessments corresponding to a respective (e.g., single) distinct component of the deployed AI application, and an application-level accumulation of behavioral findings from all application behavior tests and associated automated pairwise assessments executed for the deployed AI application.

In one embodiment, in response to executing the fourth automated pairwise assessment, the fifth automated pairwise assessment, and the sixth automated pairwise assessment: detecting, by the one or more computer processors, that a statistically significant drift or shift did not occur in one of: the distribution of the first set of output text efficacy values associated with the test object, the distribution of the second set of output text efficacy values associated with the test object, and the distribution of the third set of output text efficacy values associated with the test object.

In one embodiment, the computer-implemented method further includes automatically generating, by the one or more computer processors, an application behavior alert in response to detecting that the misbehavior occurred in the deployed AI application during the target time span, and transmitting, in real-time, the application behavior alert to the subscribing entity associated with the deployed AI application using a real-time messaging service.

In one embodiment, the computer-implemented method further includes instantiating, by the one or more computer processors, an application behavior user interface that includes a selectable test execution button; receiving, from the subscribing entity associated with the deployed AI application, a first user input selecting the selectable test execution button displayed on the application behavior user interface; instantiating, by the one or more computer processors, an application behavior test configuration user interface object overlaid on the application behavior user interface in response to receiving the first user input; receiving, via the application behavior test configuration user interface object, a sequence of one or more additional user inputs from the subscribing entity that: (i) selects the reference state object as a baseline application behavior for the deployed AI application, (ii) selects the test object to be assessed against the reference state object, (iii) selects the one or more application behavior tests to be executed during the assessment of the operational behavior of the deployed AI application, and (iv) selects a set of application behavior tests not to be executed during the assessment of the operational behavior of the deployed AI application; and initiating, by the one or more computer processors, the execution of the one or more application behavior tests that assess the operational behavior of the deployed AI application in response to the subscribing entity selecting a test confirmation button displayed on the application behavior test configuration user interface object.

In one embodiment, the application behavior user interface further includes an application behavior assessment visualization that includes a plurality of distinct selectable markers, wherein: each distinct selectable marker of the plurality of distinct selectable markers corresponds to a distinct application behavior assessment of the deployed AI application, and each distinct application behavior assessment executed a respective set of application behavior tests to assess the operational behavior of the deployed AI application for a respective time span, and an application behavior assessment matrix that includes a plurality of distinct selectable application behavior assessment rows, wherein: each distinct selectable application behavior assessment row of the plurality of distinct selectable application behavior assessment rows corresponds to a respective application behavior assessment performed for the deployed AI application.

In one embodiment, the computer-implemented method further includes receiving, via the application behavior user interface, an input from the subscribing entity selecting a selectable marker of the plurality of distinct selectable markers, wherein the distinct application behavior assessment corresponding to the selectable marker selected by the subscribing entity executed the one or more application behavior tests; instantiating, by the one or more computer processors, an application behavior assessment details user interface that corresponds to the distinct application behavior assessment that executed the one or more application behavior tests in response to receiving the input from the subscribing entity selecting the selectable marker, wherein the application behavior assessment details user interface includes: a total number of the one or more application behavior tests that satisfied distribution test criteria of the one or more application behavior tests, a total number of the one or more application behavior tests that did not satisfy the distribution test criteria of the one or more application behavior tests, an application similarity index score that quantitatively represents a degree of similarity between the test object and the reference state object, and a plurality of distinct selectable key insights rows that correspond to the one or more deviant features contributing to the misbehavior.

In one embodiment, the computer-implemented method further includes receiving, from the subscribing entity, a selection input of a target selectable key insights row of the plurality of distinct selectable key insights rows that corresponds to the second set of automated pairwise assessments; and instantiating, by the one or more computer processors, a pairwise assessment details user interface that corresponds to the second set of automated pairwise assessments in response to receiving the selection input of the target selectable key insights row that corresponds to the second set of automated pairwise assessments from the subscribing entity, wherein the pairwise assessment details user interface includes: a distribution deviation assessment visualization that graphically illustrates a distribution of the set of contextual attribute values associated with the test object superimposed or overlaid over a corresponding contextual attribute distribution of the reference state object, and a pairwise assessment similarity score that quantitatively represents a degree of similarity between the distribution of the set of contextual attribute values associated with the test object and the corresponding contextual attribute distribution of the reference state object.

In one embodiment, the computer-implemented method further includes automatically computing, by the one or more computer processors, an application similarity index score that quantitatively represents a degree of similarity between the test object and the reference state object based on a combination of the set of outputs, the set of contextual attribute values, the set of supplemental attribute values, and one or more derived sets of evaluation metrics, and displaying, via a graphical user interface, the application similarity index score accumulated at an individual metric level, a distinct component level, or across the entire deployed AI application.

BRIEF DESCRIPTION OF THE FIGURES

FIG. 2 illustrates an example method 200 in accordance with one or more embodiments of the present application;

FIG. 3 illustrates an example of a test object in accordance with one or more embodiments of the present application;

FIG. 4 illustrates an example of a reference state object in accordance with one or more embodiments of the present application;

FIGS. 7-10 illustrate examples of executing application behavior tests and automated pairwise assessments in accordance with one or more embodiments of the present application.

DESCRIPTION OF THE PREFERRED EMBODIMENTS

Figure 1:
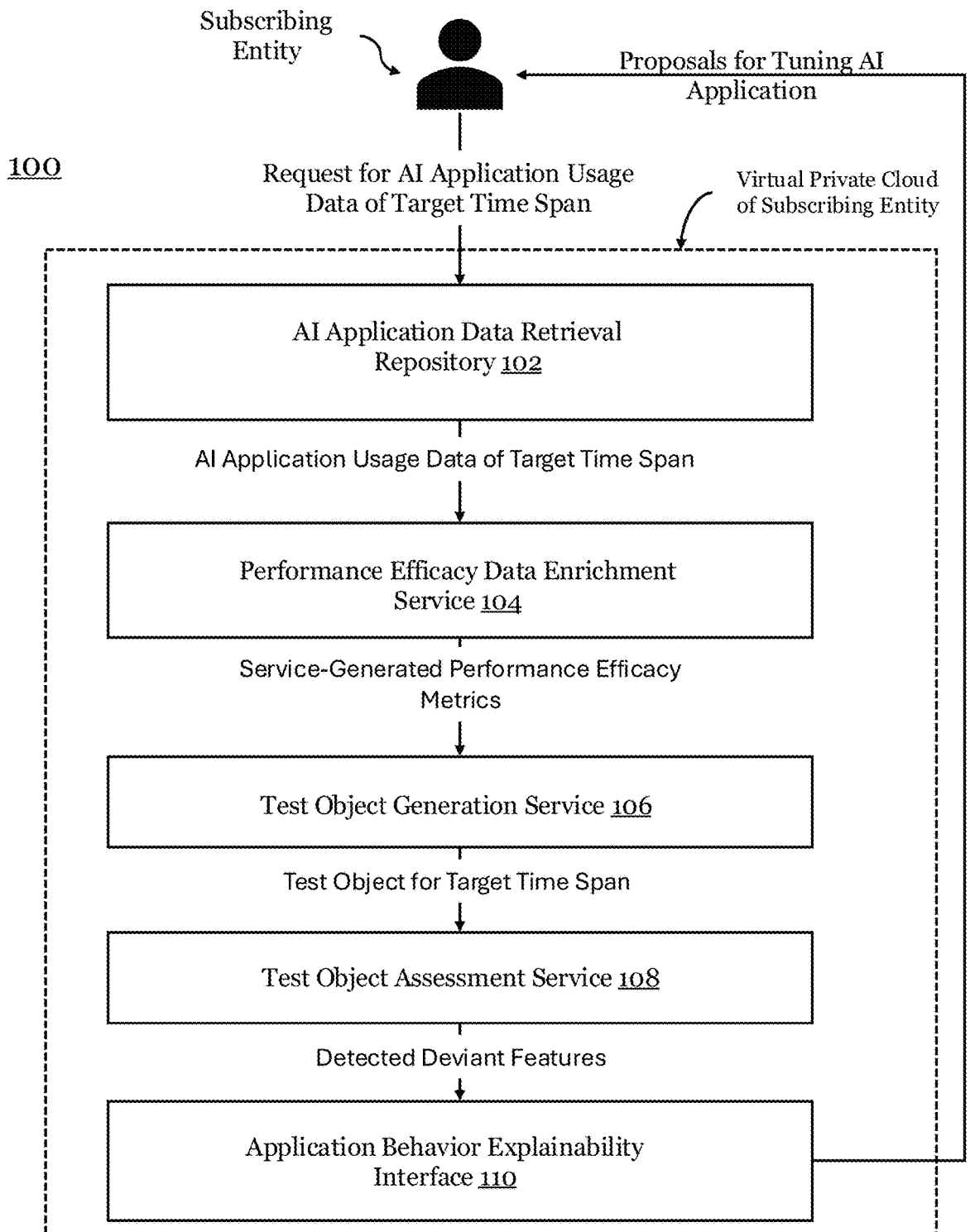
FIG. 1 illustrates a schematic representation of a system 100 in accordance with one or more embodiments of the present application.

The following description of the preferred embodiments of the invention is not intended to limit the inventions to these preferred embodiments, but rather to enable any person skilled in the art to make and use these inventions.

The systems, methods, and embodiments described herein may be used in a variety of technology areas where the reliability of deployed AI applications is critical to maintaining functional integrity, user trust, and overall system performance. Such AI applications may include, but should not limited to, conversational agents, virtual assistants, automated decisioning services, machine learning-based recommendation systems, document classification services, content moderation services, fraud detection services, and any other suitable application that uses one or more machine learning models to perform predictive or generative tasks that have real-time or near real-time operating requirements.

Deployed AI applications behave differently than traditional software-based systems because their operational behavior depends not only on input data, but also on one or more machine learning models that generate predictions based on the input data. As a result, the operational behavior of a deployed AI application can change over time even when no configuration changes are made to the one or more machine learning models or the deployed AI application. Conventional systems and services are unable to detect, quantify, or explain behavioral changes in a deployed AI application due to the complex and opaque (e.g., black box) nature of the one or more machine learning models underpinning the deployed AI application.

Conversely, the systems, methods, and embodiments described herein provide mechanisms to continuously, periodically, and/or adaptively assess the operational behavior of the deployed AI application to minimize the amount of time the deployed AI application operates in an undesired or unpredictable state. In other words, the systems, methods, and embodiments described herein are capable of detecting, quantifying, and explaining any behavioral change that may occur in a deployed AI application.

For instance, in some embodiments, the systems, methods, and computer-program products described herein may automatically assess a test object associated with a deployed AI application against a reference state object associated with the same deployed AI application. At least one technical advantage of assessing the test object associated with the deployed AI application against the reference state object associated with the same deployed AI application may enable the detection of behavioral deviations, performance regressions, or anomalies that arise during runtime operation of the deployed AI application. Furthermore, another technical advantage of such assessment may enable the detection of one or more deviant features that are contributing to the detected behavioral deviation.

Furthermore, in some embodiments, the systems, methods, and computer-program products described herein may receive (or generate) a test object that includes data representing the operational behavior of a deployed AI application for a target time span. The test object may include a tabular dataset comprising a plurality of distinct columns and a plurality of distinct rows. Each column may represent a distinct behavioral signal, metric, or feature associated with the deployed AI application-while each row may represent a distinct execution event or inference produced by the deployed AI application during the target time span. That is, in some embodiments, the tabular dataset may represent a sequence of model behaviors over time, structured such that each row corresponds to a distinct application execution event processed by the deployed AI application during the target time span, and each column represents a specific behavioral dimension, behavioral characteristic, or behavioral feature of the deployed AI application's behavior during the target time span.

Accordingly, in such embodiments, the systems, methods, and computer-program products described herein may function to receive or elect a reference state object for use in assessing the test object. The reference state object may also include a tabular dataset structured with a plurality of distinct columns and a plurality of distinct rows. The reference state object may reflect a steady-state or otherwise expected operational profile of the deployed AI application over a time span different from that of the test object. In some embodiments, the columns of the reference state object may be equivalent with those of the test object such that each column in the reference state object corresponds to the same behavioral signal, metric, or feature represented in the test object. This structural alignment allows the system or service implementing method 200 to perform one or more column-level assessments of behavioral characteristics across different time spans, enabling the detection of distributional changes in the operational behavior of the deployed AI application that may indicate behavioral drift, performance regression, or other anomalous patterns.

In some embodiments, the systems, methods, and computer-program products described herein may perform one or more column-level assessments (e.g., one or more automated pairwise assessments) between the test object and the reference state object to detect if any distributional changes occurred in the operational behavior of the deployed AI application during the target time span. It shall be recognized that, in some embodiments, the system or service implementing method 200 may function to perform an analytical (e.g., statistical) assessment between the distributions of values for each column shared between the test object and the reference state object.

For example, a first column of the tabular dataset of the test object may correspond to a first behavioral metric or feature associated with the deployed AI application and a first column of the tabular dataset of the reference state object may correspond to the same behavioral metric or feature. The system or service implementing method 200 may assess the distribution of values in the first column of the test object against the distribution of values in the first column of the reference state object to determine whether a distributional change occurred. If the assessment detects a statistically significant or meaningful difference between the data distributions, the system or service may detect the first column as a deviant feature.

In another example, a second column of the tabular dataset of the test object may correspond to a second behavioral metric or feature associated with the deployed AI application and a second column of the tabular dataset of the reference state object may correspond to the same behavioral metric or feature. The system or service implementing method 200 may assess the distribution of values in the second column of the test object against the distribution of values in the second column of the reference state object to determine whether a distributional change occurred. If the assessment detects a statistically significant or meaningful difference between the data distributions, the system or service may detect the second column as a deviant feature.

It shall be recognized that process may be repeated for each shared column (or at least a majority of the shared columns) between the test object and the reference state object, thereby enabling automated misbehavior detection and identification of the deviant features (e.g., deviant columns, etc.) contributing to the misbehavior.

In some embodiments, the one or more deviant columns detected through the column-level assessments may highlight specific aspects of the deployed AI application's behavior that have changed and may require investigation or adjustment. For example, when a deviant column (e.g., deviant feature) corresponds to output token length, the behavioral distribution change may be caused by subtle shifts in the structure or semantics of input data, resulting in longer or shorter output responses than expected. In another example, when a deviant column corresponds to prediction confidence, the behavioral deviation may stem from an inadvertent machine learning model swap-such as an upgrade from GPT-3 to GPT-4—introducing new output response patterns or decision boundaries not present in the original deployment (e.g., reference state object). In another example, when a deviant column corresponds to embedding generation latency, the behavioral distribution deviation may reflect infrastructure variability, resource contention, or performance degradation in the embedding service itself, leading to slower downstream performance in search, retrieval, and/or ranking workflows. Thus, the detection of deviant columns (e.g., deviant features) not only localizes the behavioral drift but also intelligently guides where and how the deployed AI application should be updated, retrained, or reconfigured to restore expected performance.

At least one technical benefit of detecting deviant columns (e.g., deviant features) enables the system or service implementing method 200, or the subscribing entity associated with the deployed AI application, to take targeted and informed remediation actions in response to detecting the behavioral drift or shift. By detecting specific metrics, columns, or features that have deviated, the system or service implementing method 200 can surface precise insights and recommendations that reduce the need for trial-and-error debugging across all components or modules used by the deployed AI application. That is, rather than exhaustively investigating every component of the deployed AI application, the system or service implementing method 200 can isolate the behavioral deviation to a specific dimension of behavior (e.g., behavioral feature) and the corresponding component of the deployed AI application most likely responsible for the misbehavior.

Furthermore, conventional systems and services are unable to detect behavioral changes that have occurred in the deployed AI application, much less intelligently surface deviant features in a manner that supports targeted remediation of the deployed AI application. The inability to understand how or when a deployed AI application misbehaved is inherently problematic for the subscribing entity that has deployed the AI application. That is, without visibility into which behavioral dimensions or features of the deployed AI application are misbehaving—and to what extent—the subscribing entity is unable to understand whether the outputs of the deployed AI application are reliable, trustworthy, or suitable for continued use, and therefore cannot determine whether the deployed AI application should remain deployed.

The systems, methods, and computer-program products described herein overcome the above-mentioned problems by generating intuitive graphical user interfaces that intelligently explains a behavioral change in a deployed AI application and the associated deviant features contributing to the behavioral change. Therefore, unlike conventional approaches that offer no transparency or explainability into detecting and explaining behavioral changes in the deployed AI application, the systems, methods, and computer-program products described herein provide such transparency and explainability.

For instance, some of the systems, methods, and computer-program products described herein, may compute an application similarity index score that quantitatively represents a degree of similarity between the test object and the reference state object and, in turn, display the computed application similarity index score on a graphical user interface. Furthermore, using the graphical user interface, the systems, methods, and computer-program products described herein may surface the one or more detected deviant features (e.g., deviant columns, deviant metrics, etc.) and their corresponding column-level similarity score (e.g., pairwise assessment similarity score, pairwise assessment column similarity score, etc.). Such a graphical user interface may further include visual indicators describing the direction and nature of the behavioral drift (e.g., distribution substantially drifted to the left or right) for each detected deviant feature. Surfacing this information within the graphical interface enables the subscribing entity to evaluate the behavioral state of the deployed AI application, identify specific features contributing to observed deviations or misbehaviors, and initiate remediation tasks that reconfigures the deployed AI application when necessary.

Additionally, in some of the systems, methods, and computer-program products described herein, a graphical user interface may be generated that graphically displays a distribution deviation assessment of a target column (e.g., metric, attribute, feature, etc.) shared between the test object and the reference state object. The graphical user interface may graphically illustrate the data distribution of the set of values corresponding to the target column in the test object, superimposed or overlaid over the data distribution of the set of values corresponding to the same target column in the reference state object. The graphical user interface may further display a pairwise assessment similarity score that quantitatively represents a degree of similarity between the two data distributions. This combination of graphical and quantitative feedback enables the subscribing entity to assess whether the behavioral signal represented by the target column-such as output token length—has meaningfully changed between the test object and the reference state object, and to determine whether the deviation indicates drift or shift requiring remediation.

Additionally, in some embodiments, in response to detecting that the deployed AI application misbehaved, the subscribing entity or the system or service implementing method 200 may execute one or more corrective remediation tasks to prevent the deployed AI application from misbehaving in the future. Executing the one or more corrective remediation tasks may include, but is not limited to, retraining one or more machine learning models used by the deployed AI application, reverting to a prior application version or configuration known to exhibit steady-state behavior, modifying prompt structures or inference parameters, reconfiguring upstream or downstream application dependencies, or applying targeted code or infrastructure fixes to specific software components causing the deviant features. Such corrective actions may be initiated by the subscribing entity or triggered programmatically under defined conditions, with the objective of improving the operational behavior of the deployed AI application and mitigating the risk of future misbehavior.

1. System for Detecting and Explaining Anomalous Behavior in a Deployed Artificial Intelligence (AI) Application As shown in FIG. 1, a system 100 for detecting and explaining anomalous behavior in an AI Application may include an AI application data retrieval repository 102, a performance efficacy data enrichment service 104, a test object generation service 106, a test object assessment service 108, and an application behavior explainability interface 110. The system 100 may sometimes be referred to herein as an AI misbehavior detection and explainability service, an application misbehavior detection and interpretability service, or the like. The AI misbehavior detection and explainability service, in one or more embodiments, may be implemented by a network of distributed computers.

The system 100 may enable real-time misbehavior detection and explainability of deployed AI applications and in-development AI applications. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

1.1 AI Application Data Retrieval Repository

The AI application data retrieval repository 102, sometimes referred to herein as the "AI application usage data retrieval service" may be operably configured to obtain or retrieve application usage data associated with a target AI application in response to receiving a request from a subscribing entity. The subscribing entity may be a user, a software application, or any other suitable system or service configured to automatically initiate data retrieval tasks based on a predetermined interval (e.g., every month, every week, every day, every hour, etc.) or as part of an on-demand request initiated by an AI application behavior assessment service.

The AI application data retrieval repository 102, in one or more embodiments, may function to receive a request, from the subscribing entity, to obtain all application usage data corresponding to a deployed AI application for a target time span (e.g., past twenty-four (24) hours, etc.) and, in turn, the AI application data retrieval repository 102 may function to return or output the requested AI application usage data that satisfies the request. The AI application usage data may include a set of inputs provided to the deployed AI application during the target time span, a set of outputs generated by the deployed AI application during the target time span in response to processing the set of inputs, and/or one or more distinct sets of subscriber-specific performance efficacy metrics computed based on or derived from the input-output behavior of the deployed AI application during the target time span.

The subscriber-specific performance efficacy metrics, in some embodiments, may be derived from, or otherwise associated with, specific application executions and may reflect quantitative assessments of how the deployed AI application responded to the received inputs, such as response latency, fairness metrics, prediction accuracy, processing throughput, error rates, compute resource utilization, or any other suitable quantitative or qualitative measure defined by the subscribing entity to characterize the operational behavior of the deployed AI application.

It shall be recognized that the deployed AI application may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. In some embodiments, the deployed AI application may further employ any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), one or more large language models (e.g., GPT-3, GPT-3.5, GPT-4, GPT-4O, Claude 1, Claude 2, Claude 3, LLAMA-7B, LLAMA-13B, LLAMA-65B, LLAMA-2-7B, LLAMA-2-13B, LLaMA-2-70B, Grok, or any other fine-tuned language model), and any other suitable form of machine learning algorithm.

1.2 Performance Efficacy Data Enrichment Service

The performance efficacy data enrichment service 104, sometimes referred to herein as the "data enrichment service" may be operably configured to process the AI application usage data retrieved for the target time span and, in turn, generate an enriched behavioral representation of the deployed AI application for the target time span.

The performance efficacy data enrichment service 104, in some embodiments, may function to compute a plurality of distinct service-generated performance efficacy metrics based on a type of data included in the AI application usage data retrieved for the target time span. In other words, the performance efficacy metrics computed by the data enrichment service 104 may vary depending on whether the retrieved AI application usage data includes text data, numerical data, categorical data, image data, audio data, or any other suitable data type. For instance, when the set of outputs included in the AI application usage data corresponds to textual data, the performance efficacy data enrichment service 104 may function to compute a plurality of distinct text-specific evaluation metric values for each respective output included in the set of outputs (e.g., total number of words in each respective output, total number of tokens in each respective output, total number of characters in each respective output, average sentence length associated with each respective output, grammaticality score associated with each respective output, readability score associated with each respective output, sentiment polarity associated with each respective output, etc.). These performance efficacy metrics (e.g., text-specific evaluation metric values) may be computed independently for each distinct output and may serve to quantify various linguistic, structural, and semantic attributes of the generated text, thereby enabling more comprehensive behavioral characterization of the deployed AI application.

It shall be recognized that, in one or more embodiments, the service-generated performance efficacy metrics (e.g., service-generated performance efficacy evaluation metrics) may differ from the subscriber-specific performance efficacy metrics (e.g., subscriber-specific performance efficacy evaluation metrics) in that they are automatically computed by the system 100 based on predetermined evaluation procedures rather than being provided or defined by the subscribing entity.

It shall be further recognized that, in some embodiments, at least a subset of the service-generated performance efficacy metrics may have been computed or derived by the system 100 using a machine learning model (e.g., large language model (LLM), etc.).

For instance, in a non-limiting example, the system or service implementing method 200 may have computed one or more of an answer quality metric (e.g., answer_quality_llm_accuracy) for a respective output using a large language model, an answer alignment fidelity metric (e.g., answer_quality_llm_alignment_fidelity) for the respective output using the large language model, an answer fitness metric (e.g., answer_quality_llm_answer_fitness) for the respective output using the large language model, a coherence metric (e.g., answer_quality_llm_coherence) for the respective output using the large language model, a committal metric (e.g., answer_quality_llm_commital) for the respective output using the large language model, a completeness metric (e.g., answer_quality_llm_completeness) for the respective output using the large language model, a contextual relevance metric (e.g., answer_quality_llm_contextual_relevance) for the respective output using the large language model, a grammar accuracy metric (e.g., answer_quality_llm_grammar_accuracy) for the respective output using the large language model, an originality metric (e.g., answer_quality_llm_originality) for the respective output using the large language model, a reading complexity metric (e.g., answer_viability_llm_reading_complexity) for the respective output using the large language model, a sentiment assessment metric (e.g., answer_viability_llm_sentiment_assessment) for the respective output using the large language model, a text fluency metric (e.g., answer_viability_llm_text_fluency) for the respective output using the large language model, and a toxicity metric (e.g., answer_viability_llm_text_toxicity) for the respective output using the large language model, as described in U.S. Provisional Application No. 63/809,483, filed 21 May 2025, which is incorporated in its entirety by this reference.

Stated another way, in some embodiments, the system or service implementing method 200 may have computed one or more of an answer quality metric (e.g., answer_quality_llm_accuracy) for each respective output included in the set of outputs using a large language model, an answer alignment fidelity metric (e.g., answer_quality_llm_alignment_fidelity) for each respective output included in the set of outputs using the large language model, an answer fitness metric (e.g., answer_quality_llm_answer_fitness) for each respective output included in the set of outputs using the large language model, a coherence metric (e.g., answer_quality_llm_coherence) for each respective output included in the set of outputs using the large language model, a committal metric (e.g., answer_quality_llm_commital) for each respective output included in the set of outputs using the large language model, a completeness metric (e.g., answer_quality_llm_completeness) for each respective output included in the set of outputs using the large language model, a contextual relevance metric (e.g., answer_quality_llm_contextual_relevance) for each respective output included in the set of outputs using the large language model, a grammar accuracy metric (e.g., answer_quality_llm_grammar_accuracy) for each respective output included in the set of outputs using the large language model, an originality metric (e.g., answer_quality_llm_originality) for each respective output included in the set of outputs using the large language model, reading complexity metric (e.g., answer_viability_llm_reading_complexity) for each respective output included in the set of outputs using the large language model, a sentiment assessment metric (e.g., answer_viability_llm_sentiment_assessment) for each respective output included in the set of outputs using the large language model, a text fluency metric (e.g., answer_viability_llm_text_fluency) for each respective output included in the set of outputs using the large language model, and a toxicity metric (e.g., answer_viability_llm_text_toxicity) for each respective output included in the set of outputs using the large language model, as described in U.S. Provisional Application No. 63/809,483, filed 21 May 2025, which is incorporated in its entireties by this reference.

It shall be recognized that, in some embodiments, the answer quality metric computed for the respective output may represent a factual accuracy and/or semantic appropriateness of the respective output relative to a corresponding input and context data; the answer alignment fidelity metric computed for the respective output may quantitatively represent a degree of similarity between the respective output and a specified target response relative to semantic meaning, structural similarity and/or intended meaning; the answer fitness metric computed for the respective output may represent a machine learning-based assessment of the suitability, helpfulness, and informativeness of the respective output in the context of the input and associated context data; the coherence metric computed for the respective output may represent a machine learning-based evaluation of the internal logical consistency, structural flow, and semantic connectedness of the respective output; the committal metric computed for the respective output may indicate a degree to which the respective output expresses clear, assertive, and/or unambiguous statements; the completeness metric computed for the respective output may represent a machine learning-based evaluation of whether the respective output sufficiently addresses all relevant aspects of the corresponding input query; the contextual relevance metric computed for the respective output may represent the extent to which the respective output is informed by or based on the context data associated with a respective input; a grammar accuracy metric computed for the respective output may represent a machine learning-based evaluation of the grammatical correctness, syntactic structure, and adherence to conventional language rules within the respective output; the originality metric computed for the respective output may represent a machine learning-based assessment of the novelty, creativity, or non-redundancy of the respective output relative to historical or previously seen responses; the reading complexity metric computed for the respective output may represent a machine learning-based evaluation of the linguistic difficulty, structural intricacy, and/or overall ease or challenge associated with comprehending the respective output; the sentiment assessment metric computed for the respective output may represent a machine learning-based evaluation of the emotional tone, affective stance, or attitudinal expression conveyed by the respective output; the text fluency metric computed for the respective output may represent a machine learning-based evaluation of the linguistic naturalness, grammatical smoothness, and syntactic coherence of the respective output; and the toxicity metric computed for the respective output may represent a machine learning-based assessment of the presence or likelihood of harmful, offensive, abusive, or otherwise inappropriate language within the respective output.

1.3 Test Object Generation Service

The test object generation service 106, sometimes referred to herein as the "test object generator" may be operably configured to generate a test object that includes a structured representation of the AI application usage data retrieved from the AI application data retrieval repository 102, together with the service-generated performance efficacy metrics computed by the performance efficacy data enrichment service 104.

The test object, in one or more embodiments, may include a tabular data set comprising a plurality of rows, wherein each row corresponds to a distinct execution instance of the deployed AI application during the target time span (e.g., a single input-output pair). Each row may include a plurality of columns that capture data attributes, performance metrics, or contextual metadata associated with that execution instance. For example, a first subset of the plurality of columns may correspond to subscriber-specific performance efficacy metrics such as those provided by the subscribing entity and a second subset of the plurality of columns may correspond to service-generated performance efficacy metrics computed by the performance efficacy data enrichment service 104.

At least one technical benefit of generating the tabular dataset may enable the transformation of unstructured or semi-structured AI application usage data and service-generated performance efficacy metrics into a structured, machine-readable format that can be readily consumed by downstream components, such as the test object assessment service 108, for automated pairwise comparison, similarity scoring, and misbehavior detection.

1.4 Test Object Assessment Service

The test object assessment service 108, sometimes referred to herein as the "AI application assessment service" may be operably configured to receive the test object generated by the test object generation service 106 and assess the test object against a reference state object that corresponds to the deployed AI application.

The test object assessment service 108 may be configured to assess data distributions of corresponding columns in the test object and the reference state object to determine whether statistically significant deviations, distributional shifts, or anomalous patterns are present.

For example, a first column of the test object may store a set of values (e.g., five hundred (500) values, one million (1,000,000) values) that correspond to a subscriber-specific performance efficacy metric-such as response latency-observed from the deployed AI application during the target time span, and a first column of the reference state object may store a set of values (e.g., four hundred (400) values, two million (2,000,000) values, etc.) for the same subscriber-specific performance efficacy metric observed from the deployed AI application during a different or baseline time span. In such an example, the test object assessment service 108 may function to assess a data distribution of the set of values stored in the first column of the test object against a data distribution of the set of values stored in the first column of the reference state object to determine whether a statistically significant data distribution shift or drift has occurred that may indicate a misbehavior occurred in the deployed AI application during the target time span.

Furthermore, in such an example, test object assessment service 108 may function to compute a degree of distribution similarity between the data distribution of the set of values stored in the first column of the test object and the data distribution of the set of values stored in the first column of the reference state object. The degree of distribution similarity may be computed using one or more statistical or distance-based techniques (e.g., Kolmogorov-Smirnov test, Jensen-Shannon divergence, Chi-squared test), and may also be referred to herein as a column-level similarity score. Accordingly, if the degree of distribution similarity fails to satisfy a predetermined distribution similarity threshold value, the test object assessment service 108 may detect that a misbehavior occurred in the deployed AI application for the target time span and the deviant feature may correspond to the subscriber-specific performance efficacy metric (e.g., response latency).

In another example, a second column of the test object may store a set of values (e.g., five hundred (500) values, one million (1,000,000) values) that corresponds to a service-generated performance efficacy metric (e.g., output text readability, answer quality metric, answer alignment fidelity metric, answer fitness metric, coherence metric, committal metric, completeness metric, contextual relevance metric, grammar accuracy metric, originality metric, reading complexity metric, sentiment assessment metric, text fluency metric, toxicity metric, etc.) observed from the deployed AI application during the target time span, and a second column of the reference state object may store a set of values (e.g., four hundred (400) values, two million (2,000,000) values, etc.) for the same service-generated performance efficacy metric observed from the deployed AI application during a different or baseline time span. In such an example, the test object assessment service 108 may function to assess a data distribution of the set of values stored in the second column of the test object against a data distribution of the set of values stored in the second column of the reference state object to determine whether a statistically significant data distribution shift or drift has occurred that may indicate a misbehavior occurred in the deployed AI application during the target time span.

Furthermore, in such an example, test object assessment service 108 may function to compute a degree of distribution similarity between the data distribution of the set of values stored in the second column of the test object and the data distribution of the set of values stored in the second column of the reference state object. The degree of distribution similarity may be computed using one or more statistical or distance-based techniques (e.g., Kolmogorov-Smirnov test, Jensen-Shannon divergence, Chi-squared test), and may also be referred to herein as a column-level similarity score. Accordingly, when the degree of distribution similarity fails to satisfy a predetermined distribution similarity threshold value, the test object assessment service 108 may detect that a misbehavior occurred in the deployed AI application for the target time span and the deviant feature may correspond to the service-generated performance efficacy metric (e.g., output text readability, answer quality metric, answer alignment fidelity metric, answer fitness metric, coherence metric, committal metric, completeness metric, contextual relevance metric, grammar accuracy metric, originality metric, reading complexity metric, sentiment assessment metric, text fluency metric, toxicity metric, etc.).

Additionally, or alternatively, in some embodiments, the test object assessment service 108 may function to compute a degree of similarity across all corresponding columns of the test object and the reference state object, thereby generating a global or application-level similarity score. The application-level similarity score may be derived by aggregating individual column-level similarity scores (e.g., through weighted averaging) to provide a unified quantitative measure of overall behavioral alignment between the test object and the reference state object. If the computed application-level similarity score fails to satisfy a predetermined global similarity threshold value, the test object assessment service 108 may detect that the deployed AI application exhibited a behavioral deviation indicative of widespread misbehavior during the target time span.

1.5 Application Behavior Explainability User Interface

The application behavior explainability user interface 110, sometimes referred to herein as the "explainability UI" may be operably configured to render, display, and present interactive visualizations, intelligent insights, and explainable artifacts derived based on assessment findings outputted by the test object assessment service 108.

The explainability UI 110, in some embodiments, may surface one or more deviant features detected during the behavioral assessment of the deployed AI application, including specific columns, metrics, or data attributes determined to have contributed to the detected misbehavior. Such deviant features may be visually emphasized or annotated within the application behavior explainability user interface 110 to assist users (e.g., subscribing entities) in tracing behavioral anomalies to specific aspects of application performance. In addition, the explainability UI 110 may display corresponding column-level similarity scores and an overall application-level similarity score associated with the deployed AI application, thereby providing quantitative context for the degree of deviation observed during the target time span.

Example graphical user interfaces are described in more detail in method 200 and FIGS. 11-19 and 20A-20O. These example graphical user interfaces may guide a subscribing entity or user's attention toward the most impactful deviant features, highlight evaluation metrics that contributed to the detected misbehavior, and/or streamline application diagnostic and reconfiguration efforts by pinpointing specific components of the deployed AI application that exhibited unexpected behavioral patterns during the target time span.

2. Method for Accelerating a Detection of Anomalous Behavior in a Deployed Artificial Intelligence (AI) Application As shown in FIG. 2, a method 200 for accelerating a detection of anomalous behavior in a deployed AI application may include obtaining a test object that includes application usage data of the deployed AI application for a target time span S210, executing, in real-time by one or more computer processors, one or more application behavior tests that assess an operational behavior of the deployed AI application by evaluating the test object against a reference state object associated with the deployed AI application S220, detecting, by the one or more computer processors, that a misbehavior occurred in the deployed AI application during the target time span and one or more deviant features contributing to the misbehavior in response to executing the one or more application behavior tests S230, and returning, by the one or more computer processors, the one or more deviant features contributing to the misbehavior to a subscribing entity associated with the deployed AI application S240.

2.1 Obtaining a Test Object

S210, which includes obtaining a test object, may function to obtain, via an application programming interface (API), a test object that includes application usage data of a deployed AI application for a target time span. A test object, as generally referred to herein, may be a representation of the application usage data of the deployed AI application in a machine-readable format (e.g., Pandas DataFrame, JavaScript Object Notation (JSON), etc.) that can be evaluated by a system or service implementing method 200 to detect whether the deployed AI application misbehaved during the target time span. It shall be recognized that the phrase "test object" may be interchangeably referred to herein as a "test data object," a "current application behavior data object," an "observed application behavior data object," "experimental data object," and/or the like.

In one or more embodiments, a subscribing entity may automatically generate a test object that includes application usage data of a deployed AI application for a target time span and, in turn, automatically transmit, over a computer network, the generated test object to the system or service implementing method 200. In such an embodiment, while the deployed AI application is actively running and servicing requests in a production environment, an event logging service or the like may function to continuously log input data, output data, and contextual data associated with individual application execution events of the deployed AI application. Accordingly, in such an embodiment, the subscribing entity (or an automated test object generation service) may function to automatically query a database of the event logging service for the application usage data of the deployed AI application that corresponds to the target time span and, in turn, automatically generate the test object using the application usage data retrieved from the database.

It shall be recognized that, in one or more embodiments, a test object obtained by S210 may include a tabular data structure (e.g., Pandas DataFrame, etc.) that includes all input data provided to a target AI application during a target time span, all output data generated by the target AI application during the target time span, and all additional contextual data associated with measured properties, outcomes, or behaviors of the target AI application during the target time span, as shown generally by way of example in FIG. 2. In other words, the test object may include data that represents not only the inputs and outputs of the target AI application, but also supplemental data that characterizes the behavior and performance of the target AI application during the target time span.

In one or more embodiments, S210 may function to receive, by one or more computer processors, a test object that includes application usage data of a subject AI application for a target time span (e.g., past twenty-four (24) hours, past seven (7) days, etc.). The test object, in such an embodiment, may include a tabular data structure having a plurality of distinct rows and a plurality of distinct columns. Accordingly, in such an embodiment, each column of the plurality of distinct columns may correspond to a distinct feature (e.g., characteristic, attribute, property, etc.) associated with the operational behavior of the subject AI application, while each row of the plurality of distinct rows may correspond to a distinct invocation (e.g., execution instance) of the subject AI application that is characterized by a set of feature values corresponding to the plurality of distinct columns.

Additionally, or alternatively, in one or more embodiments, the test object may further include one or more global scalar values that represent properties, conditions, or outcomes associated with the overall behavior of the subject AI application during the target time span. In other words, each global scalar value may represent a measurable behavioral property or result of the subject AI application as a whole for the target time span, such as a model F1 score, a model recall score, or another metric that reflects the behavior or effectiveness of the subject AI application across the target time span.

For instance, in a non-limiting example, the subject AI application may include a spam detection classifier that is configured to receive, as input, raw email text that corresponds to a subject email and output a machine learning-based classification inference that indicates whether the subject email is spam or not spam. In such a non-limiting example, the subject AI application may have assessed a plurality of distinct emails (e.g., five emails, one hundred emails, one thousand emails, one million emails, etc.) during the target time span and individually classified each distinct email of the plurality of distinct emails as either spam or not spam.

In such a non-limiting example, the test object may include a tabular dataset in which each row of the tabular dataset may correspond to a distinct email assessed by the subject AI application and each column of the tabular dataset may correspond to a distinct attribute or feature associated with the classification of that distinct email. The test object, in such an embodiment, may include an error type column, an email text column, a spam prediction column, and a unique identifier column.

Accordingly, if the subject AI application classified four distinct emails during the target time span, the test object may include four distinct rows with each row corresponding to a respective one of the four distinct emails. For instance, in one or more embodiments, a first row of the test object may correspond to a first email of the four emails classified by the subject AI application and may store a first error type value (e.g., none) within the error type column, the raw text of the first email (e.g., Hello, I am interested in your product. Please send me more information.) may be stored within the email text column, a first spam prediction value (e.g., false) may be stored within the spam prediction column that indicates the first email was classified as not spam, and a first unique identifier value (e.g., "1") assigned to the first email may be stored within the unique identifier column.

Additionally, or alternatively, in such an embodiment, a second row of the test object may correspond to a second email of the four emails classified by the subject AI application and may store a second error type value (e.g., none) within the error type column, the raw text of the second email (e.g., Congratulations! You've won a lottery. Click here to claim your prize.) may be stored within the email text column, a second spam prediction value (e.g., true) may be stored within the spam prediction column that indicates the second email was classified as spam, and a second unique identifier value (e.g., "2") assigned to the second email may be stored within the unique identifier column.

Additionally, or alternatively, in such an embodiment, a third row of the test object may correspond to a third email of the four emails classified by the subject AI application and may store a third error type value (e.g., none) within the error type column, the raw text of the third email (e.g., Hi, can we schedule a meeting for next week?) may be stored within the email text column, a third spam prediction value (e.g., false) may be stored within the spam prediction column that indicates the third email was classified as not spam, and a third unique identifier value (e.g., "3") assigned to the third email may be stored within the unique identifier column.

Additionally, or alternatively, in such an embodiment, a fourth row of the test object may correspond to a fourth email of the four emails classified by the subject AI application and may store a fourth error type value (e.g., none) within the error type column, the raw text of the fourth email (e.g., Don't miss out on this limited time offer! Buy now and save 50%.) may be stored within the email text column, a fourth spam prediction value (e.g., true) may be stored within the spam prediction column that indicates the fourth email was classified as spam, and a fourth unique identifier value (e.g., "4") assigned to the fourth email may be stored within the unique identifier column.

It shall be further recognized that, in such a non-limiting example, the test object may further include a first global scalar value and a second global scalar value that each represent a measurable property or condition associated with the overall operational behavior of the subject AI application during the target time span. For instance, the first global scalar value may represent a model F1 score (e.g., 0.8) achieved by the subject AI application during the target time span, while the second global scalar value may represent a model recall score (e.g., 0.74) achieved by the subject AI application during the target time span.

In another non-limiting example, the subject AI application may use a large language model (LLM) and a vector database to generate (e.g., textual) outputs based on processing inputs (e.g., input prompts, queries, or other requests) received from a user, a software application, or another software-based solution. In one or more embodiments, in response to providing an input to the subject AI application, the subject AI application may generate an embedding vector that semantically represents the input, query the vector database using the embedding vector to retrieve one or more semantically similar data objects to the input, provide the input provided to the subject AI application and the one or more semantically similar data objects as model input to the large language model, and generate, using the large language model, an output based on the large language model assessing the model input.

In such a non-limiting example, the test object may include a tabular dataset in which each row of the tabular dataset may correspond to a distinct execution instance (e.g., invocation) of the subject AI application and each column of the tabular dataset may correspond to a distinct operational attribute or feature associated with the subject AI application. The test object, in such a non-limiting example, may include an input column, an output column, an output response latency column, an embeddings generation latency column, an output token count column, an output word count column, and an output text readability column.

Accordingly, if the subject AI application processed four distinct inputs during the target time span, the test object may include four distinct rows with each row corresponding to a distinct execution instance of the subject AI application. For instance, in one or more embodiments, a first row of the test object may be associated with a first execution instance of the subject AI application and may store a first input (e.g., "What industries does ACME Corporation operate in?") provided to the subject AI application within the input column, a first output may be stored within the output column that includes the response generated by the large language model in response to processing the first input (e.g., "ACME Corporation operates in the technology, manufacturing, and logistics industries."), a first output response latency value (e.g., 1.3 seconds) may be stored within the output response latency column that indicates the duration of time between receiving the first input and generating the first output, a first embedding generation latency value (e.g., 70 milliseconds) may be stored within the embeddings generation latency column that represents the amount of time taken to generate an embedding vector for the first input, a first output token count value (e.g., 22 tokens) may be stored within the output token count column that indicates a total number of tokens included in the first output, a first output word count value (e.g., 18 words) may be stored within the output word count column that indicates a total number of words included in the first output, and a first output text readability score (e.g., 8.7 on a Flesch-Kincaid readability scale) may be stored within the output text readability column indicating the degree of readability of the first output.

Additionally, or alternatively, in such an embodiment, a second row of the test object may be associated with a second execution instance of the subject AI application and may store a second input (e.g., "Summarize ACME Corporation's return policy.") provided to the subject AI application within the input column, a second output may be stored within the output column that includes the response generated by the large language model in response to processing the second input (e.g., "ACME Corporation accepts returns within 30 days of purchase with a valid receipt."), a second output response latency value (e.g., 1.6 seconds) may be stored within the output response latency column that indicates a duration of time between receiving the second input and generating the second output, a second embedding generation latency value (e.g., 75 milliseconds) may be stored within the embeddings generation latency column that represents the amount of time taken to generate an embedding vector for the second input, a second output token count value (e.g., 24 tokens) may be stored within the output token count column that indicates a total number of tokens included in the second output, a second output word count value (e.g., 21 words) may be stored within the output word count column that indicates a total number of words included in the second output, and a second output text readability score (e.g., 4 on a Flesch-Kincaid readability scale) may be stored within the output text readability column indicating the degree of readability of the second output.

Additionally, or alternatively, in such an embodiment, a third row of the test object may be associated with a third execution instance of the subject AI application and may store a third input (e.g., "When was ACME Corporation founded?") provided to the subject AI application within the input column, a third output may be stored within the output column that includes the response generated by the large language model in response to processing the third input (e.g., "ACME Corporation was founded in 1952."), a third output response latency value (e.g., 0.9 seconds) may be stored within the output response latency column that indicates a duration of time between receiving the third input and generating the third output, a third embedding generation latency value (e.g., 68 milliseconds) may be stored within the embeddings generation latency column that represents the amount of time taken to generate an embedding vector for the third input, a third output token count value (e.g., 10 tokens) may be stored within the output token count column that indicates a total number of tokens included in the third output, a third output word count value (e.g., 8 words) may be stored within the output word count column that indicates a total number of words included in the third output, and a third output text readability score (e.g., 12 on a Flesch-Kincaid readability scale) may be stored within the output text readability column indicating the degree of readability of the third output.

Additionally, or alternatively, in such an embodiment, a fourth row of the test object may be associated with a fourth execution instance of the subject AI application and may store a fourth input (e.g., "List ACME Corporation's primary service offerings.") provided to the subject AI application within the input column, a fourth output may be stored within the output column that includes the response generated by the large language model in response to processing the fourth input (e.g., "ACME Corporation offers supply chain solutions, custom manufacturing services, and enterprise software development."), a fourth output response latency value (e.g., 2.1 seconds) may be stored within the output response latency column that indicates a duration of time between receiving the fourth input and generating the fourth output, a fourth embedding generation latency value (e.g., 80 milliseconds) may be stored within the embeddings generation latency column that represents the amount of time taken to generate an embedding vector for the fourth input, a fourth output token count value (e.g., 30 tokens) may be stored within the output token count column that indicates a total number of tokens included in the fourth output, a fourth output word count value (e.g., 26 words) may be stored within the output word count column that indicates a total number of words included in the fourth output, and a fourth output text readability score (e.g., 4 on a Flesch-Kincaid readability scale) may be stored within the output text readability column indicating the degree of readability of the fourth output.

In one or more embodiments, the test object obtained by S210 may include a first subset of application behavior evaluation metrics generated by the subscribing entity associated with the subject AI application and a second subset of application behavior evaluation metrics (e.g., service-generated performance efficacy metrics or the like) generated by the system or service implementing method 200. For instance, in a non-limiting example, the output response latency values and the embedding generation latency values may have been generated (e.g., derived, computed, etc.) by the subscribing entity, whereas the output token count values, output word count values, and the output text readability scores may have been generated (e.g., derived, computed, etc.) by the system or service implementing method 200.

Computing or Deriving Application Behavior Evaluation Metrics

In one or more embodiments, before the subscribing entity (or the automated test object generation service) generates a test object and/or transmits the generated test object to the system or service implementing method 200, the subscribing entity (or the automated test object generation service) may function to transmit, to the system or service implementing method 200, a single request to compute a plurality of distinct text efficacy values of a plurality of distinct text efficacy metric types for each distinct output included in the set of outputs. It shall be recognized that, in such an embodiment, the single request may have been initiated by the subscribing entity (or the automated test object generation service) in response to the subscribing entity (or the automated test object generation service) invoking an API function provided by the system or service implementing method 200. It shall be further recognized that the phrase "text efficacy metric" may also be referred to herein as a "service-generated performance efficacy metric."

In one or more embodiments, the system or service implementing method 200 may function to automatically compute, for each distinct output of the set of outputs, the plurality of distinct text efficacy values (e.g., application behavior evaluation metric values, additional contextual data, etc.) of the plurality of distinct text efficacy metric types (e.g., application behavior evaluation metric types, additional contextual metrics, service-generated performance efficacy metrics, etc.) in response to receiving the single request. In such an embodiment, the system or service implementing method 200 may return the computed text efficacy values to the subscribing entity (or the automated test generation service) and, in turn, the subscribing entity (or the automated test object generation service) may encode the set of inputs, the set of outputs, and the computed text efficacy values (e.g., service-computed application behavior evaluation metrics) into a machine-readable test object for transmission to the system or service implementing method 200.

Stated another way, in one or more embodiments, in response to receiving the single request, the system or service implementing method 200 may function to simultaneously compute, for each respective output included in the set of outputs, a token count value that corresponds to the total number of tokens included in a respective output, a word count value that corresponds to the total number of natural language words included in the respective output, a Flesch-Kincaid reading grade level value that corresponds to the text reading difficulty of the respective output, an Automated Readability Index (ARI) value that corresponds to the readability of the respective output, a text toxicity score that corresponds to a likelihood that the respective output contains toxic or harmful language, a sentiment assessment score that corresponds to a sentiment polarity classification of the respective output as positive, neutral, or negative, a grammar accuracy score that corresponds to the grammatical correctness of the respective output, and a reading complexity score that corresponds to the cognitive complexity required to comprehend the respective output (e.g., the reading complexity score may be computed using a predefined readability scoring algorithm such as a Flesch-Kincaid Grade Level formula, an Automated Readability Index (ARI) formula, or a machine-learned reading complexity model trained to predict cognitive reading difficulty levels). Additionally, or alternatively in such an embodiment, the system or service implementing method 200 may function to compute an answer quality metric, an answer alignment fidelity metric, an answer fitness metric, a coherence metric, a committal metric, a completeness metric, contextual relevance metric, a grammar accuracy metric, an originality metric, a reading complexity metric, a sentiment assessment metric, a text fluency metric, and/or a toxicity metric for each respective output included in the set of outputs without departing from the scope of the disclosure.

At least one technical benefit of S210 obtaining a test object enables the system or service implementing method 200 to commence an automated evaluation of the test object to detect if any deviations, anomalies, or misbehaviors occurred in the operational behavior of the deployed AI application to which the test object corresponds.

It shall be recognized that, in some embodiments, the system or service implementing method 200 may function to compute or derive a corresponding plurality of distinct text efficacy values of the plurality of distinct text efficacy metric types for any given column associated with a test object and/or reference state object in analogous ways. It shall be further recognized that, in some embodiments, the system or service implementing method 200 may function to assess the derived text efficacy values (e.g., distinct sets of derived evaluation metrics) in analogous ways, as described in more detail herein.

2.2 Executing Application Behavior Tests

S220, which includes executing application behavior tests, may function to execute, in real-time or near real-time, one or more application behavior tests that assess an operational behavior of the deployed AI application by evaluating the test object obtained by S210 against a reference state object associated with the deployed AI application. A reference state object, as generally referred to herein, may include a plurality of distinct sets of historical application behavior data that represents correct or acceptable operational behavior of the deployed AI application, as shown generally by way of example in FIG. 4. It shall be recognized that the phrase "reference state object" may be interchangeably referred to herein as a "baseline behavior object," "target application behavior," and/or the like.

Selecting a Reference State Object

In a first implementation, in response to S210 obtaining a test object that includes application usage data of a deployed AI application for a target time span, S220 may function to dynamically select a target historical test object corresponding to the same deployed AI application as the reference state object. In such a first implementation, S220 may dynamically select the target historical test object from a plurality of previously obtained historical test objects in response to detecting the target historical test object satisfies a temporal criterion relative to the current test object obtained by S210, such as being obtained one day ago, seven days ago, thirty days ago, or according to another configurable time interval.

For instance, in a non-limiting example, the system or service implementing method 200 may obtain, over time, hundreds or thousands of distinct historical test objects that corresponds to the deployed AI application and each distinct historical test object of the hundreds or thousands of distinct historical test objects includes application usage data of the deployed AI application for a distinct time span. In such a non-limiting example, in response to obtaining a current test object that includes application usage data of the deployed AI application for a target day (e.g., Apr. 2, 2025), S220 may dynamically or automatically select, by one or more computer processors, a target historical test object of the hundreds or thousands of distinct historical test objects that satisfies a predetermined temporal criterion relative to the current test object. For example, S220 may dynamically select, as the reference state object for the current test object, a historical test object that includes application usage data of the deployed AI application corresponding to the previous day (e.g., Apr. 1, 2025) relative to the target day.

Figure 11:
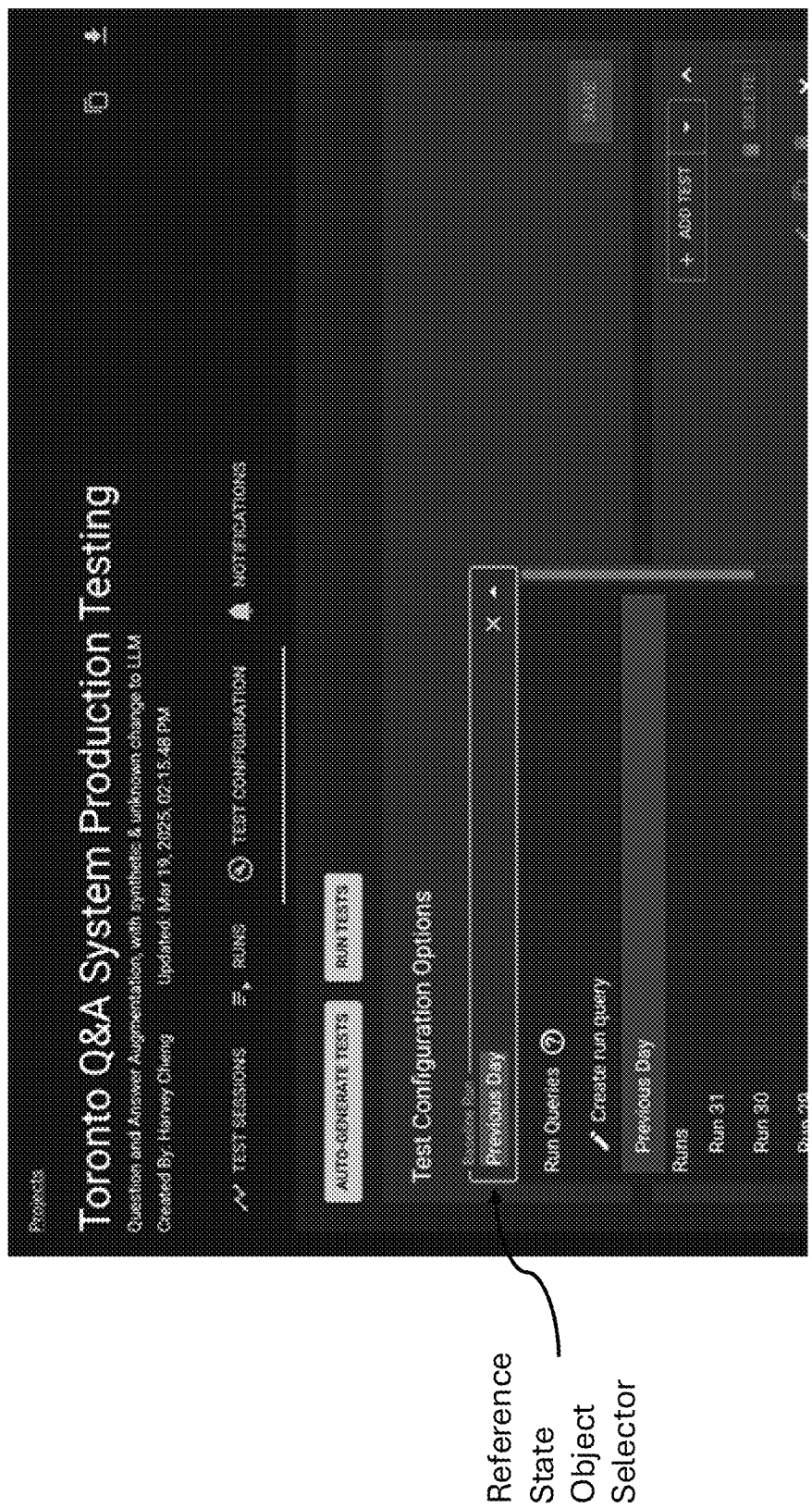
FIGS. 11-19 and 20A-20O illustrate example graphical user interfaces in accordance with one or more embodiments of the present application.
Figure 12:
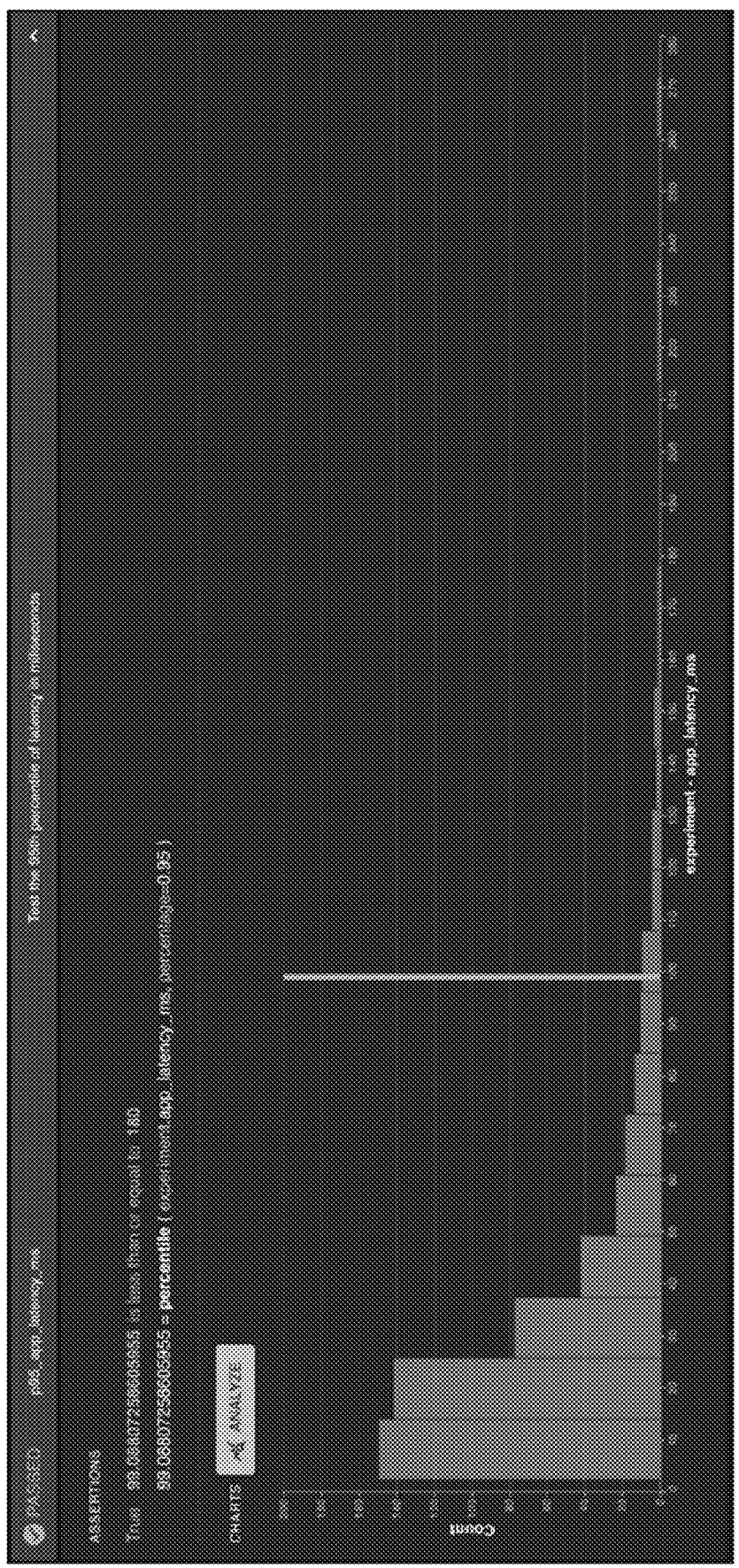

In a second implementation, the system or service implementing method 200 may function to select the reference state object to assess against the test object obtained by S210 using a graphical user interface, as shown generally by way of example in FIG. 11. In such a second implementation, the graphical user interface may include a reference state object user interface element that, when selected, displays a drop-down menu element of a plurality of available reference state objects. For instance, in a non-limiting example, the system or service implementing method 200 may receive, from a subscribing entity, an input selecting the reference state object user interface element and, in turn, the drop-down menu element of the plurality of available reference state objects may be displayed on the graphical user interface in response to receiving the input. Accordingly, in such a non-limiting example, the system or service implementing method 200 may further receive, from the subscribing entity, an additional input selecting one of plurality of available reference state objects from the drop-down menu element. The selected reference state object, in such an embodiment, may be used to specify the baseline application behavior of the deployed AI application against which the test object is assessed.

It shall be recognized that, in one or more embodiments, S220 may function to select the reference state object in additional or different ways without departing from the scope of the disclosure.

Performing Automated Pairwise Assessments

In one or more embodiments, in response to obtaining a test object that includes application usage data of a deployed AI application for a target time span, S220 may function to assess the test object against a reference state object that includes application usage data of the same deployed AI application for a different time span. At least one technical benefit of assessing the test object obtained by S210 against the reference state object may enable a temporal comparison of the operational behavior of the deployed AI application across different time spans to detect behavioral deviations, performance regressions, or anomalies occurring within the deployed AI application, as shown generally by way of example in FIGS. 7-10.

The test object obtained by S210, in one or more embodiments, may include a set of inputs provided to the deployed AI application during the target time span, a set of outputs generated by the deployed AI application in response to processing the set of inputs, a set of contextual attribute values collected during the processing of the set of inputs and the generation of the set of outputs by the deployed AI application, and/or a set of supplemental attribute values used during the generation of the set of outputs by the deployed AI application, as shown generally by way of example in FIG. 3.

The reference state object, in one or more embodiments, may include a set of inputs provided to the deployed AI application during a historical time span different than the target time span associated with the test object, a set of outputs generated by the deployed AI application in response to processing the set of inputs during the historical time span, a set of contextual attribute values collected during the processing of the set of inputs and the generation of the set of outputs by the deployed AI application during the historical time span, and/or a set of supplemental attribute values that the deployed AI application used to generate the set of outputs during the historical time span, as shown generally by way of example in FIG. 4.

Accordingly, in one or more embodiments, S220 may function to execute, in real-time by one or more computer processors, one or more application behavior tests that assess an operational behavior of the deployed AI application by evaluating the test object against the reference state object. Executing the one or more application behavior tests, in one or more embodiments, may include executing one or more automated pairwise assessments in which each automated pairwise assessment assesses a data distribution of a distinct feature (or column) included in the test object against a corresponding data distribution of the same distinct feature (or column) included in the reference state object, as shown generally by way of example in FIGS. 7-10.

For instance, in a non-limiting example, executing the one or more application behavior tests may include executing a first automated pairwise assessment between a distribution of the set of outputs included in the test object and a distribution of the set of outputs included in the reference state object. In such a non-limiting example, the output of the first automated pairwise assessment may indicate a degree of similarity between the distribution of the set of outputs included in the test object and the distribution of the set of outputs included in the reference state object. It shall be recognized that the degree of similarity between the distribution of the set of outputs included in the test object and the distribution of the set of outputs included in the reference state object may fall between any two values (e.g., between zero (0) and one (1), a set of alphanumeric characters (e.g., A-Z), or any range of non-numerical indicators (e.g., color gradations like green to yellow to red, or descriptive levels like low to intermediate to high, etc.).

Figure 5:
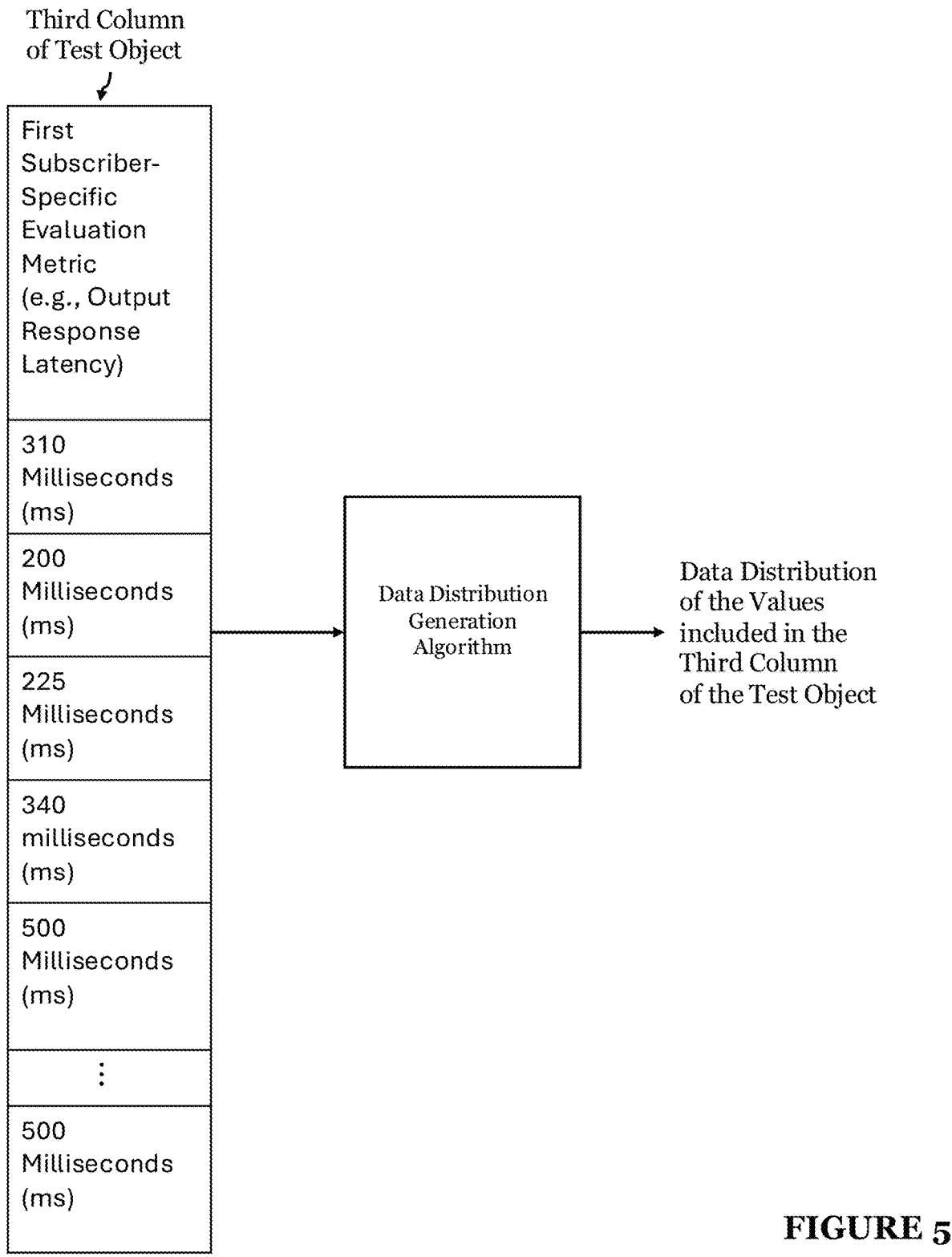
FIG. 5 illustrates an example schematic for generating a data distribution for a target column in the test object in accordance with one or more embodiments of the present application.
Figure 6:
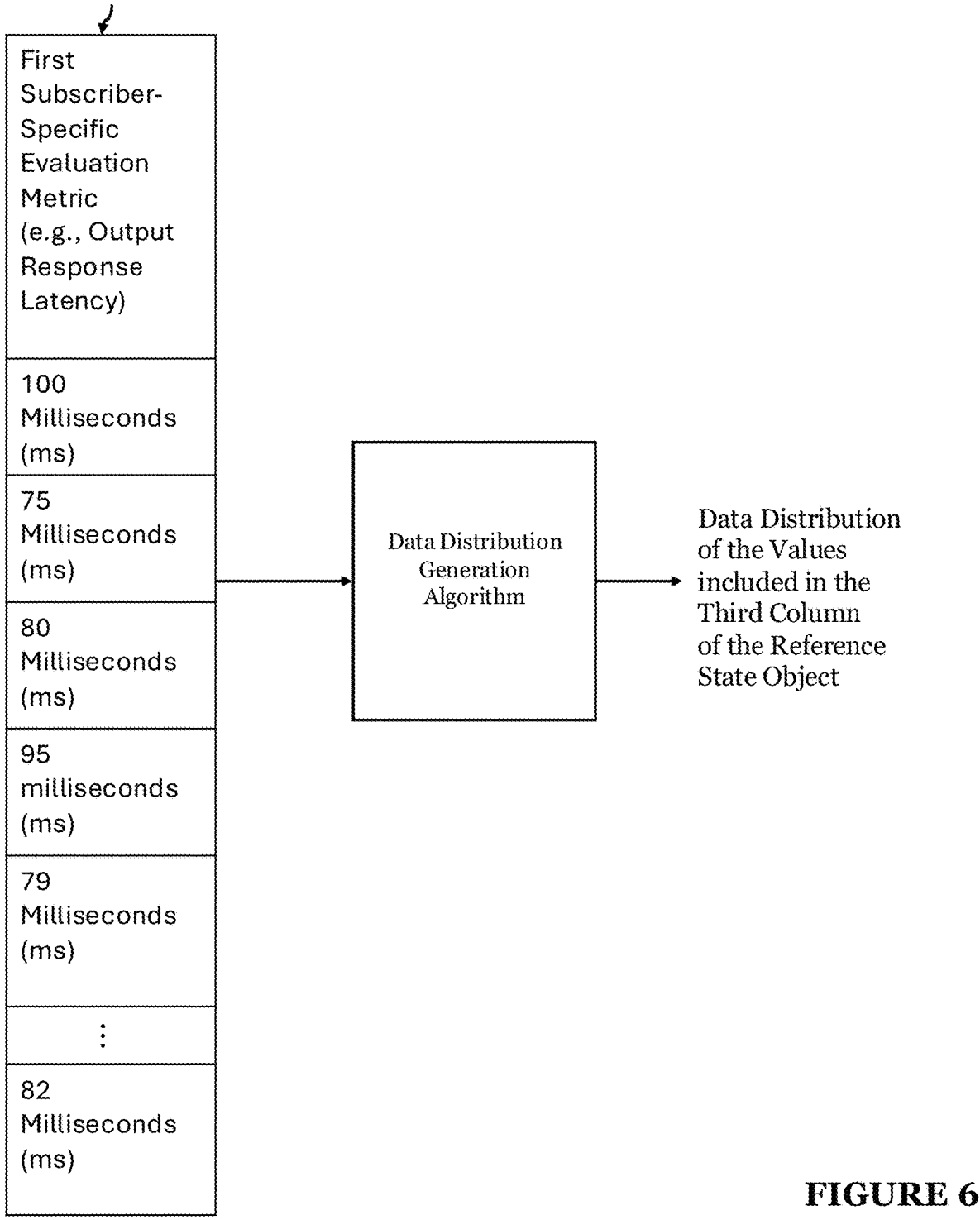
FIG. 6 illustrates an example schematic for generating a data distribution for a target column in the reference state object in accordance with one or more embodiments of the present application.
Figure 8:
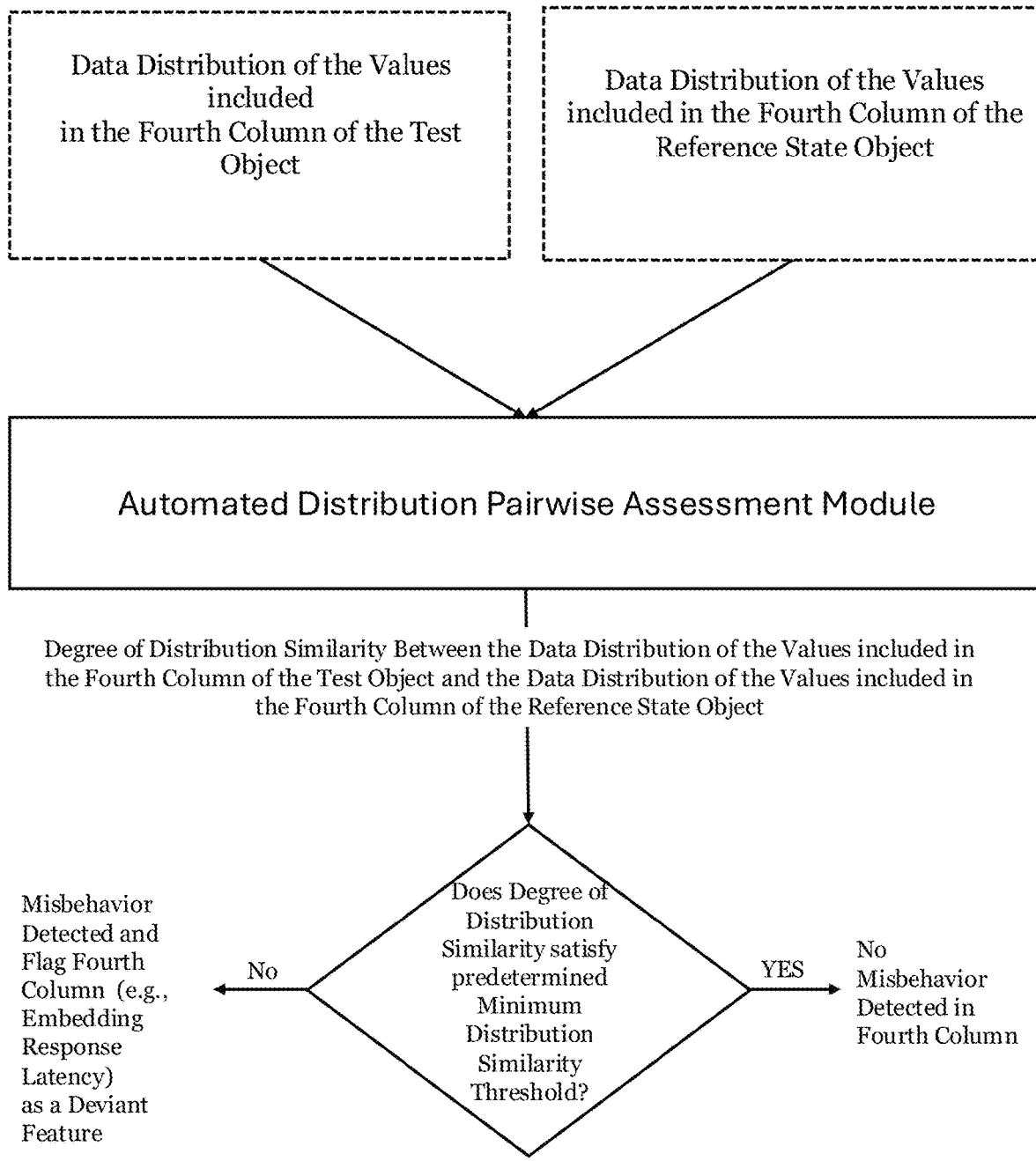
Figure 9:
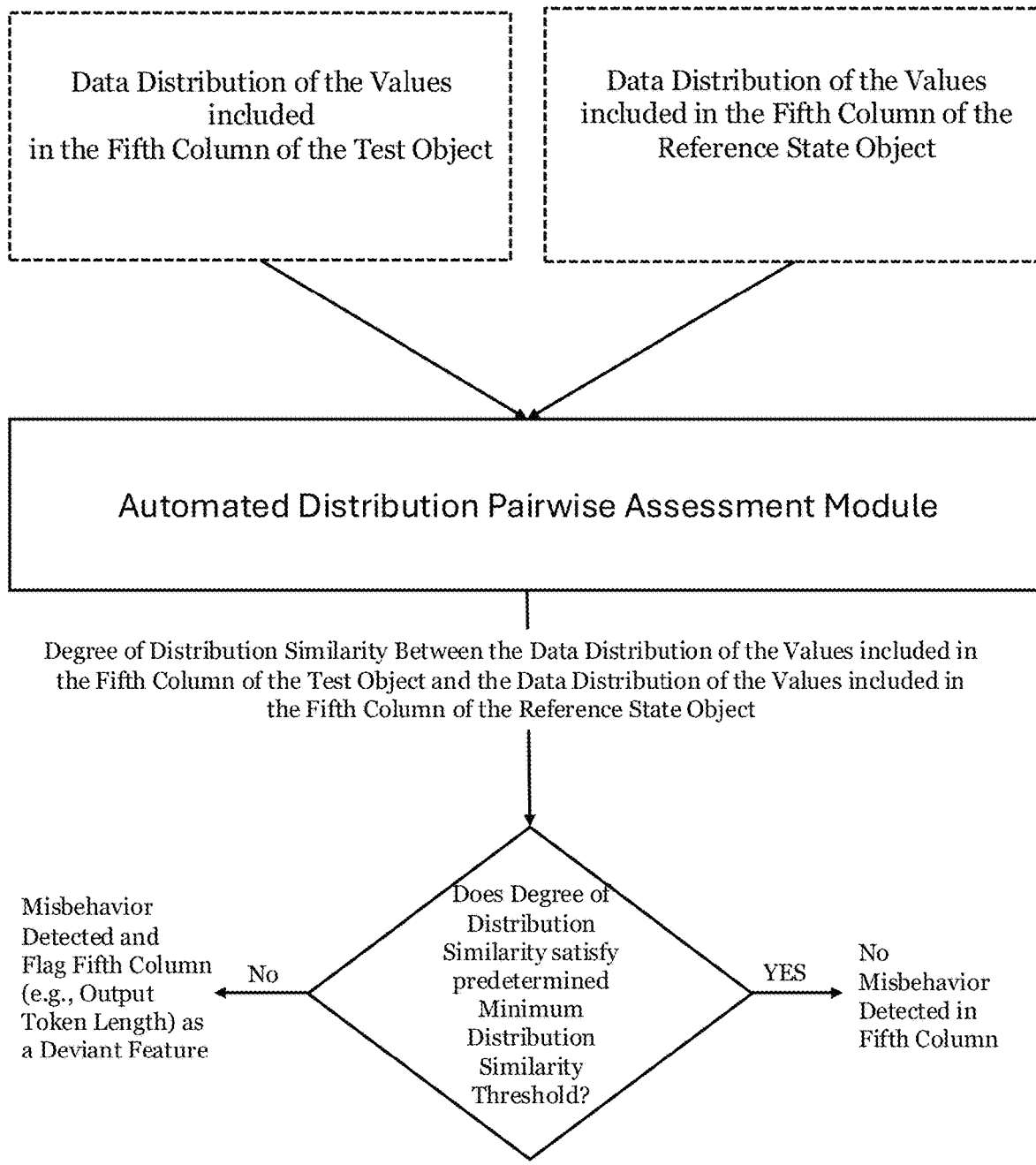
Figure 10:
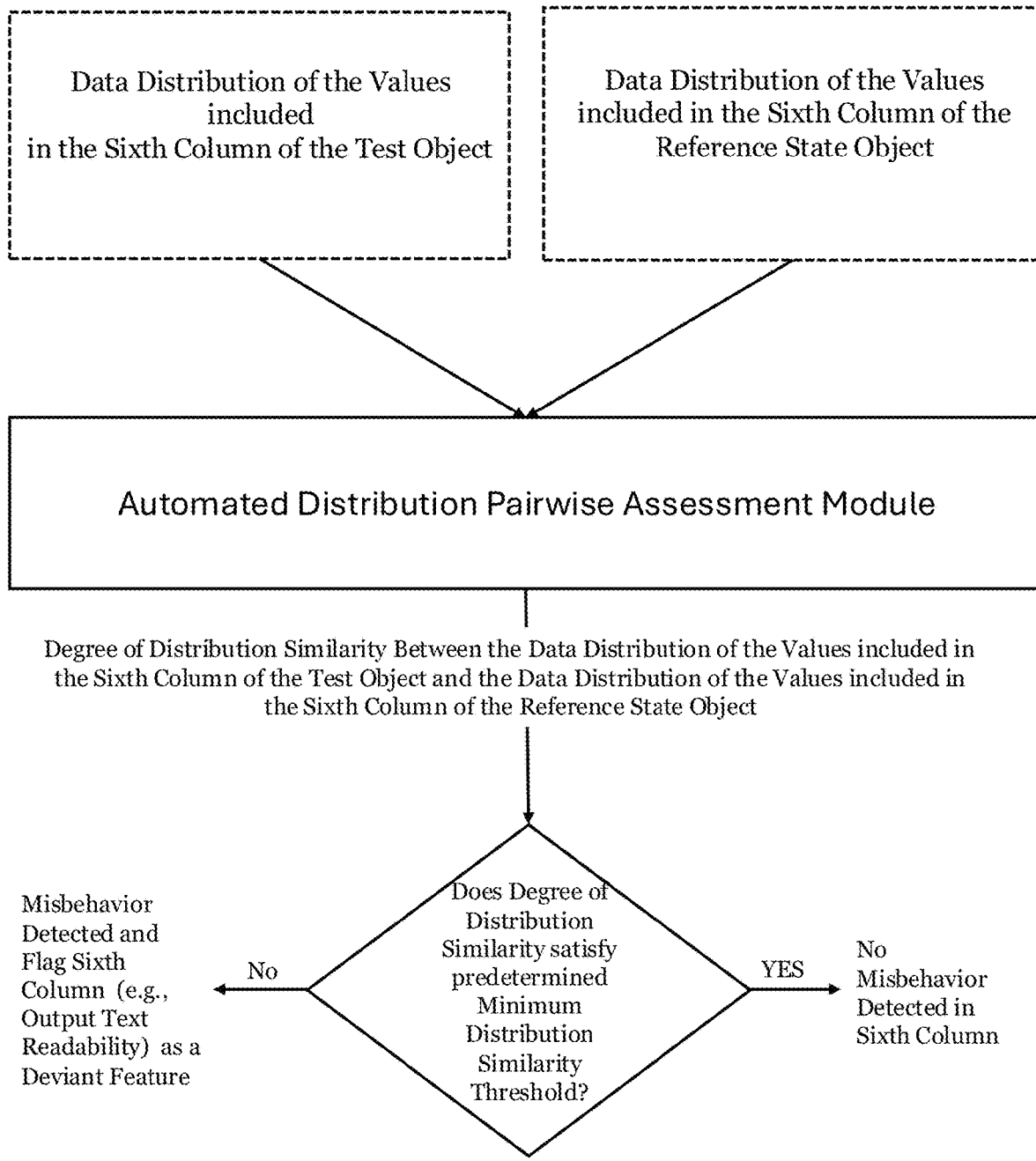

Stated another way, in some embodiments, executing the first automated pairwise assessment may include generating the distribution of the set of outputs corresponding to the test object in response to providing the set of outputs included in the test object to a data distribution generation algorithm, as shown generally by way of example in FIG. 5. Additionally, in such an embodiment, executing the first automated pairwise assessment may further include generating the distribution of the set of outputs corresponding to the reference state object in response to providing the set of outputs included in the reference state object to the data distribution generation algorithm, as shown generally by way of example in FIG. 6. Accordingly, the first automated pairwise assessment may function to assess the distribution of the set of outputs corresponding to the test object against the distribution of the set of outputs corresponding to the reference state object and, in turn, output a pairwise assessment finding that indicates a degree of similarity between the distribution of the set of outputs corresponding to the test object and the distribution of the set of outputs corresponding to the reference state object.

In one or more embodiments, if the degree of similarity does not satisfy a predetermined minimum distribution similarity threshold, the pairwise assessment finding outputted by the first automated pairwise assessment may indicate that a statistically significant drift or shift occurred in the distribution of the set of outputs corresponding to the test object relative to the distribution of the set of outputs corresponding to the reference state object. Furthermore, in response to detecting that the statistically significant drift or shift occurred, the pairwise assessment finding may further indicate the direction of the drift or shift, such as a leftward or rightward shift in the distribution.

Conversely, if the degree of similarity satisfied the predetermined minimum distribution similarity threshold, the pairwise assessment finding outputted by the first automated pairwise assessment may indicate that a statistically significant drift or shift did not occur in the distribution of the set of outputs corresponding to the test object relative to the distribution of the set of outputs corresponding to the reference state object.

In another non-limiting, executing the one or more application behavior tests may include executing a second automated pairwise assessment between a distribution of the set of contextual attribute values included in the test object and a distribution of the set of contextual attribute values included in the reference state object. In such a non-limiting example, the output of the second automated pairwise assessment may indicate a degree of similarity between the distribution of the set of contextual attribute values included in the test object and the distribution of the set of contextual attribute values included in the reference state object. It shall be recognized that the degree of similarity between the distribution of the set of contextual attribute values included in the test object and the distribution of the set of contextual attribute values included in the reference state object may fall between any two values (e.g., between zero (0) and one (1), a set of alphanumeric characters (e.g., A-Z), or any range of non-numerical indicators (e.g., color gradations like green to yellow to red, or descriptive levels like low to intermediate to high, etc.).

Stated another way, in some embodiments, executing the second automated pairwise assessment may include generating the distribution of the set of contextual attribute values corresponding to the test object in response to providing the set of contextual attribute values included in the test object to the data distribution generation algorithm. Additionally, in such an embodiment, executing the second automated pairwise assessment may further include generating the distribution of the set of contextual attribute values corresponding to the reference state object in response to providing the set of contextual attribute values included in the reference state object to the data distribution generation algorithm. Accordingly, the second automated pairwise assessment may function to assess the distribution of the set of contextual attribute values corresponding to the test object against the distribution of the set of contextual attribute values corresponding to the reference state object and, in turn, output a pairwise assessment finding that indicates a degree of similarity between the distribution of the set of contextual attribute values corresponding to the test object and the distribution of the set of contextual attribute values corresponding to the reference state object.

In one or more embodiments, if the degree of similarity does not satisfy a predetermined minimum distribution similarity threshold, the pairwise assessment finding outputted by the second automated pairwise assessment may indicate that a statistically significant drift or shift occurred in the distribution of the set of contextual attribute values corresponding to the test object relative to the distribution of the set of contextual attribute values corresponding to the reference state object. Furthermore, in response to detecting that the statistically significant drift or shift occurred, the pairwise assessment finding may further indicate the direction of the drift or shift, such as a leftward or rightward shift in the distribution.

Conversely, if the degree of similarity satisfied the predetermined minimum distribution similarity threshold, the pairwise assessment finding outputted by the second automated pairwise assessment may indicate that a statistically significant drift or shift did not occur in the distribution of the set of contextual attribute values corresponding to the test object relative to the distribution of the set of contextual attribute values corresponding to the reference state object.

In another non-limiting example, the test object may further include a first set of output text efficacy values that correspond to a token count efficacy metric and the reference state object may further include a first set of output text efficacy values that correspond to the same token count efficacy metric. In one or more embodiments, each output text efficacy value included in the first set of output text efficacy values of the test object may represent a total number of tokens included in a respective output of the set of outputs of the test object (e.g., if the set of outputs of the test object included four generated outputs, the first set of output text efficacy values of the test object may include four corresponding token count values such as two hundred forty-eight (248 tokens), five hundred twelve (512 tokens), one hundred thirty (130 tokens), and three hundred ninety-four (394 tokens), each indicating the number of tokens in a corresponding output of the set of outputs of the test object). Similarly, each output text efficacy value included in the first set of output text efficacy values of the reference state object may represent a total number of tokens included in a respective output of the set of outputs of the reference state object (e.g., if the set of outputs of the reference state object included three hundred (300) generated outputs, the first set of output text efficacy values of the reference state object may include three hundred (300) corresponding token count values, each indicating the number of tokens in a respective output of the set of outputs of the reference state object).

In such a non-limiting example, executing the one or more application behavior tests may include executing a third automated pairwise assessment between a distribution of the first set of output text efficacy values included in the test object and a distribution of the first set of output text efficacy values included in the reference state object. In such a non-limiting example, the output of the third automated pairwise assessment may indicate a degree of similarity between the distribution of the first set of output text efficacy values included in the test object and the distribution of the first set of output text efficacy values included in the reference state object. It shall be recognized that the degree of similarity between the distribution of the first set of output text efficacy values included in the test object and the distribution of the first set of output text efficacy values included in the reference state object may be outputted in analogous ways as described above. Stated another way, in one or more embodiments, executing the one or more application behavior tests may include executing a third automated pairwise assessment between a distribution of the first set of output text efficacy values included in the test object that corresponds to the token count efficacy metric and a corresponding output token count reference distribution of the reference state object that corresponds to the same token count efficacy metric.

Accordingly, in such a non-limiting example, the third automated pairwise assessment may function to assess the distribution of the first set of output text efficacy values corresponding to the test object against the distribution of the first set of output text efficacy values corresponding to the reference state object and, in turn, output a pairwise assessment finding that indicates a degree of similarity between the distribution of the first set of output text efficacy values corresponding to the test object and the distribution of the first set of output text efficacy values corresponding to the reference state object.

In one or more embodiments, if the degree of similarity does not satisfy a predetermined minimum distribution similarity threshold, the pairwise assessment finding outputted by the third automated pairwise assessment may indicate that a statistically significant drift or shift occurred in the distribution of the first set of output text efficacy values corresponding to the test object relative to the distribution of the first set of output text efficacy values corresponding to the reference state object. Furthermore, in response to detecting that the statistically significant drift or shift occurred, the pairwise assessment finding may further indicate the direction of the drift or shift, such as a leftward or rightward shift in the distribution.

Conversely, if the degree of similarity satisfied the predetermined minimum distribution similarity threshold, the pairwise assessment finding outputted by the third automated pairwise assessment may indicate that a statistically significant drift or shift did not occur in the distribution of the first set of output text efficacy values corresponding to the test object relative to the distribution of the first set of output text efficacy values corresponding to the reference state object.

In another non-limiting example, the test object may further include a second set of output text efficacy values that correspond to a word count efficacy metric and the reference state object may further include a second set of output text efficacy values that correspond to the same word count efficacy metric. In one or more embodiments, each output text efficacy value included in the second set of output text efficacy values of the test object may represent a total number of words included in a respective output of the set of outputs of the test object (e.g., if the set of outputs of the test object included four generated outputs, the second set of output text efficacy values of the test object may include four corresponding word count values such as two hundred forty-eight (248 words), five hundred twelve (512 words), one hundred thirty (130 words), and three hundred ninety-four (394 words), each indicating the number of words in a corresponding output of the set of outputs of the test object). Similarly, each output text efficacy value included in the second set of output text efficacy values of the reference state object may represent a total number of words included in a respective output of the set of outputs of the reference state object (e.g., if the set of outputs of the reference state object included three hundred (300) generated outputs, the second set of output text efficacy values of the reference state object may include three hundred (300) corresponding word count values, each indicating the number of words in a respective output of the set of outputs of the reference state object).

In such a non-limiting example, executing the one or more application behavior tests may include executing a fourth automated pairwise assessment between a distribution of the second set of output text efficacy values included in the test object and a distribution of the second set of output text efficacy values included in the reference state object. In such a non-limiting example, the output of the fourth automated pairwise assessment may indicate a degree of similarity between the distribution of the second set of output text efficacy values included in the test object and the distribution of the second set of output text efficacy values included in the reference state object. It shall be recognized that the degree of similarity between the distribution of the second set of output text efficacy values included in the test object and the distribution of the second set of output text efficacy values included in the reference state object may be outputted in analogous ways as described above. Stated another way, in one or more embodiments, executing the one or more application behavior tests may include executing a fourth automated pairwise assessment between a distribution of the second set of output text efficacy values that corresponds to the word count efficacy metric and a corresponding output word count reference distribution of the reference state object that corresponds to the same word count efficacy metric.

Accordingly, in such a non-limiting example, the fourth automated pairwise assessment may function to assess the distribution of the second set of output text efficacy values corresponding to the test object against the distribution of the second set of output text efficacy values corresponding to the reference state object and, in turn, output a pairwise assessment finding that indicates a degree of similarity between the distribution of the second set of output text efficacy values corresponding to the test object and the distribution of the second set of output text efficacy values corresponding to the reference state object.

In one or more embodiments, if the degree of similarity does not satisfy a predetermined minimum distribution similarity threshold, the pairwise assessment finding outputted by the fourth automated pairwise assessment may indicate that a statistically significant drift or shift occurred in the distribution of the second set of output text efficacy values corresponding to the test object relative to the distribution of the second set of output text efficacy values corresponding to the reference state object. Furthermore, in response to detecting that the statistically significant drift or shift occurred, the pairwise assessment finding may further indicate the direction of the drift or shift, such as a leftward or rightward shift in the distribution.

Conversely, if the degree of similarity satisfied the predetermined minimum distribution similarity threshold, the pairwise assessment finding outputted by the fourth automated pairwise assessment may indicate that a statistically significant drift or shift did not occur in the distribution of the second set of output text efficacy values corresponding to the test object relative to the distribution of the second set of output text efficacy values corresponding to the reference state object.

In another non-limiting example, the test object may further include a third set of output text efficacy values that corresponds to a text readability efficacy metric and the reference state object may further include a third set of output text efficacy values that corresponds to the same text readability efficacy metric. In one or more embodiments, each output text efficacy value included in the third set of output text efficacy values of the test object may represent a text readability score determined for the respective output of the set of outputs of the test object (e.g., if the set of outputs of the test object included four generated outputs, the third set of output text efficacy values of the test object may include four corresponding text readability scores such as 3, 7.8, 18, and 10, each indicating the readability level of a respective output generated by the deployed AI application during the target time span associated with the test object). Similarly, each output text efficacy value included in the third set of output text efficacy values of the reference state object may represent a text readability score determined for the respective output of the set of outputs of the reference state object (e.g., if the set of outputs of the reference state object included three hundred (300) generated outputs, the third set of output text efficacy values of the reference state object may include three hundred (300) corresponding text readability scores, each indicating the readability level of a respective output generated by the deployed AI application during the historical time span associated with the reference state object).

In such a non-limiting example, executing the one or more application behavior tests may include executing a fifth automated pairwise assessment between a distribution of the third set of output text efficacy values included in the test object and a distribution of the third set of output text efficacy values included in the reference state object. In such a non-limiting example, the output of the fifth automated pairwise assessment may indicate a degree of similarity between the distribution of the third set of output text efficacy values included in the test object and the distribution of the third set of output text efficacy values included in the reference state object. It shall be recognized that the degree of similarity between the distribution of the third set of output text efficacy values included in the test object and the distribution of the third set of output text efficacy values included in the reference state object may be outputted in analogous ways as described above. Stated another way, in one or more embodiments, executing the one or more application behavior tests may include executing a fifth automated pairwise assessment between a distribution of the third set of output text efficacy values that corresponds to the text readability efficacy metric and a corresponding output text readability distribution of the reference state object that corresponds to the text readability efficacy metric.

Accordingly, in such a non-limiting example, the fifth automated pairwise assessment may function to assess the distribution of the third set of output text efficacy values corresponding to the test object against the distribution of the third set of output text efficacy values corresponding to the reference state object and, in turn, output a pairwise assessment finding that indicates a degree of similarity between the distribution of the third set of output text efficacy values corresponding to the test object and the distribution of the third set of output text efficacy values corresponding to the reference state object.

In one or more embodiments, if the degree of similarity does not satisfy a predetermined minimum distribution similarity threshold, the pairwise assessment finding outputted by the fifth automated pairwise assessment may indicate that a statistically significant drift or shift occurred in the distribution of the third set of output text efficacy values corresponding to the test object relative to the distribution of the third set of output text efficacy values corresponding to the reference state object. Furthermore, in response to detecting that the statistically significant drift or shift occurred, the pairwise assessment finding may further indicate the direction of the drift or shift, such as a leftward or rightward shift in the distribution.

Conversely, if the degree of similarity satisfied the predetermined minimum distribution similarity threshold, the pairwise assessment finding outputted by the fifth automated pairwise assessment may indicate that a statistically significant drift or shift did not occur in the distribution of the third set of output text efficacy values corresponding to the test object relative to the distribution of the third set of output text efficacy values corresponding to the reference state object.

Stated differently, in one or more embodiments, the test object may include a first set of output text efficacy values that corresponds to a single text efficacy metric type and the reference state object may further include a first set of output text efficacy values that corresponds to the same single text efficacy metric type. In such an embodiment, executing the one or more application behavior tests may include executing a subject automated pairwise assessment between a distribution of the first set of output text efficacy values included in the test object and a distribution of the first set of output text efficacy values included in the reference state object. In such a non-limiting example, the output of the subject automated pairwise assessment may indicate a degree of similarity between the distribution of the first set of output text efficacy values included in the test object and the distribution of the first set of output text efficacy values included in the reference state object. It shall be recognized that the degree of similarity between the distribution of the first set of output text efficacy values included in the test object and the distribution of the first set of output text efficacy values included in the reference state object may be outputted in analogous ways as described above.

The single text efficacy metric type, in one or more embodiments, may correspond to an output text readability metric, an answer quality metric, an answer alignment fidelity metric, an answer fitness metric, a coherence metric, a committal metric, a completeness metric, a contextual relevance metric, a grammar accuracy metric, an originality metric, a reading complexity metric, a sentiment assessment metric, a text fluency metric, a toxicity metric, a token count metric, a word count metric, a text readability metric, a text toxicity metric, a grammatical correctness metric, or any other application behavior evaluation metric or text efficacy metric described herein.

In one or more embodiments, if the degree of similarity does not satisfy a predetermined minimum distribution similarity threshold, the pairwise assessment finding outputted by the subject automated pairwise assessment may indicate that a statistically significant drift or shift occurred in the distribution of the first set of output text efficacy values of the test object relative to the distribution of the first set of output text efficacy values of the reference state object. Furthermore, in response to detecting that the statistically significant drift or shift occurred, the pairwise assessment finding may further indicate the direction of the drift or shift, such as a leftward or rightward shift in the distribution.

Executing Application Behavior Tests Using an Application Behavior User Interface In one or more embodiments, the system or service implementing method 200 may function to instantiate, by one or more computer processors, an application behavior user interface that includes a selectable test execution button, as shown generally by way of example in FIGS. 11, 17, and 20A-200. In such an embodiment, the system or service implementing method 200 may receive, from the subscribing entity associated with the deployed AI application, a first user input selecting the selectable test execution button displayed on the application behavior user interface. Accordingly, in one or more embodiments, in response to receiving the first user input, the system or service implementing method 200 may function to instantiate, by the one or more computer processors, an application behavior test configuration user interface object overlaid on the application behavior user interface.

As described above, in one or more embodiments, S220 may function to execute the one or more application behavior tests that assess the operational behavior of the deployed AI application by evaluating the test object obtained by S210 against the reference state object associated with the deployed AI application.

In one or more embodiments, after instantiating the application behavior test configuration user interface object, the system or service implementing method 200 may function to receive, via the application behavior test configuration user interface object, a sequence of one or more additional user inputs from the subscribing entity that includes selecting the reference state object as the baseline application behavior for the deployed AI application, selecting the test object obtained by S210 to be assessed against the selected reference state object, selecting the one or more application behavior tests to be executing during the assessment of the operational behavior of the deployed AI application, and selecting a set of application behavior tests not to be executed during the assessment of the operational behavior of the deployed AI application.

Accordingly, in such an embodiment, S220 may function to commence (e.g., initiate or the like), by the one or more computer processors, the execution of the one or more application behavior tests that assess the operational behavior of the deployed AI application in accordance with the sequence of one or more additional user inputs in response to receiving, from the subscribing entity, an input selecting a test confirmation button displayed on the application behavior test configuration user interface object.

Pairwise Distribution Assessment Similarity Scores|Column-Level Similarity Scores Additionally, or alternatively, in one or more embodiments, in response to S210 obtaining a test object that includes application usage data of a subject deployed AI application for a target time span, S220 may function to simultaneously execute, in real-time or near real-time by one or more computer processors, a plurality of distinct application behavior tests that assess the operational behavior of the subject deployed AI application by evaluating a representation of the current application behavior (e.g., the test object) of the subject deployed AI application against a baseline application behavior (e.g., the reference state object) associated with the subject deployed AI application.

In one or more embodiments, the test object may include a tabular data structure comprising a plurality of distinct rows and a plurality of distinct columns. In such an embodiment, each distinct column of the plurality of distinct columns may correspond to a distinct feature associated with the operational behavior of the subject deployed AI application and each distinct row of the plurality of distinct rows may correspond to a distinct execution instance (e.g., each distinct inference operation, etc.) performed by the subject deployed AI Application during the target time span.

For instance, in a non-limiting example, the test object may include a first set of contextual attribute values that corresponds to a first distinct performance efficacy metric measuring a first distinct performance characteristic (e.g., embedding generation latency) of the subject deployed AI application during the target time span. Additionally, or alternatively, in such a non-limiting example, the test object may include a second set of contextual attribute values that corresponds to a second distinct performance efficacy metric that measures a second distinct performance characteristic (e.g., compute resource utilization) of the deployed AI application during the target time span. Additionally, or alternatively, in such a non-limiting example, the test object may include a third set of contextual attribute values that corresponds to a third distinct performance efficacy metric that measures a first output efficacy characteristic (e.g., output response length) of the set of outputs included in the test object. Additionally, or alternatively, in such a non-limiting example, the test object may include a fourth set of contextual attribute values that corresponds to a fourth distinct performance efficacy metric that measures a second output efficacy characteristic (e.g., output text readability) of the set of outputs included in the test object. It shall be noted that the test object may include more, different, or fewer sets of context attribute values without departing from the scope of the disclosure.

Accordingly, in such a non-limiting example, a set of inputs provided to the subject deployed AI application during the target time span may be stored within a first column of the plurality of distinct columns of the tabular data structure, the set of outputs generated by the subject deployed AI application during the target time span may be stored within a second column of the plurality of distinct columns of the tabular data structure, the first set of contextual attribute values corresponding to the first distinct performance efficacy metric may be stored within a third column of the plurality of distinct columns of the tabular data structure, the second set of contextual attribute values corresponding to the second distinct performance efficacy metric may be stored within a fourth column of the plurality of distinct columns of the tabular data structure, the third set of contextual attribute values corresponding to the third distinct performance efficacy metric may be stored within a fifth column of the plurality of distinct columns of the tabular data structure, and the fourth set of contextual attribute values corresponding to the fourth distinct performance efficacy metric may be stored within a sixth column of the plurality of distinct columns of the tabular data structure. It shall be noted that the test object may include more, different, or fewer columns without departing from the scope of the disclosure.

In one or more embodiments, the plurality of distinct application behavior tests that assess the operational behavior of the subject deployed AI application may include executing a first automated pairwise assessment between a data distribution of the set of outputs included in the test object and a corresponding output data distribution of the reference state object.

Additionally, or alternatively, in such an embodiment, executing the plurality of distinct application behavior tests may further include executing a second automated pairwise assessment between a data distribution of the first set of contextual attribute values of the test object that corresponds to the first distinct performance efficacy metric and a corresponding contextual attribute data distribution of the reference state object that corresponds to the first distinct performance efficacy metric, as shown generally by way of example in FIGS. 7-10.

Additionally, or alternatively, in such an embodiment, executing the plurality of distinct application behavior tests may further include executing a third automated pairwise assessment between a data distribution of the second set of contextual attribute values of the test object that corresponds to the second distinct performance efficacy metric and a corresponding contextual attribute data distribution of the reference state object that corresponds to the second distinct performance efficacy metric, as shown generally by way of example in FIGS. 7-10.

Additionally, or alternatively, in such an embodiment, executing the plurality of distinct application behavior tests may further include executing a fourth automated pairwise assessment between a data distribution of the third set of contextual attribute values of the test object that corresponds to the third distinct performance efficacy metric and a corresponding contextual attribute data distribution of the reference state object that corresponds to the third distinct performance efficacy metric, as shown generally by way of example in FIGS. 7-10.

Additionally, or alternatively, in such an embodiment, executing the plurality of distinct application behavior tests may further include executing a fifth automated pairwise assessment between a data distribution of the fourth set of contextual attribute values of the test object that corresponds to the fourth distinct performance efficacy metric and a corresponding contextual attribute data distribution of the reference state object that corresponds to the fourth distinct performance efficacy metric, as shown generally by way of example in FIGS. 7-10.

Additionally, or alternatively, in one or more embodiments, the system or service implementing method 200 may function to automatically compute, in real-time by one or more computer processors, a set of pairwise assessment similarity scores (e.g., pairwise assessment column similarity scores) based on or in response to executing the plurality of distinct application behavior tests. For instance, in a non-limiting example, in response to executing the first automated pairwise assessment, the system or service implementing method 200 may function to automatically compute a first pairwise assessment similarity score (e.g., first pairwise assessment column similarity score) that quantitatively represents a degree of similarity between the data distribution of the set of outputs of the test object and the corresponding output data distribution of the reference state object.

Additionally, or alternatively, in such a non-limiting example, in response to executing the second automated pairwise assessment, the system or service implementing method 200 may function to automatically compute a second pairwise assessment similarity score (e.g., second pairwise assessment column similarity score) that quantitatively represents a degree of similarity between the data distribution of the first set of contextual attribute values of the test object that corresponds to the first distinct performance efficacy metric and the corresponding contextual attribute data distribution of the reference state object that corresponds to the first distinct performance efficacy metric.

Additionally, or alternatively, in such a non-limiting example, in response to executing the third automated pairwise assessment, the system or service implementing method 200 may function to automatically compute a third pairwise assessment similarity score (e.g., third pairwise assessment column similarity score) that quantitatively represents a degree of similarity between the data distribution of the second set of contextual attribute values of the test object that corresponds to the second distinct performance efficacy metric and a corresponding contextual attribute data distribution of the reference state object that corresponds to the second distinct performance efficacy metric.

Additionally, or alternatively, in such a non-limiting example, in response to executing the fourth automated pairwise assessment, the system or service implementing method 200 may function to automatically compute a fourth pairwise assessment similarity score (e.g., fourth pairwise assessment column similarity score) that quantitatively represents a degree of similarity between the data distribution of the third set of contextual attribute values of the test object that corresponds to the third distinct performance efficacy metric and the corresponding contextual attribute data distribution of the reference state object that corresponds to the third distinct performance efficacy metric.

Additionally, or alternatively, in such a non-limiting example, in response to executing the fifth automated pairwise assessment, the system or service implementing method 200 may function to automatically compute a fifth pairwise assessment similarity score (e.g., fifth pairwise assessment column similarity score) that quantitatively represents a degree of similarity between the data distribution of the fourth set of contextual attribute values of the test object that corresponds to the fourth distinct performance efficacy metric and the corresponding contextual attribute data distribution of the reference state object that corresponds to the fourth distinct performance efficacy metric.

Application Similarity Index Score|Application-Level Similarity Scores

In one or more embodiments, the system or service implementing method 200 may function to compute, in real-time or near real-time by the one or more computer processors, an application similarity index score that represents the overall application-level degree of similarity between the operational behavior of the subject deployed AI application during the target time span, as represented by the test object, and the baseline operational behavior of the same deployed AI application during a historical time span different from the target time span, as represented by the reference state object. In other words, the application similarity index score may represent a global assessment of behavioral consistency across all assessed columns, features and performance metrics associated with the subject deployed AI application, whereas each column-level similarity score (e.g., pairwise assessment similarity score, pairwise assessment column similarity score) may reflect a localized measure of similarity for an individual feature or metric-such as input structure, output length, latency, or resource utilization-evaluated independently from other features.

For instance, in a non-limiting example, the first pairwise assessment similarity score (e.g., first pairwise assessment column similarity score) computed by S220 may only represent a degree of similarity (or difference) between the data distribution of outputs included in the test object and a corresponding output data distribution included in the reference state object.

Furthermore, in such a non-limiting example, the second pairwise assessment similarity score (e.g., second pairwise assessment column similarity score) computed by S220 may only represent a degree of similarity (or difference) between the distribution of values of the test object corresponding to the first distinct performance efficacy metric (e.g., embedding generation latency) and the corresponding data distribution of values of the reference state object associated with the same performance efficacy metric.

Furthermore, in such a non-limiting example, the third pairwise assessment similarity score (e.g., third pairwise assessment column similarity score) computed by S220 may only represent a degree of similarity (or difference) between the distribution of values of the test object corresponding to the second distinct performance efficacy metric (e.g., compute resource utilization) and the corresponding data distribution of values of the reference state object associated with the same performance efficacy metric.

Furthermore, in such a non-limiting example, the fourth pairwise assessment similarity score (e.g., fourth pairwise assessment column similarity score) computed by S220 may only represent a degree of similarity (or difference) between the distribution of values of the test object corresponding to the third distinct performance efficacy metric (e.g., output response length) and the corresponding data distribution of values of the reference state object associated with the same performance efficacy metric.

Furthermore, in such a non-limiting example, the fifth pairwise assessment similarity score (e.g., fifth pairwise assessment column similarity score) computed by S220 may only represent a degree of similarity (or difference) between the distribution of values of the test object corresponding to the fourth distinct performance efficacy metric (e.g., output text readability) and the corresponding data distribution of values of the reference state object associated with the same performance efficacy metric.

Accordingly, in such a non-limiting example, S220 may function to compute an application similarity index score for the subject deployed AI application that quantitatively represents a degree of similarity between the test object and the reference state object. For instance, in a non-limiting example, the application similarity index score for the subject deployed AI application may be computed based on a combination (e.g., weighted combination) of the set of pairwise assessment similarity scores (e.g., all pairwise assessment column similarity scores). Stated another way, in one or more embodiments, the application similarity index score for the subject deployed AI application may be computed based on a combination (e.g., weighted combination) of the first pairwise assessment similarity score, the second pairwise assessment similarity score, the third pairwise assessment similarity score, the fourth pairwise assessment similarity score, and the fifth pairwise assessment similarity score.

It shall be recognized that, in some embodiments, the application similarity index score may be displayed in association with the set of pairwise assessment similarity scores on a graphical user interface.

It shall be further recognized that, in some embodiments, the computed application similarity index score and/or the computed column-level similarity scores may fall between any two values (e.g., between zero (0) and one hundred (100), between zero (0) and one (1), a set of alphanumeric characters (e.g., A-Z), or any range of non-numerical indicators (e.g., color gradations like green to yellow to red, or descriptive levels like low to intermediate to high, etc.).

Detecting Misbehaviors and Deviant Features

S230, which includes detecting misbehaviors and deviant features, may function to detect, by one or more computer processors, that a misbehavior occurred in the deployed AI application during the target time span and one or more deviant features contributing to the misbehavior in response to executing the one or more application behavior tests. A misbehavior, as generally referred to herein, may refer to any operational anomaly, deviation, or degradation in the behavior of the deployed AI application that causes the deployed AI application to operate with one or more feature value distributions (e.g., attribute value data distributions or the like) represented in the test object to differ in a statistically significant manner from a corresponding feature value distribution represented in the reference state object. A deviant feature, as generally referred to herein, may refer to a specific feature, contextual attribute, or column of the test object whose data distribution differs in a statistically significant manner from the corresponding feature, contextual attribute, or column, of the reference state object.

In one or more embodiments, in response to executing an automated pairwise assessment (e.g., column pairwise assessment, feature pairwise assessment, etc.) between a data distribution of a target feature (e.g., column, metric, attribute, etc.) included in the test object and a corresponding data distribution of the same feature (e.g., same column, same metric, same attribute, etc.) included in the reference state object, S230 may function to automatically compute a degree of similarity between the data distribution of the target feature (e.g., column, metric, attribute, etc.) included in the test object and the corresponding data distribution of the same feature of the reference state object. The degree of similarity may quantitatively indicate the extent to which the target feature in the test object conforms to its corresponding historical distributional profile as captured in the reference state object.

It shall be recognized that, in some embodiments, the degree of similarity may be computed using a Kolmogorov-Smirnov analytical test that may quantify the maximum difference between the cumulative distribution of the target feature in the test object and the corresponding cumulative distribution of the reference state object.

It shall be recognized that, in some embodiments, the degree of similarity may be computed using a Chi-squared analytical test, which may measure the difference between the observed and expected frequency distributions of the target feature in the test object and the reference state object.

Figure 13:
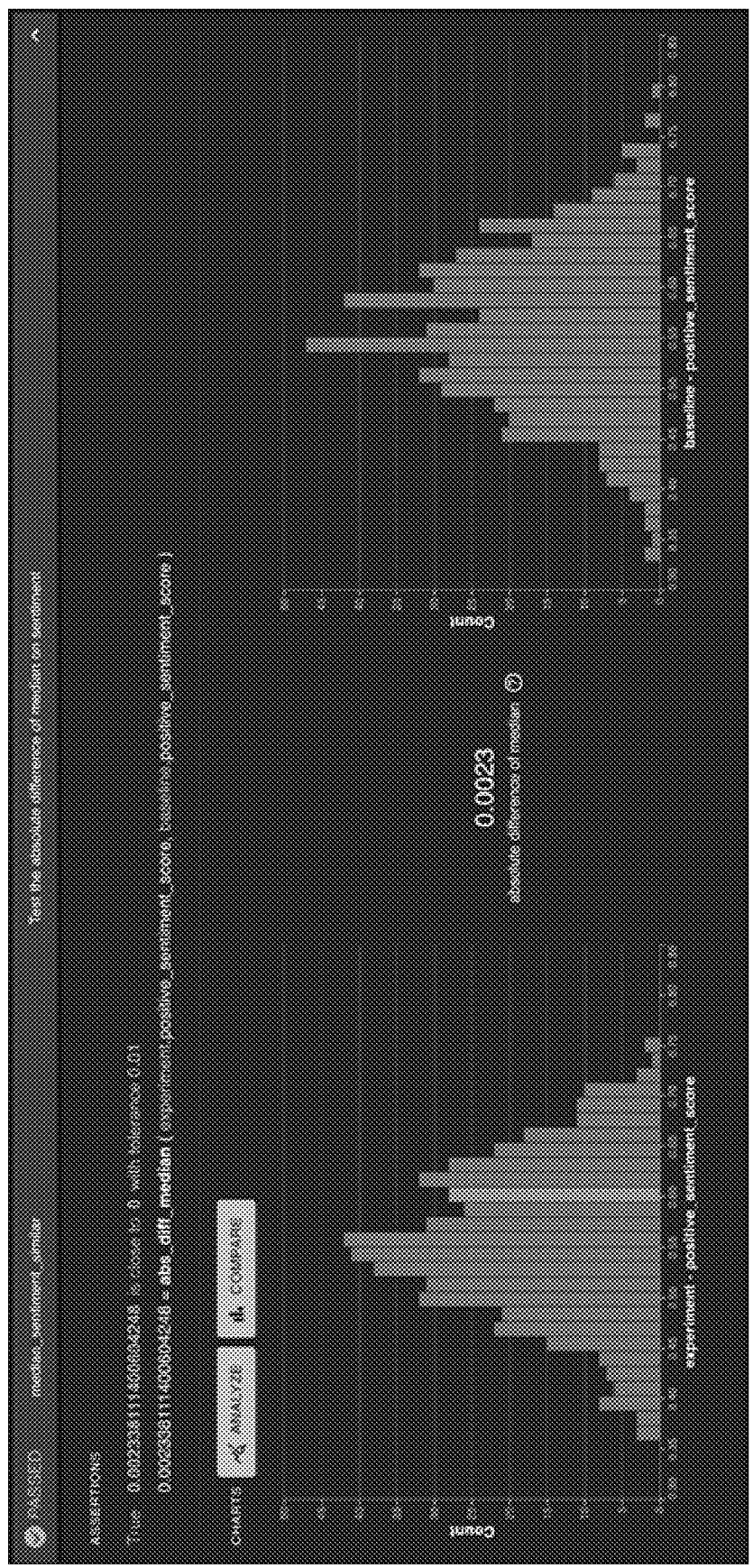
Figure 14:
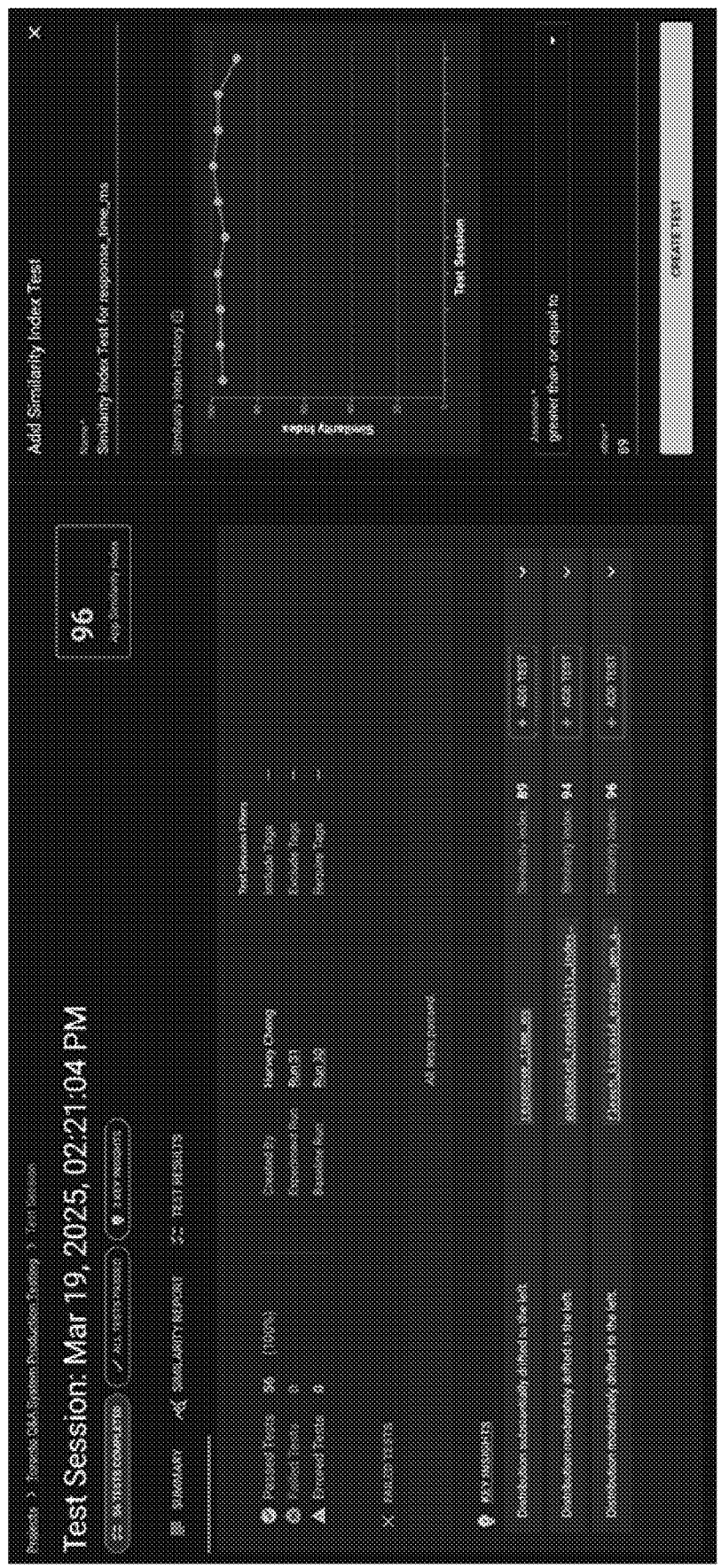
Figure 15:
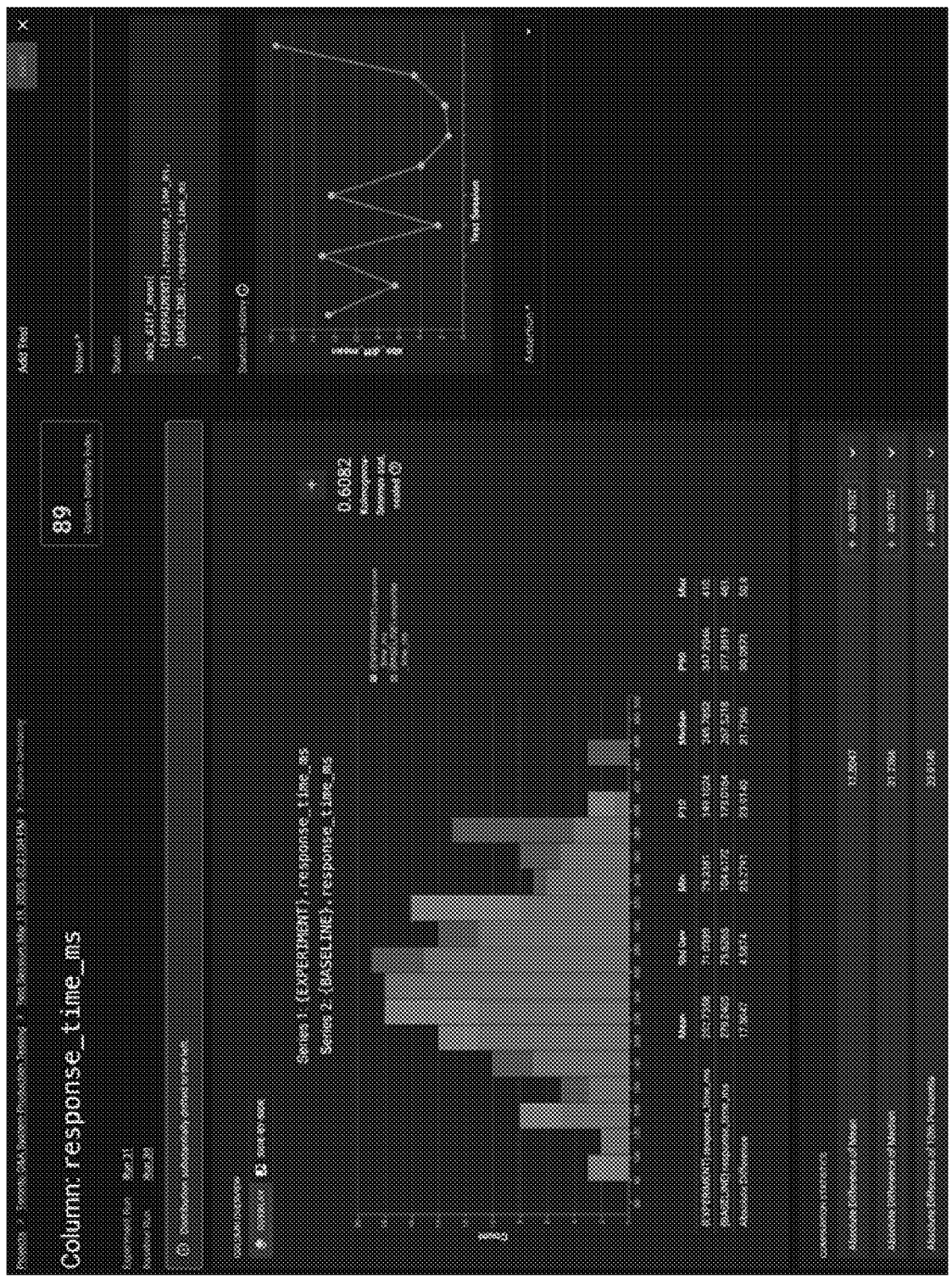
Figure 16:
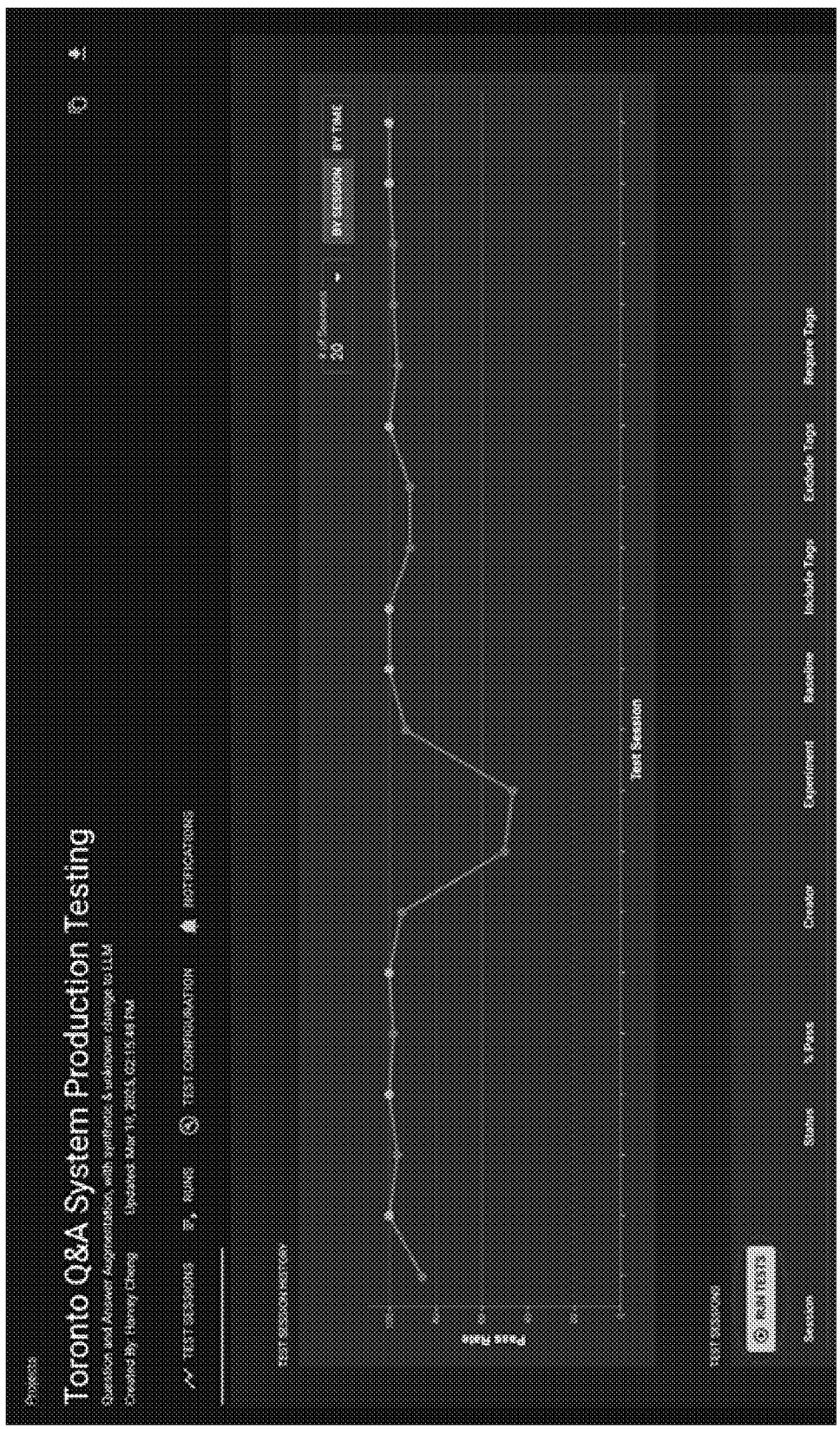

It shall be recognized that, in some embodiments, the degree of similarity may be computed using an absolute difference of the arithmetic mean, which may calculate the absolute value of the difference between the arithmetic mean of the feature value distribution of the target feature in the test object and the arithmetic mean of the corresponding feature value distribution of the same feature in the reference state object, as shown generally by way of example in FIG. 13.

Figure 20A:
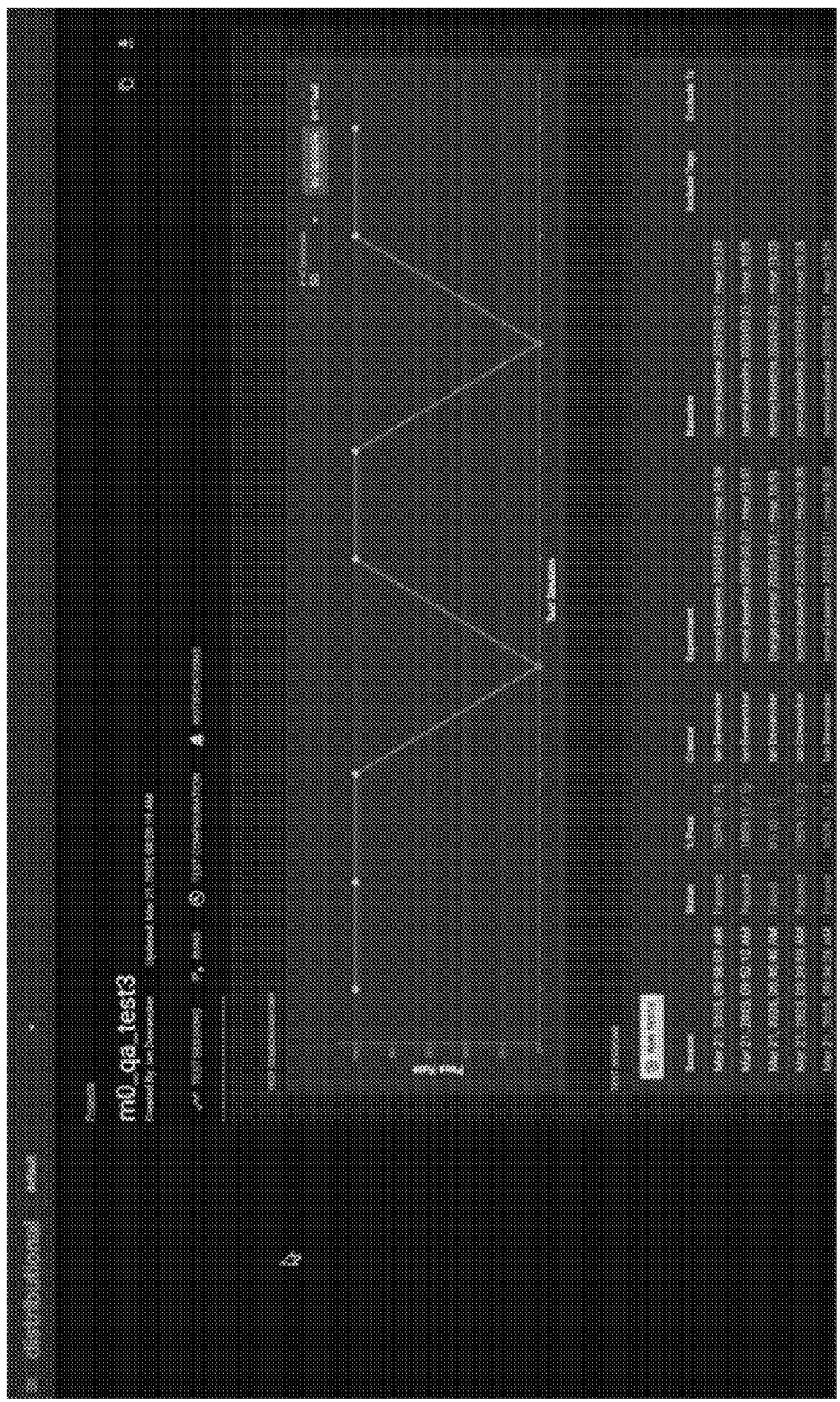
Figure 20B:
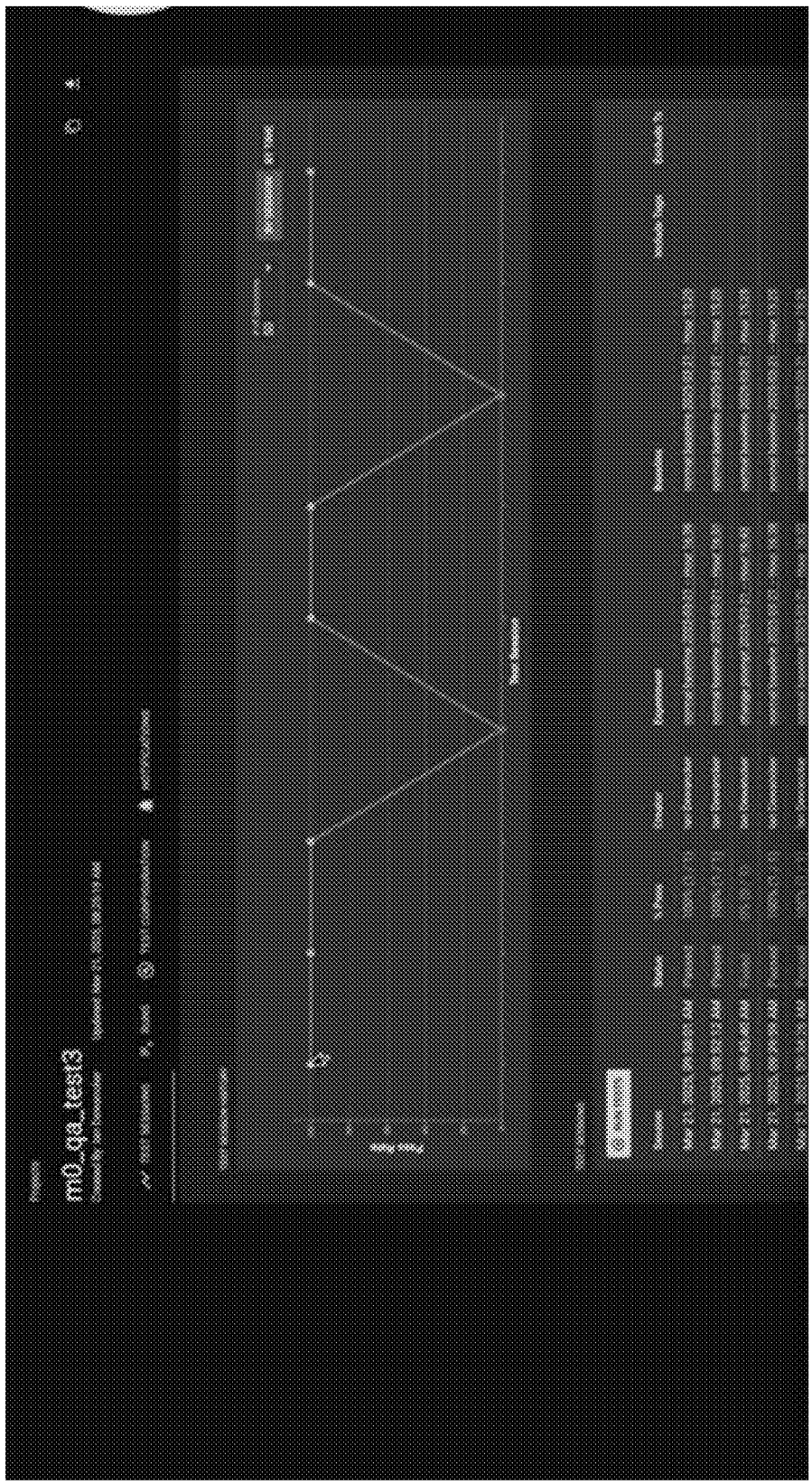
Figure 20C:
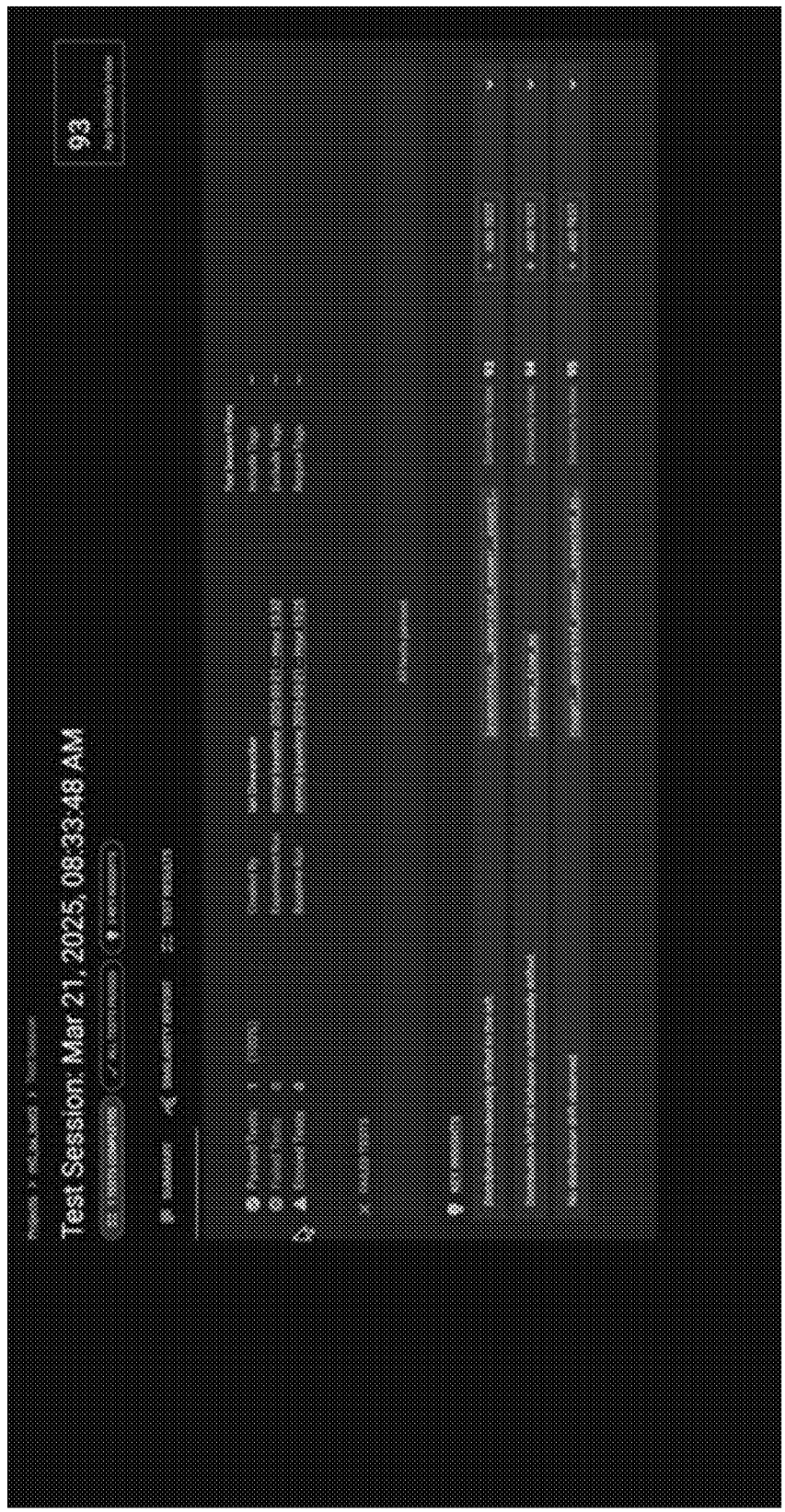
Figure 20D:
Figure 20E:
Figure 20F:
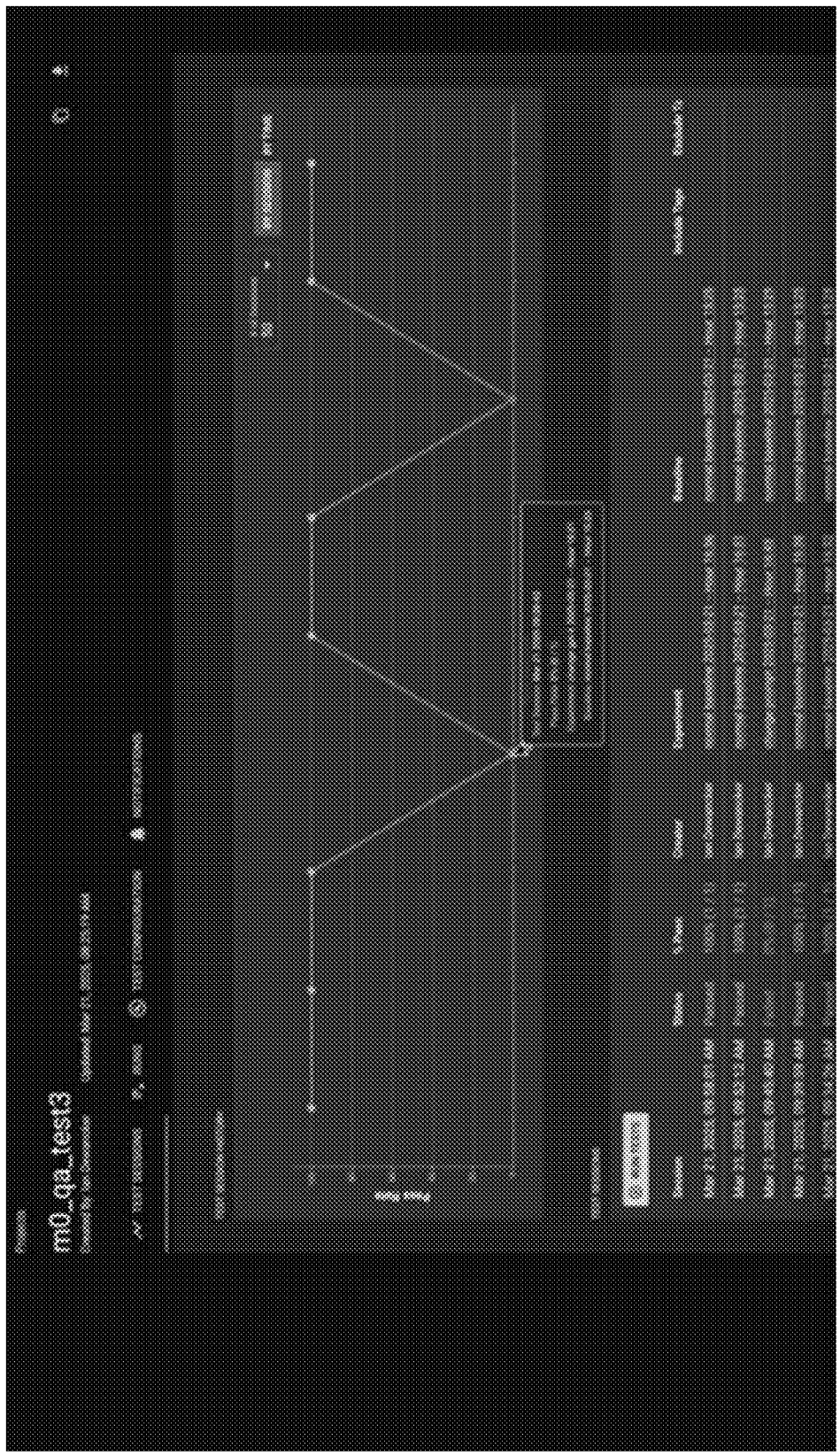
Figure 20G:
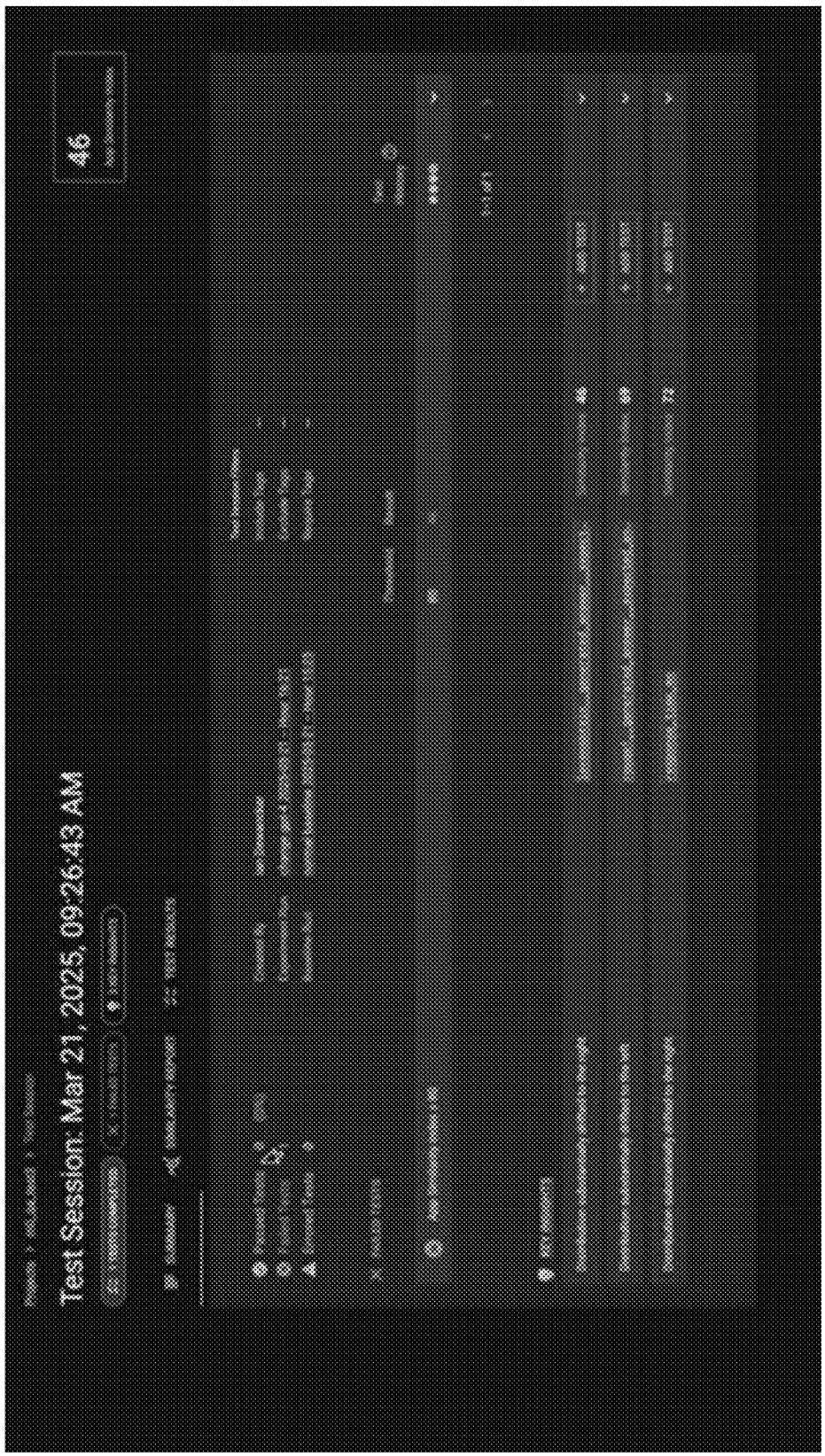
Figure 20H:
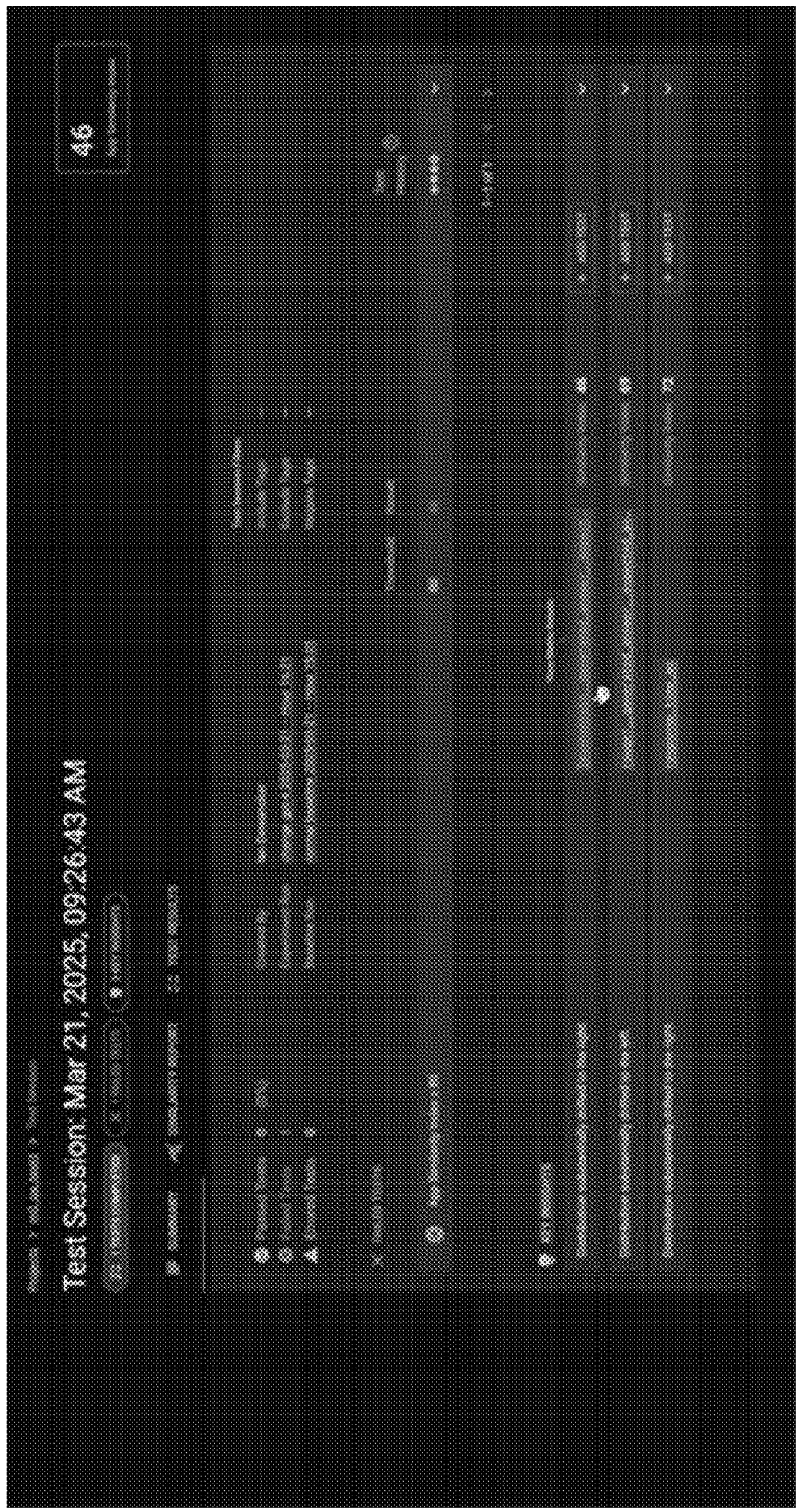
Figure 20I:
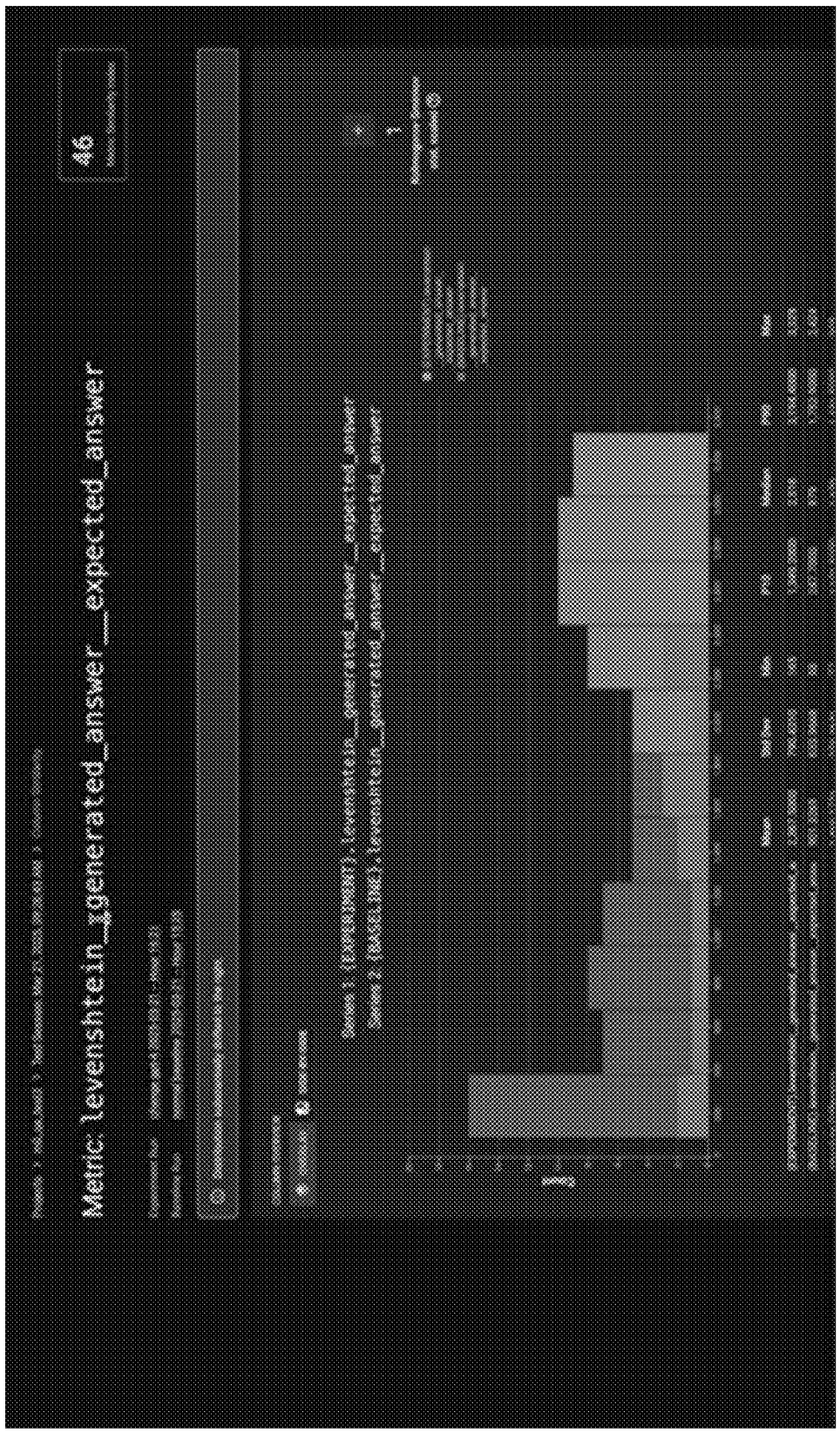
Figure 20J:
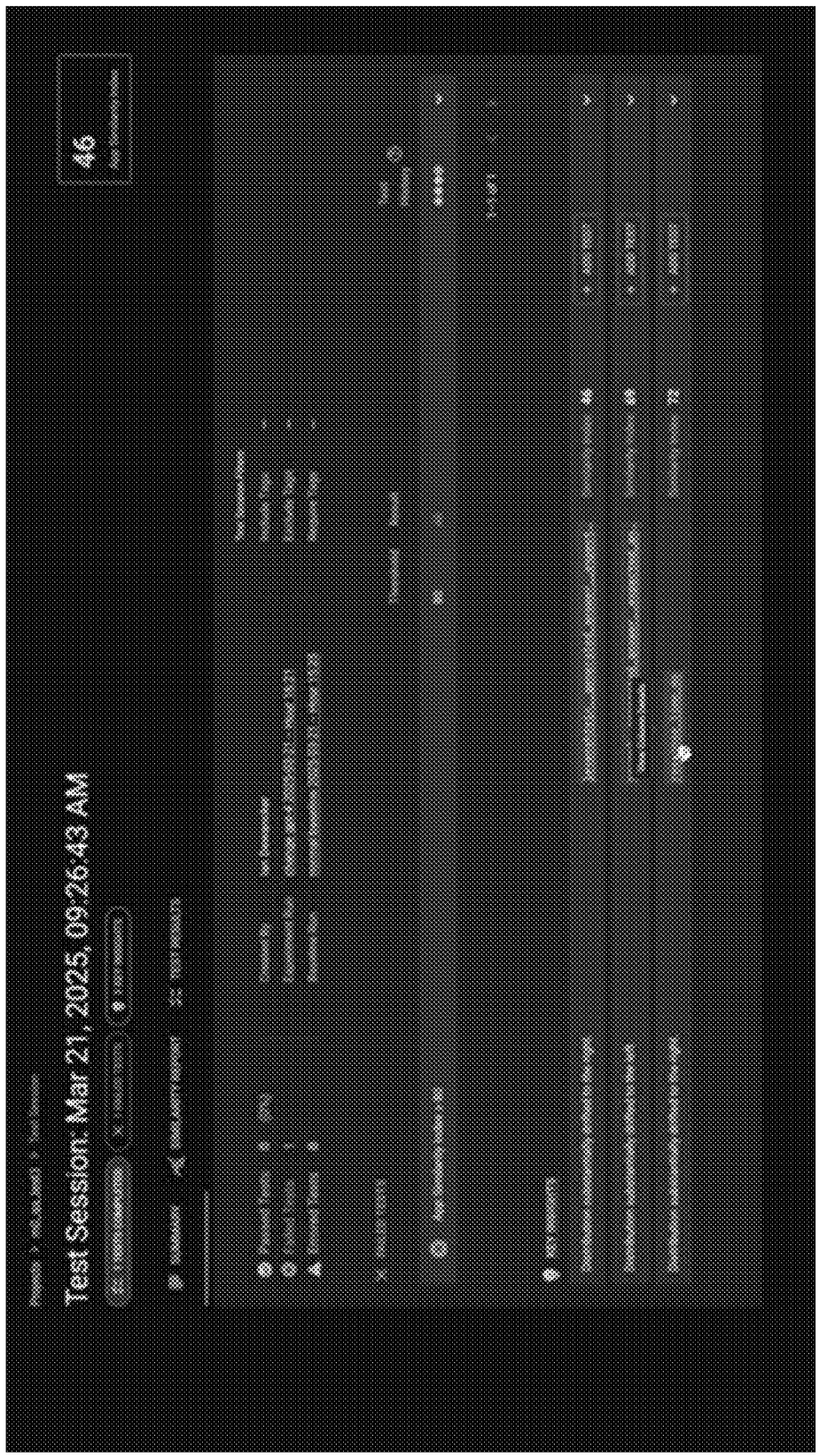
Figure 20K:
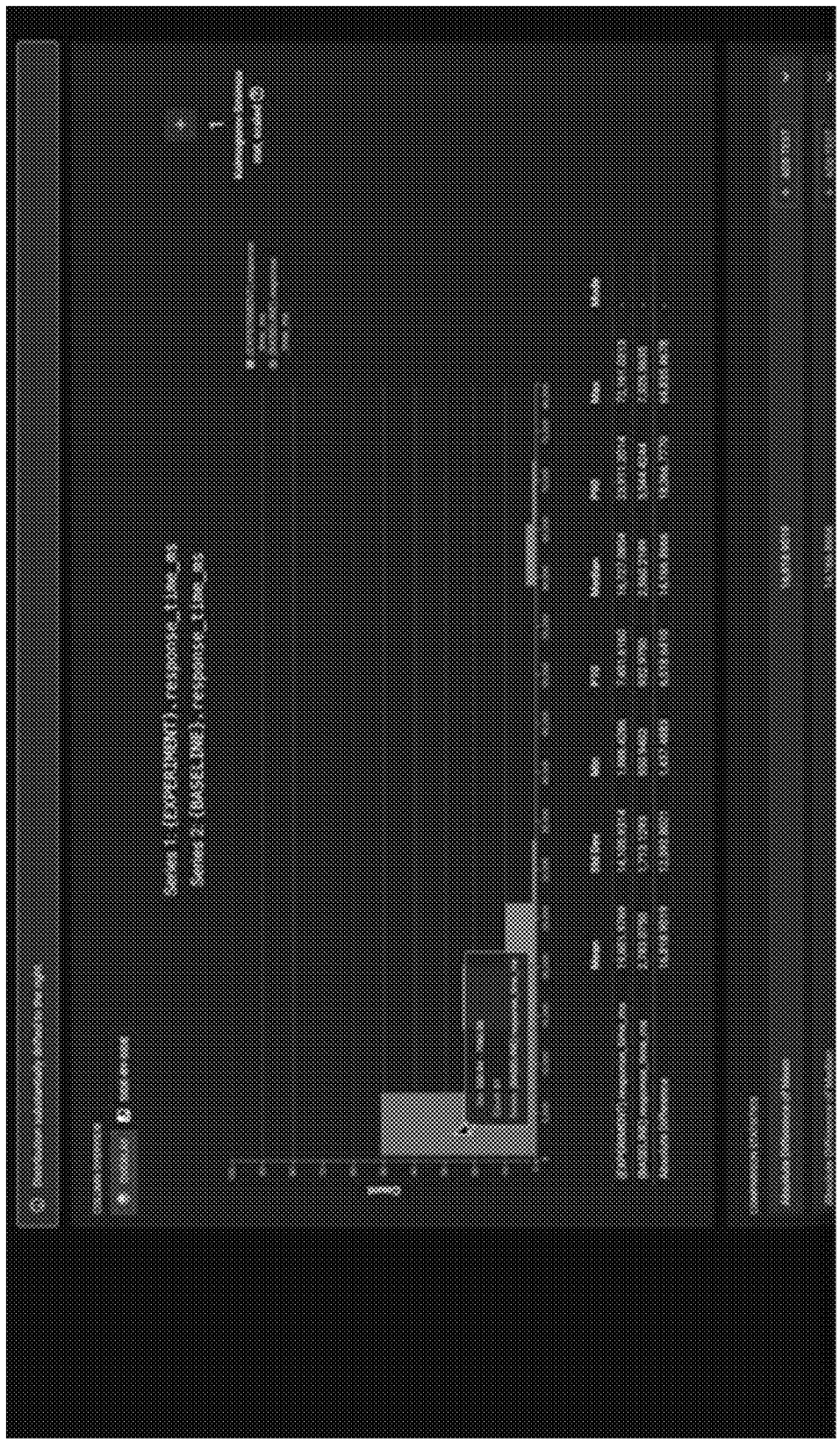
Figure 20L:
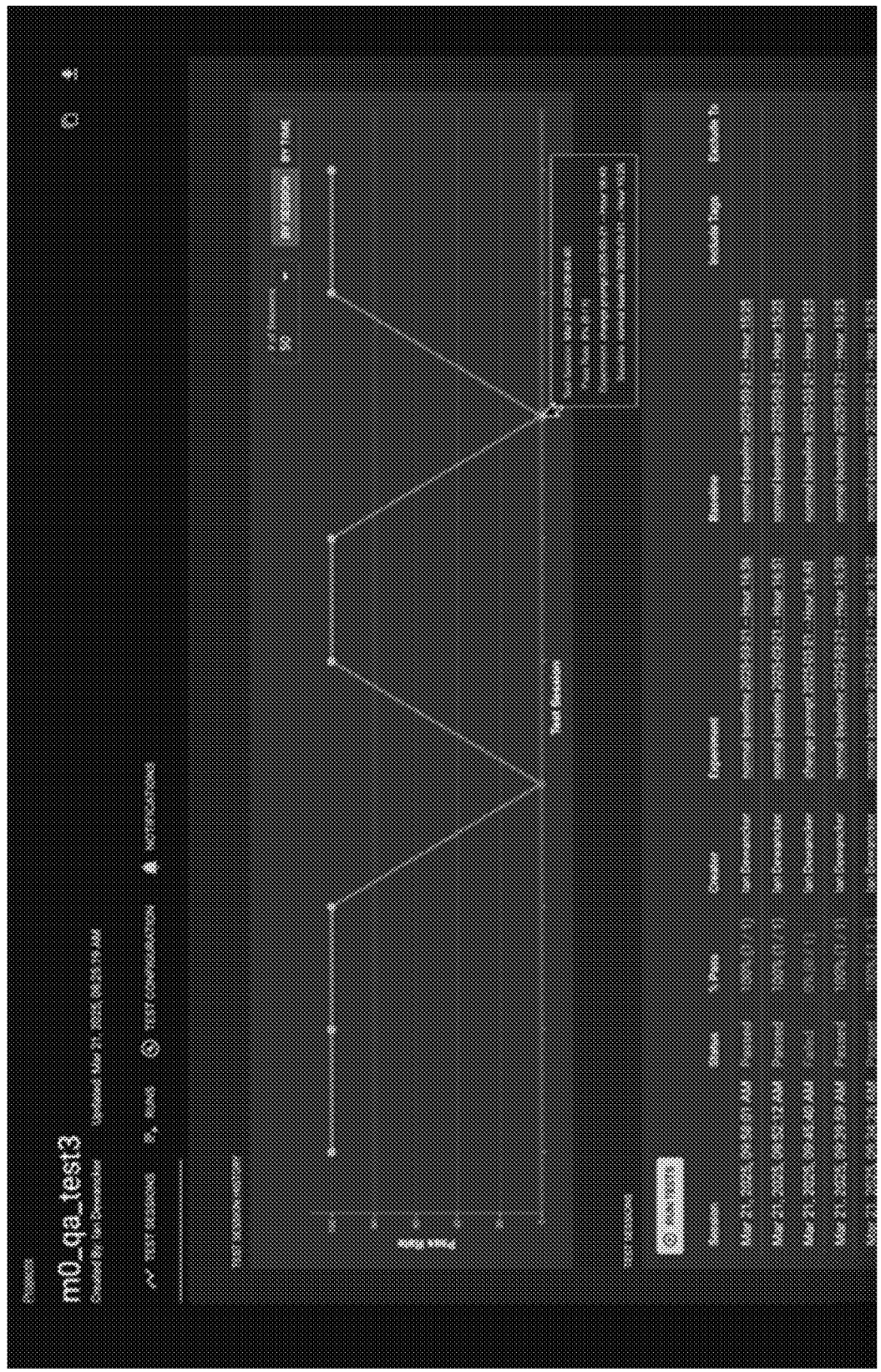
Figure 20M:
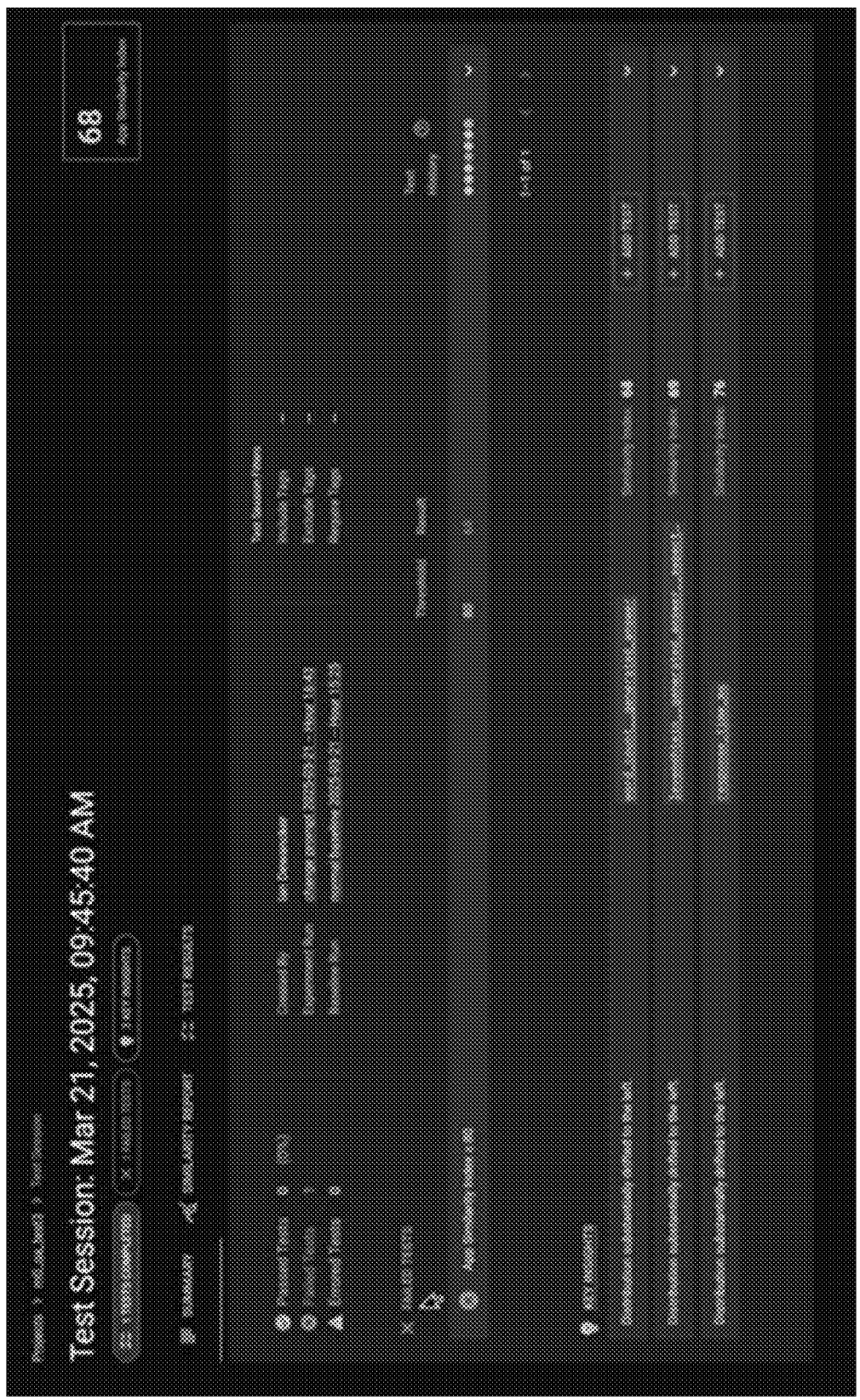
Figure 20N:
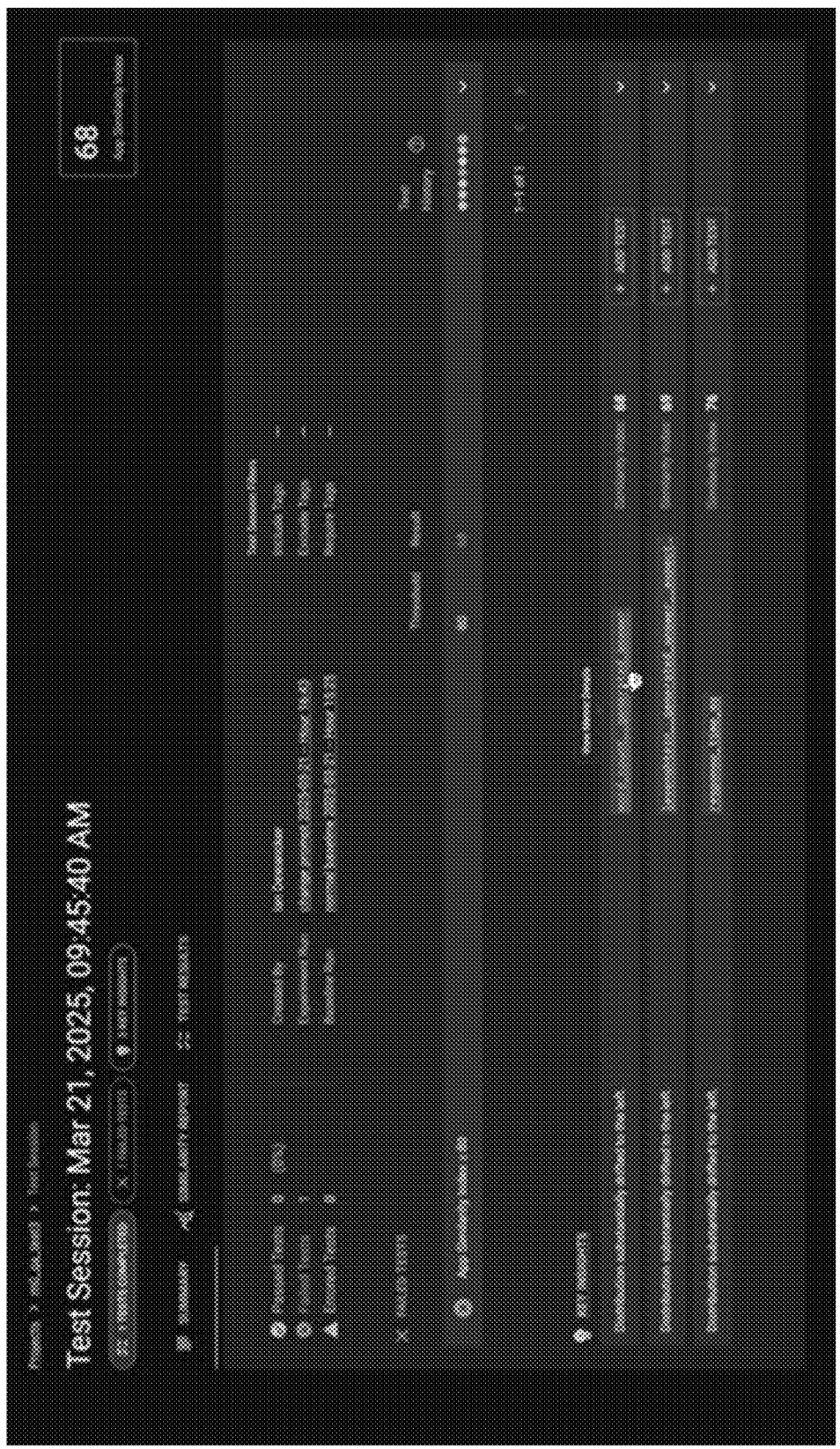
Figure 20O:
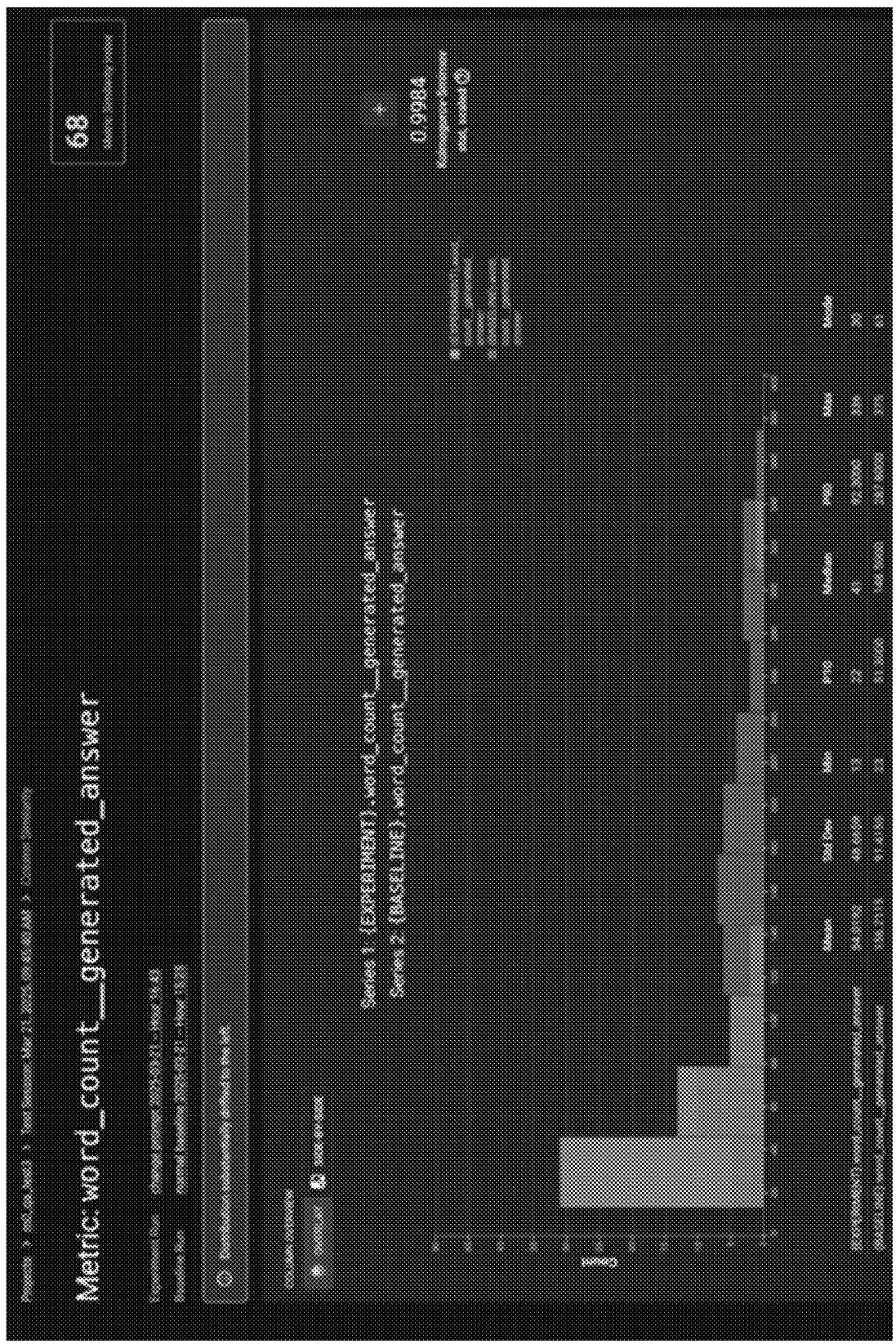

Accordingly, in one or more embodiments, S230 may function to automatically detect that a misbehavior occurred in the deployed AI application when the computed degree of similarity for at least one feature (e.g., attribute, metric, column, etc.) fails to satisfy a predetermined minimum similarity threshold, thereby indicating that the current behavior of the at least one feature, as represented in the test object, has deviated from its corresponding historical distribution behavioral pattern encoded in the reference state object, as shown generally by way of example in FIGS. 20A-20O.

For instance, with continued reference to the above non-limiting example, in response to executing the first automated pairwise assessment between the distribution of the set of outputs included in the test object and the distribution of the set of outputs included in the reference state object, S230 may function to compute the degree of similarity that indicates how similar or dissimilar the distribution of the set of outputs included in the test object is to the distribution of the set of outputs included in the reference state object. Accordingly, in such a non-limiting example, S230 may function to automatically detect that a misbehavior occurred in the deployed AI application during the target time span based on the computed degree of similarity failing to satisfy a predetermined minimum data distribution similarity threshold or satisfying a condition indicative of anomalous deviation.

Additionally, or alternatively, with continued reference to the above non-limiting example, in response to executing the second automated pairwise assessment between the distribution of the set of contextual attribute values corresponding to the first distinct performance efficacy metric (e.g., embedding generation latency) in the test object and the distribution of the set of contextual attribute values corresponding to the first distinct performance efficacy metric (e.g., embedding generation latency) in the reference state object, S230 may function to compute the degree of similarity that indicates how similar or dissimilar the distribution of the set of contextual attribute values corresponding to the first distinct performance efficacy metric in the test object is to the distribution of the set of contextual attribute values corresponding to the first distinct performance efficacy metric (e.g., embedding generation latency) in the reference state object.

Accordingly, in such a non-limiting example, S230 may function to automatically detect that a misbehavior occurred in the deployed AI application during the target time span based on the computed degree of similarity failing to satisfy a predetermined minimum data distribution similarity threshold or satisfying a condition indicative of anomalous deviation. It shall be recognized that, in such an embodiment, the deviant feature contributing to the misbehavior may be the specific application component (e.g., embeddings generation service) of the deployed AI application responsible for the observed performance degradation in the first distinct performance efficacy metric (e.g., embedding generation latency).

Additionally, or alternatively, with continued reference to the above non-limiting example, in response to executing the third automated pairwise assessment between the distribution of the second set of contextual attribute values corresponding to the second distinct performance efficacy metric (e.g., compute resource utilization) in the test object and the distribution of the second set of contextual attribute values corresponding to the second distinct performance efficacy metric (e.g., compute resource utilization) in the reference state object, S230 may function to compute the degree of similarity that indicates how similar or dissimilar the distribution of the second set of contextual attribute values corresponding to the second distinct performance efficacy metric in the test object is to the distribution of the second set of contextual attribute values corresponding to the second distinct performance efficacy metric in the reference state object.

Accordingly, in such a non-limiting example, S230 may function to automatically detect that a misbehavior occurred in the deployed AI application during the target time span based on the computed degree of similarity failing to satisfy a predetermined minimum data distribution similarity threshold or satisfying a condition indicative of anomalous deviation. It shall be recognized that, in such an embodiment, the deviant feature contributing to the misbehavior may be the specific application component (e.g., a machine learning model) within the deployed AI application responsible for the observed performance degradation in the second distinct performance efficacy metric (e.g., compute resource utilization).

Additionally, or alternatively, with continued reference to the above non-limiting example, in response to executing the fourth automated pairwise assessment between the distribution of the third set of contextual attribute values corresponding to the third distinct performance efficacy metric (e.g., output response length) in the test object and the distribution of the third set of contextual attribute values corresponding to the third distinct performance efficacy metric (e.g., output response length) in the reference state object, S230 may function to compute the degree of similarity that indicates how similar or dissimilar the distribution of the third set of contextual attribute values corresponding to the third distinct performance efficacy metric in the test object is to the distribution of the third set of contextual attribute values corresponding to the third distinct performance efficacy metric in the reference state object.

Accordingly, in such a non-limiting example, S230 may function to automatically detect that a misbehavior occurred in the deployed AI application during the target time span based on the computed degree of similarity failing to satisfy a predetermined minimum data distribution similarity threshold or satisfying a condition indicative of anomalous deviation. It shall be recognized that, in such an embodiment, the deviant feature contributing to the misbehavior may be the specific application component (e.g., the machine learning model, the version of the machine learning model, the weights and biases of the machine learning model, the model prompt configuration, etc.) within the deployed AI application responsible for the observed performance degradation in the third distinct performance efficacy metric (e.g., output response length).

Additionally, or alternatively, with continued reference to the above non-limiting example, in response to executing the fifth automated pairwise assessment between the distribution of the fourth set of contextual attribute values corresponding to the fourth distinct performance efficacy metric (e.g., output text readability) in the test object and the distribution of the fourth set of contextual attribute values corresponding to the fourth distinct performance efficacy metric (e.g., output text readability) in the reference state object, S230 may function to compute the degree of similarity that indicates how similar or dissimilar the distribution of the fourth set of contextual attribute values corresponding to the fourth distinct performance efficacy metric in the test object is to the distribution of the fourth set of contextual attribute values corresponding to the fourth distinct performance efficacy metric in the reference state object.

Accordingly, in such a non-limiting example, S230 may function to automatically detect that a misbehavior occurred in the deployed AI application during the target time span based on the computed degree of similarity failing to satisfy a predetermined minimum data distribution similarity threshold or satisfying a condition indicative of anomalous deviation. It shall be recognized that, in such an embodiment, the deviant feature contributing to the misbehavior may be the specific application component (e.g., the machine learning model, the version of the machine learning model, the weights and biases of the machine learning model, the model prompt configuration, etc.) within the deployed AI application responsible for the observed performance degradation in the fourth distinct performance efficacy metric (e.g., output text readability).

It shall be recognized that, in some embodiments, the above-described embodiments may illustrate various non-limiting examples by which S230 may detect misbehaviors and identify corresponding deviant features across distinct performance efficacy metrics. In some implementations, these automated pairwise assessments may be executed concurrently or sequentially. The deviant feature(s) identified by S230 may span a range of elements, including but not limited to machine learning model configurations, prompt engineering parameters, third-party services used by the deployed AI application, memory or compute bottlenecks, network throughput limitations, and architectural bottlenecks.

In one or more embodiments, S230 may function to detect, by the one or more computer processors, that a misbehavior occurred in the deployed AI application during the target time span and the one or more deviant features contributing to the misbehavior in response to the one or more application behavior tests indicating that at least one distributional deviation exists between the test object and the reference state object. For instance, in a non-limiting example, the deployed AI application may include a plurality of distinct components that collectively operate to process a set of inputs and generate a set of outputs during a target time span (e.g., each distinct component of the plurality of distinct components of the deployed AI application performs a specific task that assists the deployed AI application in processing the set of inputs and generating the set of outputs during the target time span). Accordingly, in such a non-limiting example, the detection performed in S230 may include identifying one or more specific components among the plurality of distinct components of the deployed AI application that are associated with anomalous behavior patterns during the target time span relative to the behavioral distribution of their corresponding components in the reference state object and/or one or more components among the plurality of distinct components of the deployed AI application that are performing as expected relative to the behavioral distribution of their corresponding components in the reference state object.

Figure 18:
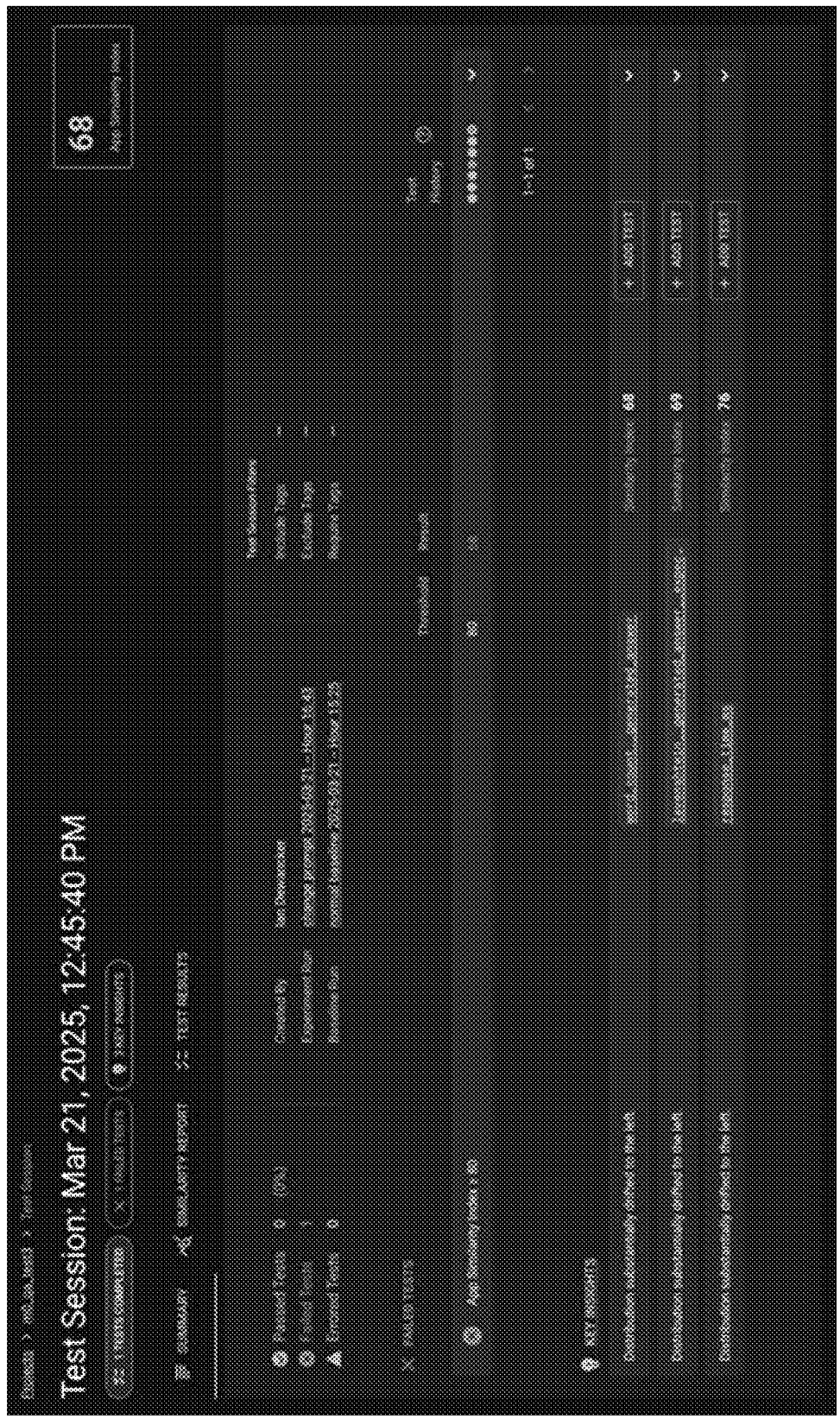
Figure 19:
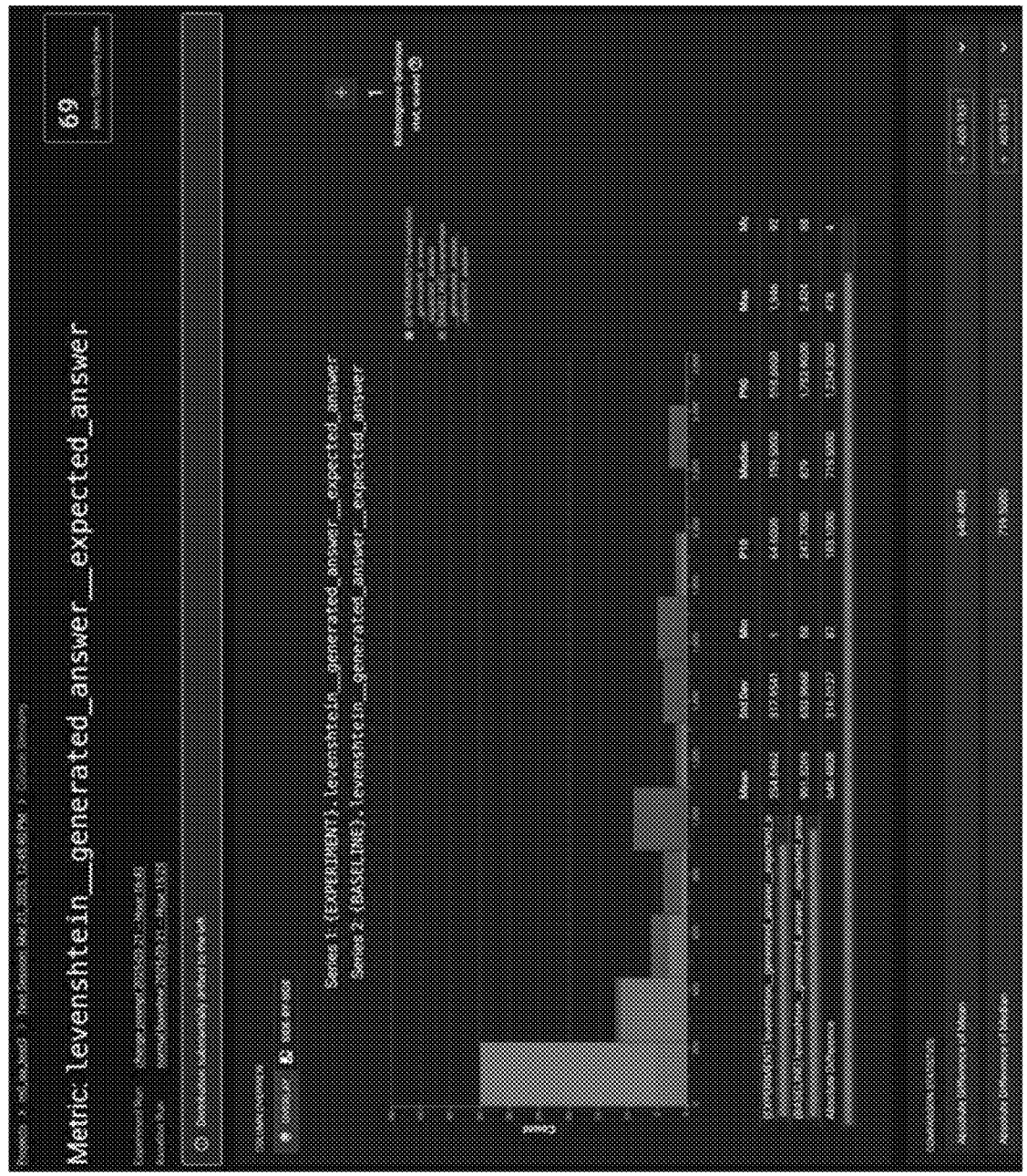

It shall be further recognized that, in one or more embodiments, S230 may function to detect that a misbehavior occurred in the deployed AI application based on the computed application similarity index score failing to satisfy a predetermined minimum application similarity score threshold, as shown generally by way of example in FIG. 18.

Real-Time Alerting of Misbehaviors and Deviant Features

In one or more embodiments, in response to detecting that the misbehavior occurred in the deployed AI application during the target time span, the system or service implementing method 200 may function to automatically generate, in real-time by the one or more computer processors, an application behavior alert. The application behavior alert, in some embodiments, may include an indication of the misbehavior, a description of the deviant feature or features contributing to the misbehavior, the pairwise assessment findings, the computed application-level similarity index score, and/or the computed pairwise assessment column similarity scores.

Accordingly, in such an embodiment, in response to generating the application behavior alert, the system or service implementing method 200 may function to transmit, in real-time or near real-time, the application behavior alert to the subscribing entity to which the deployed AI application corresponds using a real-time messaging service (e.g., Slack®).

2.4 Returning Detected Deviant Features

S240, which includes returning detected deviant features, may function to return, by one or more computer processors, the one or more deviant features contributing to the misbehavior of the deployed AI application to the subscribing entity associated with the deployed AI application. As described in more detail herein, S240 may function to return the detected deviant features contributing to the misbehavior of the deployed AI application in a plurality of modes.

At least one technical benefit of S240 returning the detected deviant features may mitigate the lack of explainability associated with the deployed AI application, which, in some embodiments, may be a "black box" application or system. Accordingly, by returning the specific deviant features that contributed to the misbehavior, the system or service implementing method 200 may provide the subscribing entity with more transparency and explainability into the application's decision-making process, enabling a better understanding of how certain inputs, application configurations, or machine learning models used by the deployed AI application led to the detected misbehaviors. Such improved transparency allows the subscribing entity to more effectively address and resolve the detected misbehavior issues, enhancing the overall trust in and performance of the deployed AI application.

Application Programming Interface

In one or more embodiments, the system or service implementing method 200 may function to return the detected deviant features to the subscribing entity associated with the deployed AI application via an application programming interface. In such an embodiment, the system or service implementing method 200 may function to receive, via an application programming interface (API), a request from the subscribing entity to assess the test object associated with the deployed AI application against the reference state object corresponding to the deployed AI application and, in turn, the system or service implementing method 200 may function to return the detected deviant features to the subscribing entity via the API.

For instance, in a non-limiting example, the subscribing entity may send a query to the system or service requesting the evaluation of the test object against the reference state object for detecting any distributional behavioral deviations or anomalies. After receiving the request, the system or service implementing method 200 may then process the request and perform one or more automated distribution assessments (e.g., one (1) automated distribution assessment, two (2) distinct automated distribution assessments, three (3) distinct automated distribution assessments, four (4) distinct automated distribution assessments, five (5) distinct automated distribution assessments, fifty (50) distinct automated distribution assessments, or any other suitable number of automated distribution assessments) between the test object and the reference state object in analogous ways as described above. Accordingly, after performing the one or more automated distribution assessments between the test object and the reference state object, the system or service implementing method 200 may function to detect that a misbehavior occurred in the deployed AI application and one or more deviant features contributing to the misbehavior and, in turn, transmit the one or more deviant features to the subscribing entity via the API.

It shall be recognized that, in some embodiments, returning the one or more deviant features contributing to the misbehavior to the subscribing entity via the API may enable the subscribing entity to mitigate the misbehavior from occurring within the deployed AI application at a future time by modifying operational parameters of the deployed AI application corresponding to the one or more deviant features.

It shall be further recognized that, in some embodiments, the one or more automated distribution assessments (e.g., automated pairwise assessments or the like) may be executed for any column, feature, attribute, or metric included in the test object in analogous ways as described herein.

Graphical User Interface

In one or more embodiments, S240 may function to instantiate an application behavior assessment user interface that includes an application behavior assessment visualization. In such an embodiment, the application behavior assessment visualization may be an interactive graphical representation that includes a plurality of application behavior assessments corresponding to the deployed AI application, as shown generally by way of example in FIGS. 16, 17, and 20A-20O.

For instance, in a non-limiting example, the application behavior assessment visualization may include an interactive line graph that includes a plurality of distinct selectable markers that represent a plurality of application behavior assessments executed for the deployed AI application over different time spans. In such a non-limiting example, each distinct selectable marker of the plurality of distinct selectable markers may correspond to a distinct application behavior assessment executed to assess an operation behavior of the deployed AI application for a distinct time span. It shall be further recognized that, in such a non-limiting example, each distinct application behavior assessment executed a respective set of application behavior tests to assess the operational behavior of the deployed AI application for the respective time span.

Stated another way, in some embodiments, the application behavior assessment visualization may enable the subscribing entity to interactively explore the current and/or historical operational behavior of the deployed AI application by navigating through the distinct application behavior assessments over time. Such interactive exploration may provide the subscribing entity with deeper insights into how the deployed AI application has performed across various time periods, facilitating informed decisions regarding adjustments, optimizations, or corrective actions for the deployed AI application.

Figure 17:
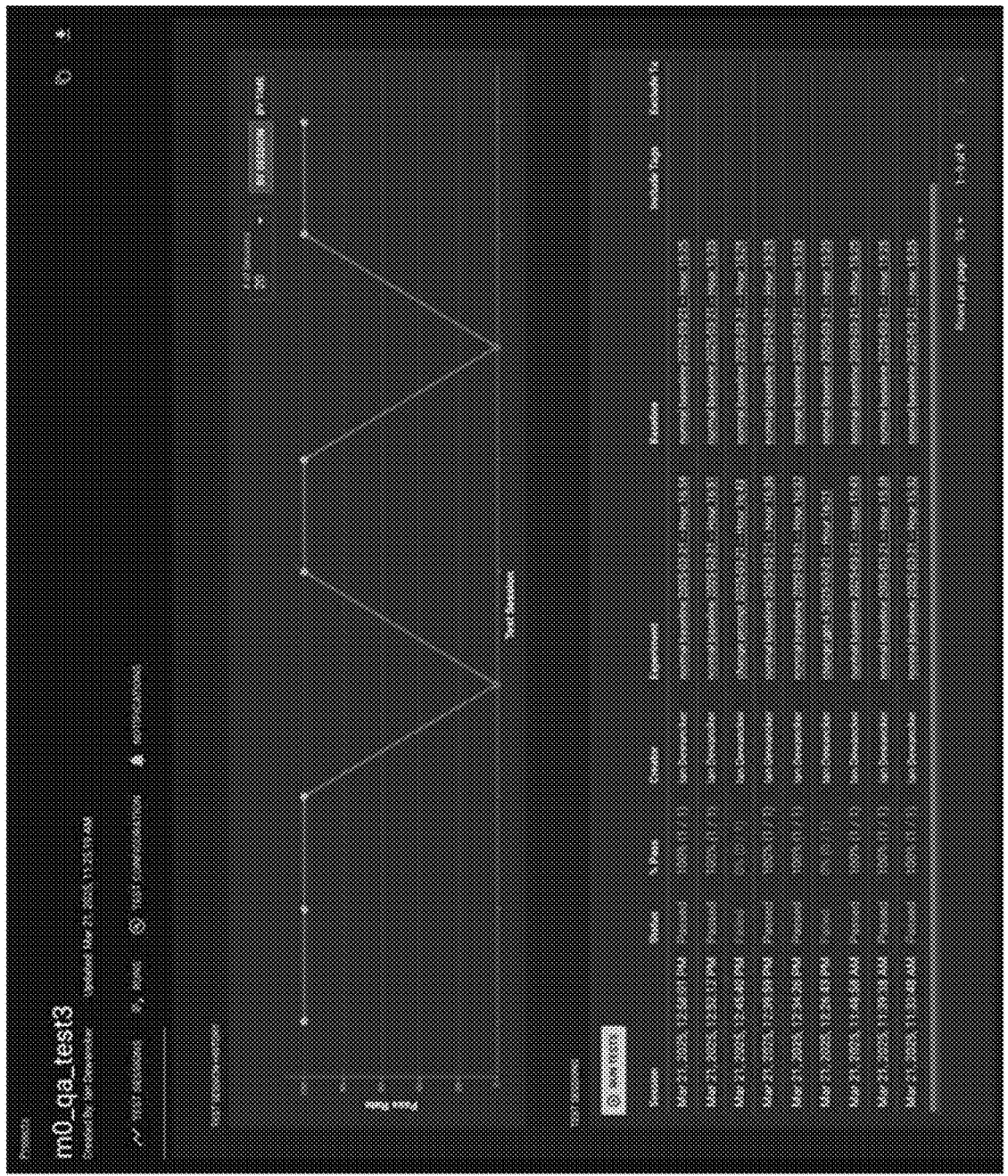

Additionally, or alternatively, in one or more embodiments, the application behavior assessment user interface may further include an application behavior assessment matrix, as shown generally by way of example in FIG. 17. The application behavior assessment matrix may be interactive and includes a plurality of selectable application behavior assessment rows. In such an embodiment, each distinct selectable application behavior assessment of the plurality of selectable application behavior assessment rows may correspond to a respective application behavior assessment performed for the deployed AI application.

For instance, in a non-limiting example, each distinct selectable application behavior assessment of the plurality of selectable application behavior assessment rows may include assessment date and time data, assessment status data (e.g., pass/fail), percentage pass rate data, creator data, a test object indicator, and a reference state object indicator.

As described above, in one or more embodiments, S230 may function to execute one or more application behavior tests that assess an operational behavior of the deployed AI application by assessing a test object associated with the deployed AI application against a reference state object associated with the same deployed AI application. Accordingly, with continued reference to the above non-limiting example, S240 may function to receive, via the application behavior assessment user interface, an input from the subscribing entity selecting a selectable marker of the plurality of distinct selectable markers displayed on the application behavior assessment visualization. In such an embodiment, the distinct application behavior assessment corresponding to the selectable marker selected by the subscribing entity may correspond to the one or more application behavior tests that assess the operational behavior of the deployed AI application by assessing the test object associated with the deployed AI application against the reference state object associated with the same deployed AI application.

Accordingly, in such a non-limiting example, in response to receiving the input from the subscribing entity selecting the selectable marker, S240 may function to instantiate, by one or more computer processors, an application behavior assessment details user interface that corresponds to the distinct application behavior assessment that executed the one or more application behavior tests, as shown generally by way of example in FIG. 18. The application behavior assessment details user interface, in one or more embodiments, may include one or more of: a total number of the one or more application behavior tests that satisfied distribution test criteria of the one or more application behavior tests, a total number of the one or more application behavior tests that did not satisfy the distribution test criteria of the one or more application behavior tests, an application similarity index score that quantitatively represents a degree of similarity between the test object and the reference state object, and a plurality of distinct selectable key insights rows that correspond to the one or more deviant features contributing to the misbehavior.

A selectable key insights row, as generally referred to herein, may visually represent a distinct feature, column, or metric for which a statistically significant behavioral deviation has been identified during the application behavior assessment.

Additionally, or alternatively, in one or more embodiments, S240 may function to receive, from the subscribing entity, a selection input of a target selectable key insights row of the plurality of distinct selectable key insights rows. In such a non-limiting example, in response to receiving the selection input of a target selectable key insights row of the plurality of distinct selectable key insights rows, S240 may function to instantiate, by the one or more computer processors, a pairwise assessment details user interface that corresponds to the target selectable key insights row. The pairwise assessment details user interface, in one or more embodiments, may include a distribution deviation assessment visualization that graphically illustrates a data distribution of a target feature, column, or metric of the test object superimposed or overlaid over the corresponding data distribution of the same target feature, column, or metric of the reference state object, as shown generally by way of example in FIGS. 15, 19, and 20A-20O. Furthermore, in some embodiments, the pairwise assessment details user interface may further include a pairwise assessment similarity score that quantitatively represents a degree of similarity between the data distribution of the target feature, column, or metric of the test object and the corresponding data distribution of the same target feature, column, or metric of the reference state object.

For instance, with continued reference to the above non-limiting example, the selection input of the target selectable key insights row of the plurality of distinct selectable key insights rows may correspond to the second automated pairwise assessment and, in turn, S240 may function to instantiate a pairwise assessment details user interface that corresponds to the second automated pairwise assessment in response to receiving the selection input of the target selectable key insights row. In such a non-limiting example, the pairwise assessment details user interface may include a distribution deviation assessment visualization that graphically illustrates the distribution of the first set of contextual attribute values associated with the test object superimposed or overlaid over the corresponding contextual attribute distribution of the reference state object. Furthermore, in such a non-limiting example, the pairwise assessment details user interface, may further include a pairwise assessment similarity score that quantitatively represents a degree of similarity between the distribution of the first set of contextual attribute values associated with the test object and the corresponding contextual attribute distribution of the reference state object.

Furthermore, in some embodiments, the pairwise assessment details user interface or any other graphical user interface described herein may include a single selectable button (e.g., a toggle button) that, when operated, is configured to control a display mode for comparative visualization of test object and reference state object distributions. For instance, in a non-limiting example, the pairwise assessment details user interface may be configured to display a graphical distribution comparison between a first data distribution of the set of values included in the test object that corresponds to a target column or feature (e.g., response latency) and a second data distribution of a corresponding set of values included in the reference state object that corresponds to the same target column or feature (e.g., response latency).

Accordingly, in such a non-limiting example, S240 may function to receive an input from the subscribing entity selecting the "distribution overlay" display mode of the single selectable button (e.g., the toggle button) and, in turn, the pairwise assessment details user interface may render a first graphical distribution evaluation object in response to receiving the input from the subscribing entity selecting the "distribution overlay" display mode of the single selectable button (e.g., the toggle button). The first graphical distribution evaluation object, in such an embodiment, may include the first data distribution of the set of values included in the test object that corresponds to the target column or feature (e.g., response latency) overlaid or superimposed onto the second data distribution of the corresponding set of values included in the reference state object that corresponds to the same target column or feature (e.g., response latency), as shown generally by way of example in FIGS. 19 and 20A-20O.

Additionally, or alternatively, in some embodiments, S240 may function to receive another input selecting the "side-by-side distribution mode" of the single selectable button (e.g., the toggle button) and, in turn, the pairwise assessment details user interface may render a second graphical distribution evaluation object different from the first graphical distribution evaluation object in response to receiving the input from the subscribing entity selecting the "side-by-side distribution" display mode of the single selectable button (e.g., the toggle button). The second graphical distribution evaluation object, in such an embodiment, may include the first data distribution of the set of values included in the test object that corresponds to the target column or feature (e.g., response latency) displayed side-by-side with the second data distribution of the corresponding set of values included in the reference state object that corresponds to the same target column or feature (e.g., response latency), as shown generally by way of example in FIG. 13. It shall be recognized that, in such an embodiment, the second graphical distribution evaluation object may include a visual separator disposed between the first distribution and the second distribution such as a computed similarity or deviation metric (e.g., degree of distribution similarity or the like). In other words, the visual separator may spatially separate the first distribution from the second distribution, while providing an inline display of a computed similarity or deviation metric (e.g., degree of distribution similarity) that quantifies the extent of divergence between the two distributions and enhances the interpretability of the side-by-side visualization.

Additionally, or alternatively, in such an embodiment, the second graphical distribution evaluation object may replace the first graphical distribution evaluation object on the pairwise assessment details user interface.

Mitigating the Misbehavior in the Deployed AI Application

In one or more embodiments, after detecting that a misbehavior occurred in the deployed AI application during the target time span, the system or service implementing method 200 may function to adapt the deployed AI application to an adapted AI application to prevent the misbehavior from occurring in the future. In some embodiments, the adaptation of the deployed AI application to the adapted AI application may be performed in real-time or near real-time. Accordingly, in such an embodiment, the system or service implementing method 200 (or the subscribing entity) may deploy the adapted AI application to replace the previously deployed AI application detected to have the misbehavior.

It shall be recognized that, in some embodiments, the system or service implementing method 200 may function to adapt the deployed AI application to the adapted AI application by retraining one or more machine learning models used by the deployed AI application, tuning a specific application component (e.g., external API, etc.) used by the deployed AI application that contributed to the misbehavior, or any other suitable modification to the underlying architecture, configuration, or operational logic of the deployed AI application that is capable of mitigating or eliminating the recurrence of the detected misbehavior.

3. Computer-Implemented Method and Computer Program Product

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein. Furthermore, each method step, process step, or the like described herein may be performed in real-time or near real-time.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for accelerating a detection of anomalous behavior in a deployed artificial intelligence (AI) application, the method comprising:

obtaining, via an application programming interface (API), a test object that includes application usage data of the deployed AI application for a target time span, wherein the test object includes one or more of:
a set of inputs provided to the deployed AI application during the target time span,
a set of outputs generated by the deployed AI application in response to processing the set of inputs,
a set of contextual attribute values collected during the processing of the set of inputs and the generation of the set of outputs by the deployed AI application, and
a set of supplemental attribute values used during the generation of the set of outputs by the deployed AI application, executing, in real-time by one or more computer processors, one or more application behavior tests that assess an operational behavior of the deployed AI application by evaluating the test object against a reference state object associated with the deployed AI application, wherein executing the one or more application behavior tests includes:
executing a first set of automated pairwise assessments between the test object and the reference state object assessing the operational behavior of the deployed AI application at an application output data level,
executing a second set of automated pairwise assessments between the test object and the reference state object assessing the operational behavior of the deployed AI application at a contextual attribute data level, and
executing a third set of automated pairwise assessments between the test object and the reference state object assessing the operational behavior of the deployed AI application at a supplemental attribute data level;

detecting, by the one or more computer processors, when a misbehavior occurred in the deployed AI application during the target time span and one or more deviant features contributing to the misbehavior in response to the one or more application behavior tests indicating that at least one distributional deviation exists between the test object and the reference state object; and returning, by the one or more computer processors, the one or more deviant features contributing to the misbehavior to a subscribing entity associated with the deployed AI application, thereby enabling the subscribing entity to investigate and mitigate the misbehavior from occurring within the deployed AI application at a future time by modifying operational parameters of the deployed AI application corresponding to the one or more deviant features.

2. The computer-implemented method according to claim 1, wherein:
the deployed AI application includes a plurality of distinct components that collectively operate to process the set of inputs and generate the set of outputs during the target time span,
each distinct component of the plurality of distinct components of the deployed AI application performs a specific task that assists the deployed AI application in processing the set of inputs and generating the set of outputs during the target time span,
the set of contextual attribute values contributes to a first performance efficacy metric that measures a performance characteristic of a first component of the plurality of distinct components, and
the set of outputs corresponds to model outputs generated by a machine learning model of the plurality of distinct components.

3. The computer-implemented method according to claim 2, further comprising:
generating, by the one or more computer processors, a plurality of distinct sets of text efficacy values of a plurality of distinct text efficacy metric types derived from the set of outputs generated by the deployed AI application during the target time span, wherein:
each distinct set of text efficacy values of the plurality of distinct sets of text efficacy values corresponds to a distinct text efficacy metric type that enables numerical assessment of a textual characteristic associated with the set of outputs,
executing the first set of automated pairwise assessments includes executing a respective automated pairwise assessment for each distinct text efficacy metric type of the plurality of distinct text efficacy metric types included in the test object, and
the respective automated pairwise assessment executed for a subject distinct text efficacy metric type is performed between a distribution of a distinct set of text efficacy values included in the test object that corresponds to the subject distinct text efficacy metric type and a corresponding distribution of text efficacy values included in the reference state object that also corresponds to the subject distinct text efficacy metric type.

4. The computer-implemented method according to claim 1, wherein executing the first set of automated pairwise assessments includes:
  assessing a distribution of the set of outputs included in the test object against a distribution of a historical set of outputs included in the reference state object, and
  in response to assessing the distribution of the set of outputs included in the test object against the distribution of the historical set of outputs included in the reference state object, outputting a pairwise assessment finding that indicates a statistically significant drift or shift occurred in the deployed AI application associated with the test object relative to the reference state object.

5. The computer-implemented method according to claim 1, wherein executing the first set of automated pairwise assessments includes:
  generating, by the one or more computer processors, a test distribution of a target evaluation metric that is derived from the set of outputs included in the test object,
  generating, by the one or more computer processors, a reference distribution of the target evaluation metric derived from a historical set of outputs included in the reference state object,
  assessing, by the one or more computer processors, the test distribution of the target evaluation metric associated with the test object against the reference distribution of the target evaluation metric associated with the reference state object, and
  outputting a pairwise assessment finding that indicates a statistically significant drift or shift occurred in the deployed AI application during the target time span in response to assessing the test distribution of the target evaluation metric against the reference distribution of the target evaluation metric.

6. The computer-implemented method according to claim 1, wherein executing the first set of automated pairwise assessments includes:
  generating, by the one or more computer processors, a plurality of test distributions that correspond to a plurality of distinct evaluation metrics, wherein:
    each test distribution corresponds to a distinct one of the plurality of distinct evaluation metrics, and
    each test distribution is derived from the set of outputs included in the test object based on the distinct one of the plurality of distinct evaluation metrics;
  generating, by the one or more computer processors, a plurality of reference distributions that correspond to the plurality of distinct evaluation metrics, wherein:
    each reference distribution corresponds to a distinct one of the plurality of distinct evaluation metrics, and
    each reference distribution is derived from a historical set of reference outputs included in the reference state object based on the distinct one of the plurality of distinct evaluation metrics;
      assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and
      outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

7. The computer-implemented method according to claim 1, wherein executing the second set of automated pairwise assessments includes:
  assessing a distribution of the set of contextual attribute values included in the test object against a distribution of a historical set of contextual attribute values included in the reference state object, and
  in response to assessing the distribution of the set of contextual attribute values included in the test object against the distribution of the historical set of contextual attribute values included in the reference state object, outputting a pairwise assessment finding that indicates a statistically significant drift or shift occurred in the deployed AI application associated with the test object relative to the reference state object.

8. The computer-implemented method according to claim 1, wherein executing the second set of automated pairwise assessments includes:
  generating, by the one or more computer processors, a test distribution of a target evaluation metric that is derived from the set of contextual attribute values included in the test object,
  generating, by the one or more computer processors, a reference distribution of the target evaluation metric derived from a historical set of contextual attribute values included in the reference state object,
  assessing, by the one or more computer processors, the test distribution of the target evaluation metric associated with the test object against the reference distribution of the target evaluation metric associated with the reference state object, and
  outputting a pairwise assessment finding that indicates a statistically significant drift or shift occurred in the deployed AI application during the target time span in response to assessing the test distribution of the target evaluation metric against the reference distribution of the target evaluation metric.

9. The computer-implemented method according to claim 1, wherein executing the second set of automated pairwise assessments includes:
  generating, by the one or more computer processors, a plurality of test distributions that correspond to a plurality of distinct evaluation metrics, wherein:
    each test distribution corresponds to a distinct one of the plurality of distinct evaluation metrics, and
    each test distribution is derived from the set of contextual attribute values included in the test object based on the distinct one of the plurality of distinct evaluation metrics;
  generating, by the one or more computer processors, a plurality of reference distributions that correspond to the plurality of distinct evaluation metrics, wherein:
    each reference distribution corresponds to a distinct one of the plurality of distinct evaluation metrics, and
    each reference distribution is derived from a historical set of contextual attribute values included in the reference state object based on the distinct one of the plurality of distinct evaluation metrics;
    assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

10. The computer-implemented method according to claim 1, wherein executing the third set of automated pairwise assessments includes:

assessing a distribution of the set of supplemental attribute values included in the test object against a distribution of a historical set of supplemental attribute values included in the reference state object, and in response to assessing the distribution of the set of supplemental attribute values included in the test object against the distribution of the historical set of supplemental attribute values included in the reference state object, outputting a pairwise assessment finding that indicates a statistically significant drift or shift occurred in the deployed AI application associated with the test object relative to the reference state object.

11. The computer-implemented method according to claim 1, wherein executing the third set of automated pairwise assessments includes:

generating, by the one or more computer processors, a test distribution of a target evaluation metric that is derived from the set of supplemental attribute values included in the test object, generating, by the one or more computer processors, a reference distribution of the target evaluation metric derived from a historical set of supplemental attribute values included in the reference state object, assessing, by the one or more computer processors, the test distribution of the target evaluation metric associated with the test object against the reference distribution of the target evaluation metric associated with the reference state object, and outputting a pairwise assessment finding that indicates a statistically significant drift or shift occurred in the deployed AI application during the target time span in response to assessing the test distribution of the target evaluation metric against the reference distribution of the target evaluation metric.

12. The computer-implemented method according to claim 1, wherein executing the third set of automated pairwise assessments includes:

generating, by the one or more computer processors, a plurality of test distributions that correspond to a plurality of distinct evaluation metrics, wherein:

each test distribution corresponds to a distinct one of the plurality of distinct evaluation metrics, and each test distribution is derived from the set of supplemental attribute values included in the test object based on the distinct one of the plurality of distinct evaluation metrics;

generating, by the one or more computer processors, a plurality of reference distributions that correspond to the plurality of distinct evaluation metrics, wherein:

each reference distribution corresponds to a distinct one of the plurality of distinct evaluation metrics, and each reference distribution is derived from a historical set of supplemental attribute values included in the reference state object based on the distinct one of the plurality of distinct evaluation metrics;

assessing, by the one or more computer processors, a plurality of distinct distribution pairs to assess the plurality of test distributions against the plurality of reference distributions, wherein each distribution pair of the plurality of distinct distribution pairs includes a respective test distribution and a respective reference distribution that correspond to a same evaluation metric; and outputting a pairwise assessment finding that indicates a statistically significant drift or shift occurred in the deployed AI application during the target time span when the assessment of at least one of the plurality of distinct distribution pairs detects a statistically significant deviation between the respective test distribution and the respective reference distribution.

13. The computer-implemented method according to claim 1, wherein:

the API is provided by an application behavior assessment and explainability service, the computer-implemented method further includes:

receiving a request, from the subscribing entity, to compute a plurality of distinct text efficacy values of a plurality of distinct text efficacy metric types for each distinct output of the set of outputs in response to the subscribing entity invoking an API function provided by the API, automatically computing, by the one or more computer processors, a plurality of distinct sets of text efficacy values of the plurality of distinct text efficacy metric types in response to receiving the request, wherein the plurality of distinct sets of text efficacy values includes at least:

a first set of output text efficacy values corresponding to a first distinct text efficacy metric type, a second set of output text efficacy values corresponding to a second distinct text efficacy metric type, and a third set of output text efficacy values corresponding to a third distinct text efficacy metric type.

14. The computer-implemented method according to claim 13, wherein:

the test object further includes the first set of output text efficacy values corresponding to the first distinct text efficacy metric type, the second set of output text efficacy values corresponding to the second distinct text efficacy metric type, and the third set of output text efficacy values corresponding to the third distinct text efficacy metric type, and executing the one or more application behavior tests further includes:

executing a fourth automated pairwise assessment between a distribution of the first set of output text efficacy values that corresponds to the first distinct text efficacy metric type and a corresponding data distribution of the reference state object that corresponds to the first distinct text efficacy metric type, executing a fifth automated pairwise assessment between a distribution of the second set of output text efficacy values that corresponds to the second distinct text efficacy metric type and a corresponding data distribution of the reference state object that corresponds to the second distinct text efficacy metric type, and executing a sixth automated pairwise assessment between a distribution of the third set of output text efficacy values that corresponds to the third distinct text efficacy metric type and a corresponding data distribution of the reference state object that corresponds to the third distinct text efficacy metric type.

15. The computer-implemented method according to claim 14, further comprising:
in response to executing the fourth automated pairwise assessment, the fifth automated pairwise assessment, and the sixth automated pairwise assessment:
detecting, by the one or more computer processors, that a statistically significant drift or shift occurred in one of:
the distribution of the first set of output text efficacy values associated with the test object,
the distribution of the second set of output text efficacy values associated with the test object, and
the distribution of the third set of output text efficacy values associated with the test object.

16. The computer-implemented method according to claim 14, further comprising:
in response to executing the fourth automated pairwise assessment, the fifth automated pairwise assessment, and the sixth automated pairwise assessment:
detecting, by the one or more computer processors, that a statistically significant drift or shift did not occur in one of:
the distribution of the first set of output text efficacy values associated with the test object,
the distribution of the second set of output text efficacy values associated with the test object, and
the distribution of the third set of output text efficacy values associated with the test object.

17. The computer-implemented method according to claim 1, further comprising:
surfacing, via a graphical user interface, the misbehavior that occurred in the deployed AI application at one or more levels of granularity, wherein surfacing the misbehavior includes one or more of:
surfacing, by the graphical user interface, a single distribution of contextual attribute values, supplemental attribute values, or evaluation metrics derived from the set of outputs included in the test object that contributed to the misbehavior, and
surfacing, by the graphical user interface, a single distinct application component of a plurality of distinct application components implemented by the deployed AI application whose component behavior contributed to the misbehavior.

18. The computer-implemented method according to claim 1, further comprising:
presenting, by the one or more computer processors, a representation of a shift in the operational behavior of the deployed AI application during the target time span, wherein the computer-implemented method presents the shift as manifesting in a statistically meaningful fashion at one or more of:
a single distribution of contextual attributes, supplemental attributes, or evaluation metrics derived from the set of outputs, the set of contextual attribute values, or the set of supplemental attribute values,
a component-level accumulation of behavioral findings from all application behavior tests and respective automated pairwise assessments corresponding to a single distinct component of the deployed AI application, and an application-level accumulation of behavioral findings from all application behavior tests and associated automated pairwise assessments executed for the deployed AI application.

19. The computer-implemented method according to claim 1, further comprising:
automatically generating, by the one or more computer processors, an application behavior alert in response to detecting that the misbehavior occurred in the deployed AI application during the target time span, and
transmitting, in real-time, the application behavior alert to the subscribing entity associated with the deployed AI application using a real-time messaging service.

20. The computer-implemented method according to claim 1, further comprising:
instantiating, by the one or more computer processors, an application behavior user interface that includes a selectable test execution button;
receiving, from the subscribing entity associated with the deployed AI application, a first user input selecting the selectable test execution button displayed on the application behavior user interface;
instantiating, by the one or more computer processors, an application behavior test configuration user interface object overlaid on the application behavior user interface in response to receiving the first user input;
receiving, via the application behavior test configuration user interface object, a sequence of one or more additional user inputs from the subscribing entity that:
(i) selects the reference state object as a baseline application behavior for the deployed AI application,
(ii) selects the test object to be assessed against the reference state object,
(iii) selects the one or more application behavior tests to be executed during the assessment of the operational behavior of the deployed AI application, and
(iv) selects a set of application behavior tests not to be executed during the assessment of the operational behavior of the deployed AI application; and
initiating, by the one or more computer processors, the execution of the one or more application behavior tests that assess the operational behavior of the deployed AI application in response to the subscribing entity selecting a test confirmation button displayed on the application behavior test configuration user interface object.

21. The computer-implemented method according to claim 20, wherein the application behavior user interface further includes:
an application behavior assessment visualization that includes a plurality of distinct selectable markers, wherein:
each distinct selectable marker of the plurality of distinct selectable markers corresponds to a distinct application behavior assessment of the deployed AI application, and
each distinct application behavior assessment executed a respective set of application behavior tests to assess the operational behavior of the deployed AI application for a respective time span, and
an application behavior assessment matrix that includes a plurality of distinct selectable application behavior assessment rows, wherein:
each distinct selectable application behavior assessment row of the plurality of distinct selectable application behavior assessment rows corresponds to a respective application behavior assessment performed for the deployed AI application.

22. The computer-implemented method according to claim 21, further comprising:
- receiving, via the application behavior user interface, an input from the subscribing entity selecting a selectable marker of the plurality of distinct selectable markers, wherein the distinct application behavior assessment corresponding to the selectable marker selected by the subscribing entity executed the one or more application behavior tests;
- instantiating, by the one or more computer processors, an application behavior assessment details user interface that corresponds to the distinct application behavior assessment that executed the one or more application behavior tests in response to receiving the input from the subscribing entity selecting the selectable marker, wherein the application behavior assessment details user interface includes:
  - a total number of the one or more application behavior tests that satisfied distribution test criteria of the one or more application behavior tests,
  - a total number of the one or more application behavior tests that did not satisfy the distribution test criteria of the one or more application behavior tests,
  - an application similarity index score that quantitatively represents a degree of similarity between the test object and the reference state object, and
  - a plurality of distinct selectable key insights rows that correspond to the one or more deviant features contributing to the misbehavior.

23. The computer-implemented method according to claim 22, further comprising:
- receiving, from the subscribing entity, a selection input of a target selectable key insights row of the plurality of distinct selectable key insights rows that corresponds to the second set of automated pairwise assessments; and
- instantiating, by the one or more computer processors, a pairwise assessment details user interface that corresponds to the second set of automated pairwise assessments in response to receiving the selection input of the target selectable key insights row that corresponds to the second set of automated pairwise assessments from the subscribing entity, wherein the pairwise assessment details user interface includes:
  - a distribution deviation assessment visualization that graphically illustrates a distribution of the set of contextual attribute values associated with the test object superimposed or overlaid over a corresponding contextual attribute distribution of the reference state object, and
  - a pairwise assessment similarity score that quantitatively represents a degree of similarity between the distribution of the set of contextual attribute values associated with the test object and the corresponding contextual attribute distribution of the reference state object.

24. The computer-implemented method according to claim 1, further comprising:
- automatically computing, by the one or more computer processors, an application similarity index score that quantitatively represents a degree of similarity between the test object and the reference state object based on a combination of the set of outputs, the set of contextual attribute values, the set of supplemental attribute values, and one or more derived sets of evaluation metrics, and
- displaying, via a graphical user interface, the application similarity index score accumulated at an individual metric level, a distinct component level, or across the entire deployed AI application.

\* \* \* \* \*